US012781829B2

(12) United States Patent
Hayashi et al.

(10) Patent No.: US 12,781,829 B2
(45) Date of Patent: Nov. 3, 2026

(54) ANTI-VIBRATION DEVICE

(71) Applicant: DENSO CORPORATION, Kariya-city (JP)

(72) Inventors: Kazuhiro Hayashi, Nisshin-city (JP); Yasumasa Yamazaki, Nisshin-city (JP); Motohiko Ueda, Kariya-city (JP); Yoshikatsu Sawada, Kariya-city (JP); Takaya Morishita, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 623 days.

(21) Appl. No.: 18/326,074

(22) Filed: May 31, 2023

(65) Prior Publication Data

US 2024/0093756 A1 Mar. 21, 2024

(30) Foreign Application Priority Data

Sep. 19, 2022 (JP) ................................ 2022-148665

(51) Int. Cl.
*F16F 15/073* (2006.01)
*F16F 13/02* (2006.01)
*F16F 15/02* (2006.01)
*B60H 1/32* (2006.01)

(52) U.S. Cl.
CPC ............ *F16F 15/022* (2013.01); *F16F 13/02* (2013.01); *B60H 1/3223* (2013.01); *F16F 2222/04* (2013.01)

(58) Field of Classification Search
CPC .......... F16F 3/023; F16F 13/02; F16F 15/022; F16F 15/073; F16F 2222/04; B60H 1/3223
See application file for complete search history.

(56) References Cited

U.S. PATENT DOCUMENTS 3,506,226 A * 4/1970 Blomgren ............ F16F 15/073
417/423.15
3,730,509 A * 5/1973 Jorn .......................... F16F 3/12
267/152
3,757,932 A * 9/1973 Baljet .................. F16F 15/073
198/757

(Continued)

FOREIGN PATENT DOCUMENTS

JP S62-028545 A 2/1987

*Primary Examiner* — Thomas W Irvin
(74) *Attorney, Agent, or Firm* — Oliff PLC

(57) ABSTRACT

An anti-vibration device is secured to a vibration source and a vibration transmission portion to inhibit transmission of vibration, and includes a first elastically deformed portion, a second elastically deformed portion and a third elastically deformed portion. The first elastically deformed portion is a plate having a thickness in a first thickness direction and vibrates in the first thickness direction to configure a path for the vibration to be transmitted from the vibration source to the vibration transmission portion. The second elastically deformed portion is a plate having a thickness in a second thickness direction intersecting the first thickness direction and vibrates in the second thickness direction to configure the path. The third elastically deformed portion is a plate having a thickness in a third thickness direction intersecting the first thickness direction and the second thickness direction and vibrates in the third thickness direction to configure the path.

9 Claims, 40 Drawing Sheets

(56) References Cited

U.S. PATENT DOCUMENTS

| | | | | | |
|---|---|---|---|---|---|
| 4,155,529 | A * | 5/1979 | Maudlin | F16M 5/00 | 416/500 |
| 4,181,216 | A * | 1/1980 | Cipu | F16F 3/023 | 198/757 |
| 5,217,198 | A * | 6/1993 | Samarov | F16F 15/085 | 267/152 |
| 9,447,839 | B2 * | 9/2016 | Dunning | F16F 15/073 | |
| 10,030,731 | B1 * | 7/2018 | Hundley | F16F 1/48 | |
| 10,036,442 | B2 * | 7/2018 | Mao | F16F 3/023 | |
| 10,125,843 | B2 * | 11/2018 | Runge | F16F 15/073 | |
| 2014/0015178 | A1 * | 1/2014 | Sessions | F16F 3/023 | 267/164 |
| 2015/0014510 | A1 * | 1/2015 | Dunning | F16F 3/026 | 248/618 |
| 2017/0025936 | A1 * | 1/2017 | Mao | H02K 33/02 | |
| 2018/0112737 | A1 * | 4/2018 | Runge | F16F 15/046 | |
| 2022/0403913 | A1 * | 12/2022 | Hayashi | F16F 15/073 | |
| 2023/0015489 | A1 * | 1/2023 | Rueger | F16F 3/023 | |

* cited by examiner

ANTI-VIBRATION DEVICE

CROSS REFERENCE TO RELATED APPLICATION

This application is based on Japanese Patent Application No. 2022-148665 filed on Sep. 19, 2022, the disclosure of which is incorporated herein by reference.

TECHNICAL FIELD

The present disclosure relates to an anti-vibration device.

BACKGROUND ART

An anti-vibration device uses a U-shaped leaf spring secured to an anti-vibration support and a vibrating body to perform vibration insulation.

SUMMARY

According to an aspect of the present disclosure, an anti-vibration device that is secured to a vibration source and a vibration transmission portion to inhibit transmission of vibration from the vibration source to the vibration transmission portion, includes: a first elastically deformed portion shaped in a plate having a thickness in a first thickness direction, the first elastically deformed portion is elastically deformed by the vibration and vibrates in the first thickness direction to configure a path for the vibration to be transmitted from the vibration source to the vibration transmission portion; a second elastically deformed portion shaped in a plate having a thickness in a second thickness direction intersecting the first thickness direction, the second elastically deformed portion is elastically deformed by the vibration and vibrates in the second thickness direction to configure the path; and a third elastically deformed portion shaped in a plate having a thickness in a third thickness direction intersecting the first thickness direction and the second thickness direction, the third elastically deformed portion is elastically deformed by the vibration and vibrates in the third thickness direction to configure the path.

DESCRIPTION OF EMBODIMENTS

Figure 1:
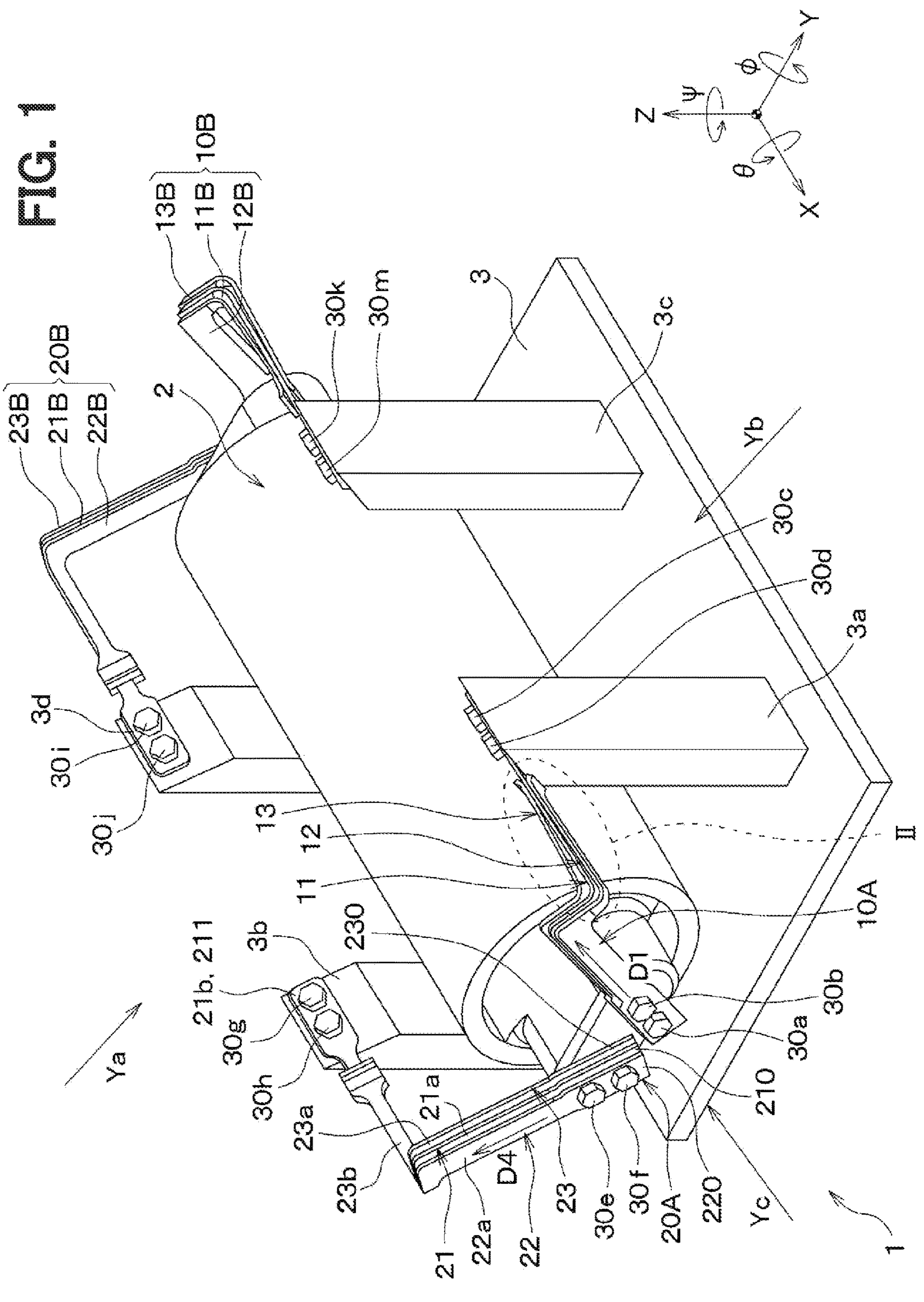
FIG. 1 is an overall view illustrating a vehicular anti-vibration device according to a first embodiment connected among four support portions of a vibration transmission portion and a vibration source and provides a perspective view illustrating in detail the structure of four spring units configuring the anti-vibration device.

A prior art proposes an anti-vibration device that uses a U-shaped leaf spring secured to an anti-vibration support and a vibrating body to perform vibration insulation.

The U-shaped leaf spring is made by bending a long plate into a U-shape, being thick in the X- and Z-directions and wide in the Y-direction of the Cartesian coordinates.

The U-shaped leaf spring has low rigidity in the X and Z directions and high rigidity in the Y direction. The U-shaped leaf spring facilitates bending deformation in the X and Z directions. The U-shaped leaf spring is elastically deformed by the vibration transmitted from the vibrating body, causing vibration in the X and Z directions. The U-shaped leaf spring can restrict the vibrating body from transmitting vibrations in the X and Z directions to the anti-vibration support.

The U-shaped leaf spring has low rigidity in the X and Z directions, but high rigidity in the Y direction. Therefore, it is difficult to generate bending deformation in the Y-direction, making it difficult to restrict the transmission of Y-directional vibration from the vibrating body to the anti-vibration support.

Consequently, the U-shaped leaf spring cannot achieve vibration insulation performance that inhibits transmission of vibrations in three directions such as X, Y, and Z from the vibrating body to the anti-vibration support.

The present disclosure provides an anti-vibration device that improves the anti-vibration performance inhibiting the transmission of vibration from a vibrating body to an anti-vibration support.

According to an aspect of the present disclosure, an anti-vibration device that is secured to a vibration source and a vibration transmission portion to inhibit transmission of vibration from the vibration source to the vibration transmission portion, includes: a first elastically deformed portion shaped in a plate having a thickness in a first thickness direction, the first elastically deformed portion is elastically deformed by the vibration and vibrates in the first thickness direction to configure a path for the vibration to be transmitted from the vibration source to the vibration transmission portion; a second elastically deformed portion shaped in a plate having a thickness in a second thickness direction intersecting the first thickness direction, the second elastically deformed portion is elastically deformed by the vibration and vibrates in the second thickness direction to configure the path; and a third elastically deformed portion shaped in a plate having a thickness in a third thickness direction intersecting the first thickness direction and the second thickness direction, the third elastically deformed portion is elastically deformed by the vibration and vibrates in the third thickness direction to configure the path.

Therefore, it is possible to suppress the transmission of vibration from a vibrating body to an anti-vibration support in three directions different from each other such as the first direction, the second direction and the third direction.

Thus, it is possible to provide an anti-vibration device that improves the anti-vibration performance inhibiting the transmission of vibration from a vibrating body to an anti-vibration support.

Embodiments will be described based on the accompanying drawings. Hereinafter, the mutually corresponding or comparable parts in the following embodiments are designated by the same reference numerals for simplicity of description.

First Embodiment

Figure 2:
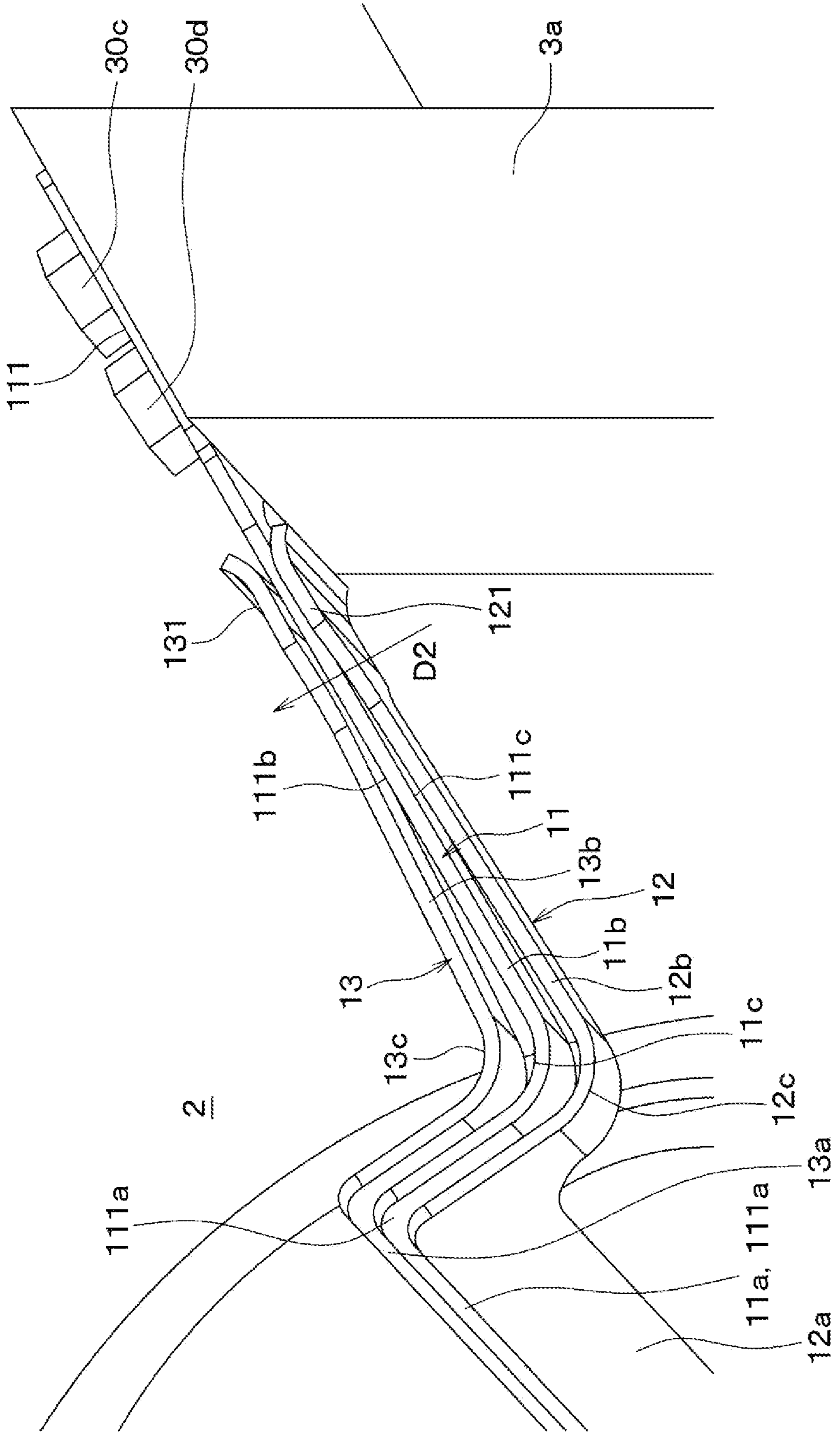
FIG. 2 is an enlarged view of part II in the spring unit of the anti-vibration device in FIG. 1 and illustrates the spring unit causing sliding friction between the surface of the elastically deformed portion of one leaf spring and another region in the X direction of the elastically deformed portion of another leaf spring.
Figure 3:
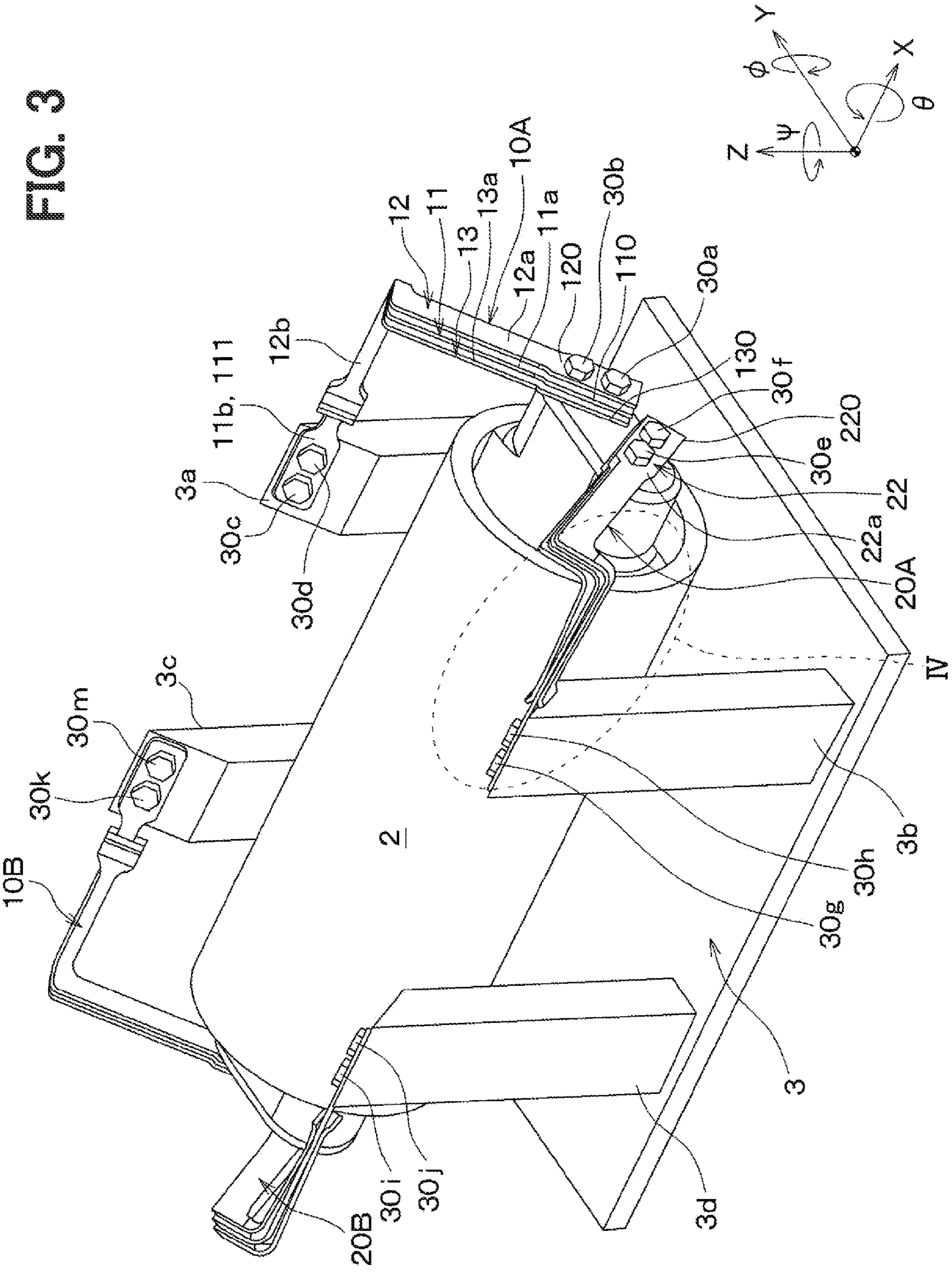
FIG. 3 illustrates the anti-vibration device according to the first embodiment viewed along arrow Ya in FIG. 1 and provides a supplemental explanation about the configuration of leaf springs of each of the two spring units.
Figure 4:
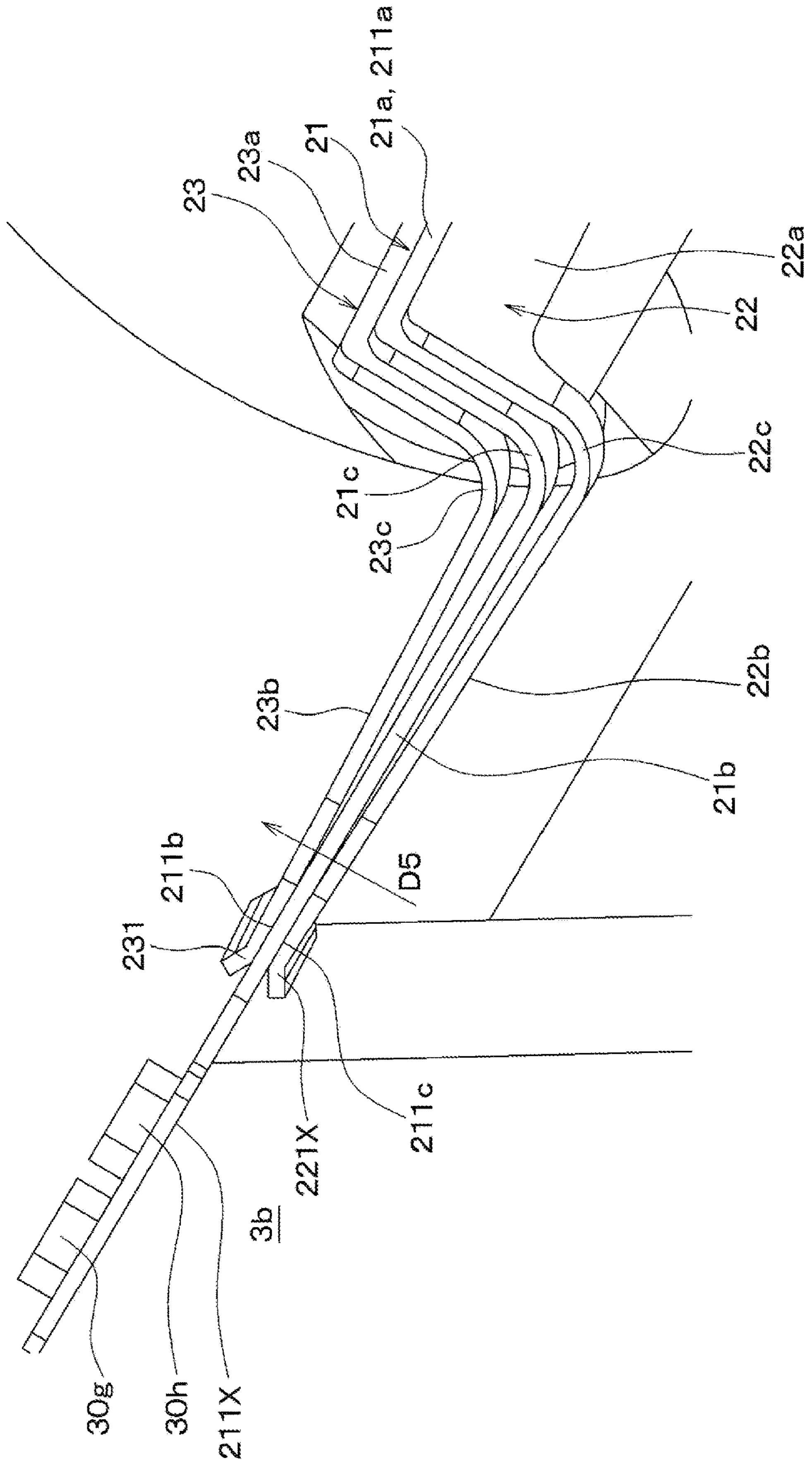
FIG. 4 is an enlarged view of part IV in the spring unit of the anti-vibration device illustrated in FIG. 3 and illustrates the spring unit causing sliding friction between the surface of the elastically deformed portion of one leaf spring and another region in the X direction of the elastically deformed portion of another leaf spring.
Figure 5:
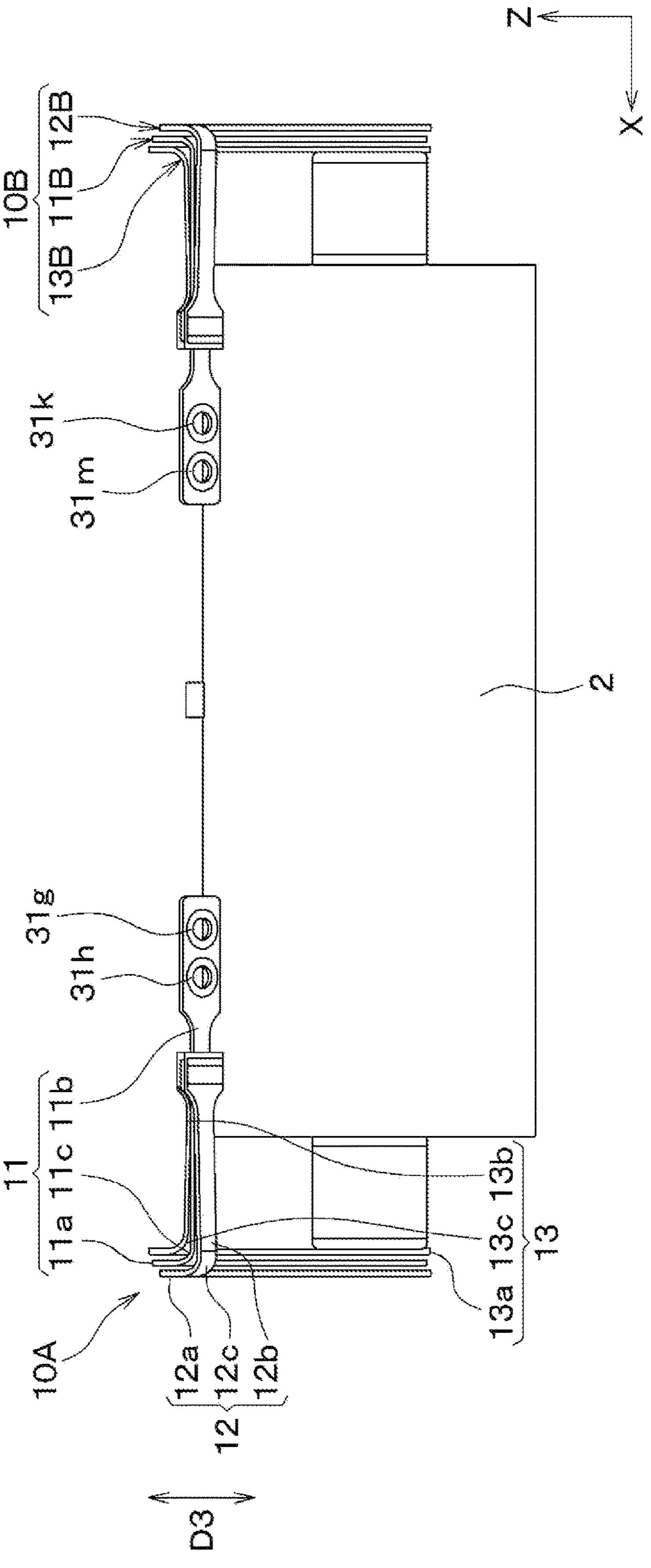
FIG. 5 illustrates the anti-vibration device according to the first embodiment viewed along arrow Yb in FIG. 1 and provides a supplemental explanation about the configuration of leaf springs of each of the two spring units.
Figure 6:
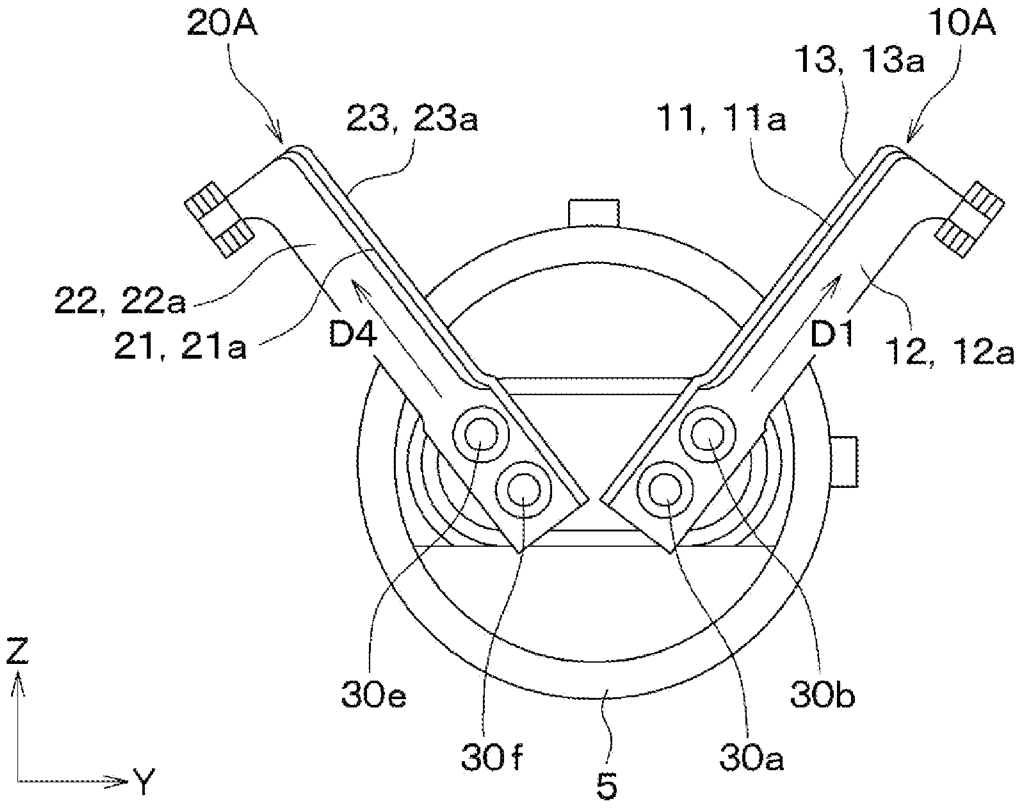
FIG. 6 illustrates the anti-vibration device according to the first embodiment viewed along arrow Yc in FIG. 1 and provides a supplemental explanation about the configuration of leaf springs of each of the two spring units.

FIGS. 1, 2, 3, 4, 5, and 6 illustrate a vehicular anti-vibration device 1 according to the present embodiment. FIG. 1 is a perspective view of the anti-vibration device 1 according to the present embodiment. FIG. 2 is an enlarged view of region II of the anti-vibration device 1 in FIG. 1. FIG. 3 illustrates the anti-vibration device 1 in FIG. 1 viewed along arrow Ya. FIG. 4 is a partially enlarged view of region IV of the anti-vibration device 1 in FIG. 3. FIG. 5 illustrates the anti-vibration device 1 viewed along arrow Yb in FIG. 1. FIG. 5 omits the illustration of a vibration transmission portion 3 and bolts 30*h*, 30*g*, 30*j*, and 30*i*. FIG. 6 illustrates the anti-vibration device 1 viewed along arrow Yc in FIG. 1.

Throughout the present specification, the Y direction is orthogonal to the X direction. The Z direction is orthogonal to the X direction and the Y direction. The θ direction is a rotation direction around the X direction as a center line. The ϕ direction is a rotation direction around the Y direction as a center line. The ψ direction is a rotation direction around the Z direction as a center line.

The anti-vibration device 1 is a support member that supports a vibration source 2 above the vibration transmission portion 3. The anti-vibration device 1 provides vibration insulation to inhibit the transmission of vibrations generated from the vibration source 2 to the vibration transmission portion 3.

The vibration transmission portion 3 according to the present embodiment includes a vehicle body, an engine, a vehicle traction motor, and a transaxle, for example. The vibration source 2 according to the present embodiment is an electric compressor for a vehicular air conditioning system. The electric compressor is formed to be approximately cylindrical so that the axis extends in the X direction.

The anti-vibration device 1 includes spring units 10A, 10B, 20A, and 20B, as illustrated in FIGS. 1, 2, 3, 4, 5, and 6.

Concerning the spring unit 10A, one region in the D1 direction 110 of an elastically deformed portion 11*a* is secured to one side in the X direction of the vibration source 2 by fastening bolts 30*a* and 30*b* (first securing members). Concerning the spring unit 10A, another region in the X direction 111 of an elastically deformed portion 11*b* is secured to a support portion 3*a* of the vibration transmission portion 3 by fastening bolts 30*c* and 30*d* (second securing members).

Specifically, the spring unit 10A includes leaf springs 11, 12, and 13. As illustrated in FIGS. 1, 2, 3, and 4, the leaf spring 11 includes the elastically deformed portions 11*a* and 11*b*, and a bent portion 11*c*.

The elastically deformed portion 11*a* is a first elastically deformed portion formed into a plate to be thick in the X direction and longitudinal being orthogonal to the X direction. In other words, the elastically deformed portion 11*a* is formed into a plate extending in the D1 direction, as illustrated in FIGS. 1 and 6. The elastically deformed portion 11*a* is formed to extend to one side in the Y direction corresponding to one side in the Z direction.

The X direction corresponds to the thickness direction (first thickness direction) of the elastically deformed portion 11*a*. The D1 direction is orthogonal to the X direction and slopes relative to the Y direction and the Z direction. The elastically deformed portion 11*a* and the elastically deformed portion 11*b* along with the bent portion 11*c* configure the leaf spring 11 (first leaf spring).

According to the present embodiment, the elastically deformed portions 11*a* and 11*b*, along with the bent portion 11*c*, configure a vibration transmission path (path) through which vibrations are transmitted from the vibration source 2 to the vibration transmission portion 3.

As illustrated in FIGS. 2 and 3, the elastically deformed portion 11*a* includes a surface 111*a* that flatly extends in a direction orthogonal to the X direction. As illustrated in FIG. 3, one region in the D1 direction 110 of the elastically deformed portion 11*a* is secured to one side in the X direction of the vibration source 2 by fastening bolts 30*a* and 30*b*.

The elastically deformed portion 11*b* is a second elastically deformed portion formed into a plate extending in the X direction. In other words, the elastically deformed portion 11*b* is formed into a plate being thick in the D2 direction of FIG. 1 and expands in a direction orthogonal to the D2 direction.

As illustrated in FIG. 2, the elastically deformed portion 11*b* includes surfaces 111*b* and 111*c* that flatly expand in the direction orthogonal to the D2 direction. The D2 direction is comparable to the thickness direction (second thickness direction) of the elastically deformed portion 11*b*.

The surfaces 111*b* and 111*c* are aligned in the D2 direction. The surface 111*b* is placed toward one side in the D2 direction relative to the surface 111*c*. The D2 direction is orthogonal to the X direction and slopes relative to the Y direction and the Z direction.

As illustrated in FIG. 2, another region in the X direction 111 of the elastically deformed portion 11*b* is secured to the support portion 3*a* of the vibration transmission portion 3 by fastening the bolts 30*c* and 30*d*. Another region in the X direction 111 is located on another side in the X direction relative to the surfaces 111*b* and 111*c* of the elastically deformed portion 11*b*.

The bend portion 11*c* connects the other end in the D1 direction of the elastically deformed portion 11*a* with one end in the X direction of the elastically deformed portion 11*b*.

The elastically deformed portions 11*a* and 11 *b*, and the bent portion 11*c* configure an integrated formation configured as a leaf spring. The leaf spring 11 according to the present embodiment is configured by plastically deforming a long metal plate member.

The leaf spring 12 includes the elastically deformed portions 12*a* and 12*b*, and a bent portion 12*c*. The elastically deformed portions 12*a* and 12*b*, and the bent portion 12*c* constitute an integrated formation.

The elastically deformed portion 12*a* is formed into a plate formed into a plate to be thick in the X direction and longitudinal being orthogonal to the X direction. In other words, the elastically deformed portion 12*a* is formed into a long plate extending in the D1 direction, as illustrated in FIG. 1. The elastically deformed portion 12*a* is formed to extend to one side in the Y direction toward one side in the Z direction.

The elastically deformed portion 12*a* is located on one side in the X direction relative to the elastically deformed portion 11*a*. One region in the D1 direction 120 of the elastically deformed portion 12*a* is secured to one side in the X direction of the vibration source 2 by fastening the bolts 30*a* and 30*b*.

In more detail, as illustrated in FIG. 3, one region in the D1 direction 120 of the elastically deformed portion 12*a*, along with one region in the D1 direction 110 of the elastically deformed portion 11*a*, is secured to one side in the X direction by fastening the bolts 30*a* and 30*b*.

The elastically deformed portion 12*b* is formed into a plate to be thick in the D2 direction of FIG. 2 and longitudinal being orthogonal to the D2 direction. In other words, the elastically deformed portion 12*b* is formed into a long plate extending in the X direction, as illustrated in FIGS. 1 and 2. Furthermore, the elastically deformed portion 12*b* is located on another side in the D2 direction relative to the elastically deformed portion 11*b*.

As illustrated in FIGS. 1 and 2, another region in the X direction 121 of the elastically deformed portion 12*b* is open to the vibration transmission portion 3 and the leaf spring 11. The elastically deformed portion 12*b* previously has an elastic force that pushes another region in the X direction 121 against the surface 111*c* of the leaf spring 11.

The elastic force allowing the elastically deformed portion 12*b* to push another region in the X direction 121 against the surface 111*c* of the leaf spring 11 is hereinafter also referred to as precompression.

As described below, another region in the X direction 121 of the elastically deformed portion 12*b* vibrates to generate sliding friction on the surface 111*c* of the elastically deformed portion 11*b* of the leaf spring 11 to attenuate the vibration of the leaf spring 11.

The bent portion 12*c* connects the other end in the D1 direction of the elastically deformed portion 12*a* and one end in the X direction of the elastically deformed portion 12*b*. The leaf spring 12 according to the present embodiment is configured by plastically deforming a long and thin metal plate material.

The leaf spring 13 includes elastically deformed portions 13*a* and 13*b*, and a bent portion 13*c*. The elastically deformed portions 13*a* and 13*b*, and the bent portion 13*c* constitute an integrated formation.

The elastically deformed portion 13*a* is formed into a plate to be thick in the X direction and longitudinal being orthogonal to the X direction. In other words, the elastically deformed portion 13*a* is formed into a long plate extending in the D1 direction, as illustrated in FIGS. 1, 2, and 3. The elastically deformed portion 13*a* is formed to extend to one side in the Y direction toward one side in the Z direction.

The elastically deformed portion 13*a* is located on another side in the X direction relative to the elastically deformed portion 11*a*. One region in the D1 direction 130 of the elastically deformed portion 13*a* is secured to one side in the X direction of the vibration source 2 by fastening the bolts 30*a* and 30*b*.

In more detail, the bolts 30*a* and 30*b* fasten one region in the D1 direction 130 of the elastically deformed portion 13*a*, along with one region in the D1 direction 110 of the elastically deformed portion 11*a* and one region in the D1 direction 120 of the elastically deformed portion 12*a*, to one side in the X direction of the vibration source 2.

The elastically deformed portion 13*b* is formed into a plate to be thick in the D2 direction and longitudinal being orthogonal to the D2 direction. In other words, the elastically deformed portion 13*b* is formed into a long plate extending in the X direction, as illustrated in FIGS. 1 and 2. Moreover, the elastically deformed portion 13*b* is located on one side in the D2 direction relative to the elastically deformed portion 11*b*.

As illustrated in FIGS. 1 and 2, another region in the X direction 131 of the elastically deformed portion 13*b* is open to the vibration transmission portion 3 and the leaf spring 11. The elastically deformed portion 13*b* previously has an elastic force that pushes another region in the X direction 131 against the surface 111*b* of the leaf spring 11.

The elastic force allowing the elastically deformed portion 13*b* to push another region in the X direction 131 against the surface 111*b* of the leaf spring 11 is hereinafter also referred to as precompression.

As described below, another region in the X direction 131 of the elastically deformed portion 13*b* vibrates to generate sliding friction on the surface 111*b* of the elastically deformed portion 11*b* of the leaf spring 11 to attenuate the vibration of the leaf spring 11.

The leaf springs 12 and 13 according to the present embodiment vibrate to generate sliding friction on the surfaces 111*c* and 111*b* of the elastically deformed portion 11*b* of the leaf spring 11 and thereby configure a first vibration attenuating member to attenuate the vibration of the leaf spring 11.

The bent portion 13*c* connects the other side in the D1 direction of the elastically deformed portion 13*a* with one side in the X direction of the elastically deformed portion 13*b*. The leaf spring 13 according to the present embodiment is configured by plastically deforming a long metal plate member.

FIG. 5 omits the illustration of the vibration transmission portion 3 and the bolts 30*a*, 30*b*, 30*h*, 30*g*, 30*j*, and 30*i*. The reference numerals 31*h* and 31*g* in the elastically deformed portion 11*b* in FIG. 5 represent through-holes for the bolts 30*g* and 30*h* to fasten the spring unit 10A to the vibration transmission portion 3. The reference numerals 31*m* and 31*k* represent through-holes for the bolts 30*m* and 30*k* to fasten the spring unit 10B to the vibration transmission portion 3.

Concerning the spring unit 20A in FIG. 1, one region in the D4 direction 210 of the elastically deformed portion 21*a* is secured to one side in the X direction of the vibration source 2 by fastening bolts 30*e* and 30*f*. Concerning the spring unit 20A, another region in the X direction 211X of elastically deformed portion 21*b* is secured to the support portion 3*b* of the vibration transmission portion 3 by fastening the bolts 30*g* and 30*h*.

Specifically, the spring unit 20A includes leaf springs 21, 22, and 23. As illustrated in FIGS. 1, 3, and 4, the leaf spring 21 includes the elastically deformed portions 21*a* and 21*b*, and the bent portion 21*c*. The elastically deformed portions 21*a* and 21*b*, and bent portion 21*c* according to the present embodiment configure an integrated formation as an integrated leaf spring.

The elastically deformed portion 21*a* represents a fourth elastically deformed portion formed into a plate to be thick in the X direction and longitudinal being orthogonal to the X direction. In other words, the elastically deformed portion 21*a* is formed into a long plate extending in the D4 direction, as illustrated in FIGS. 1 and 6. The elastically deformed portion 21*a* is formed to extend to one side in the Z direction toward one side in the Z direction.

The elastically deformed portion 21*a* and elastically deformed portion 21*b*, along with the bent portion 21*c*, configure the leaf spring 21 (second leaf spring). According to the present embodiment, the elastically deformed portion 21*a* and the elastically deformed portion 21*b*, along with the bent portion 21*c*, configure a vibration transmission path (path) through which vibrations are transmitted from the vibration source 2 to the vibration transmission portion 3.

The X direction corresponds to the thickness direction (fourth thickness direction) of the elastically deformed portion 21*a*. The D4 direction is orthogonal to the X direction and slopes relative to the Y direction and the Z direction. The Y direction is a first orthogonal direction that is also orthogonal to the Z direction. The Z direction is a second orthogonal direction that is orthogonal to the X direction and the Y direction.

As illustrated in FIG. 4, the elastically deformed portion 21*a* configures a surface 211*a* (first surface) that flatly extends in the direction orthogonal to the X direction. As illustrated in FIG. 1, one region in the D4 direction 210 of the elastically deformed portion 21*a* is secured to one side in the X direction of the vibration source 2 by fastening the bolts 30*e* and 30*f*. As illustrated in FIG. 6, the bolts 30*a* and 30*f* are aligned in the Y direction. The bolts 30*b* and 30*e* are aligned in the Y direction.

The elastically deformed portion 21*b* represents a third elastically deformed portion formed into a plate that is thick in the D5 direction of FIG. 4 and expands in a direction orthogonal to the D5 direction. In other words, the elastically deformed portion 21*b* is formed into a long plate extending in the X direction.

The elastically deformed portion 21*b* configures surfaces 211*b* and 211*c* that flatly expand in the direction orthogonal to the D5 direction. The surfaces 211*b* and 211*c* are aligned in the D5 direction. The surface 211*b* is located at one side in the D5 direction relative to the surface 211*c*.

The D5 direction represents a thickness direction (third thickness direction) of the elastically deformed portion 21*b*. The D5 direction is orthogonal to the X direction and slopes relative to the Y direction and the Z direction.

As illustrated in FIG. 4, another region in the X direction 211X of the elastically deformed portion 21*b* is secured to the support portion 3*b* of the vibration transmission portion 3 by fastening the bolts 30*g* and 30*h*. Another region in the X direction 211X is placed on another side in the X direction relative to the surfaces 211*b* and 211*c* of the elastically deformed portion 21*b*.

The bent portion 21*c* configures a connection portion that connects the other end in the D4 direction of the elastically deformed portion 21*a* and one end in the X direction of the elastically deformed portion 21*b*.

The elastically deformed portions 21*a* and 21*b*, and the bent portion 21*c* configure an integrated formation as an integrated leaf spring. The leaf spring 21 according to the present embodiment is configured by plastically deforming a long metal plate member.

As illustrated in FIGS. 1, 3, and 4, the leaf spring 22 includes elastically deformed portions 22*a* and 22*b*, and a bent portion 22*c*. The elastically deformed portions 22*a* and 22*b*, and the bent portion 22*c* according to the present embodiment configure an integrated formation configured as an integrated leaf spring.

The elastically deformed portion 22*a* is formed into a plate to be thick in the X direction and longitudinal being orthogonal to the X direction. In other words, the elastically deformed portion 22*a* is formed into a plate extending in the D4 direction, as illustrated in FIG. 1. The elastically deformed portion 22*a* is formed to extend to the other side in the Y direction toward one side in the Z direction.

The elastically deformed portion 22*a* is located on one side in the X direction relative to the elastically deformed portion 21*a*. One region in the D4 direction 220 of the elastically deformed portion 22*a* is secured to one side in the X direction of the vibration source 2 by fastening the bolts 30*e* and 30*f*.

Specifically, the bolts 30*e* and 30*f* secure one region in the D4 direction 220 of the elastically deformed portion 22*a*, along with one region in the D4 direction 210 of elastically deformed portion 21*a*, to one side in the X direction of the vibration source 2.

The elastically deformed portion 22*b* is formed into a plate to be thick in the D5 direction and longitudinal being orthogonal to the D5 direction. In other words, the elastically deformed portion 22*b* is formed into a long plate extending in the X direction, as illustrated in FIGS. 1 and 4. The elastically deformed portion 22*b* is located on the other side in the D5 direction relative to the elastically deformed portion 21*b*.

As illustrated in FIGS. 1 and 4, another region in the X direction 221X of the elastically deformed portion 22*b* is open to the vibration transmission portion 3 and the leaf spring 21. The elastically deformed portion 22*b* previously has an elastic force that pushes another region in the X direction 221X against the surface 211*c* of the leaf spring 21.

The elastic force allowing the elastically deformed portion 22*b* to push another region in the X direction 221X against the surface 211*c* of the leaf spring 21 is hereinafter also referred to as precompression.

As described below, another region in the X direction 221X of the elastically deformed portion 22*b* vibrates to generate sliding friction on the surface 211*c* of the elastically deformed portion 21*b* of the leaf spring 21 to attenuate the vibration of the leaf spring 21.

The bent portion 22*c* connects the other end in the D4 direction of the elastically deformed portion 22*a* with one end in the X direction of the elastically deformed portion 22*b*. The leaf spring 12 according to the present embodiment is configured by plastically deforming a long and thin metal plate member.

The leaf spring 23 includes elastically deformed portions 23*a* and 23*b* and a bent portion 23*c*. The elastically deformed portions 23*a* and 23*b*, and the bent portion 23*c* according to the present embodiment configure an integrated formation configured as an integrated leaf spring.

The elastically deformed portion 23*a* is formed into a plate to be thick in the X direction and longitudinal being orthogonal to the X direction. In other words, the elastically deformed portion 23*a* is formed into a long plate extending in the D4 direction, as illustrated in FIG. 1. The elastically deformed portion 23*a* is formed to extend to another side in the Y direction toward one side in the Z direction.

The elastically deformed portion 23*a* is located on another side in the X direction relative to the elastically deformed portion 21*a*. One region in the D4 direction 230 of the elastically deformed portion 23*a* is secured to one side in the X direction of the vibration source 2 by fastening the bolts 30*e* and 30*f*.

In detail, the bolts 30*e* and 30*f* secure one region in the D4 direction 230 of the elastically deformed portion 23*a*, along with one region in the D4 direction 210 of the elastically deformed portion 21*a* and one region in the D4 direction 220 of the elastically deformed portion 22*a*, to one side in the X direction of the vibration source 2.

The elastically deformed portion 23*b* is formed into a plate to be thick in the D5 direction and longitudinal being orthogonal to the D5 direction. In other words, the elastically deformed portion 23*b* is formed into a long plate extending in the X direction, as illustrated in FIG. 4. Moreover, the elastically deformed portion 23*b* is located on one side in the D5 direction relative to the elastically deformed portion 11*b*.

As illustrated in FIGS. 3 and 4, another region in the X direction 231 of the elastically deformed portion 23*b* is open to the vibration transmission portion 3 and the leaf spring 21. The elastically deformed portion 23*b* previously has an elastic force that pushes another region in the X direction 231 against the surface 211*b* of the leaf spring 21.

The elastic force allowing the elastically deformed portion 23*b* to push another region in the X direction 231 against the surface 211*b* of the leaf spring 21 is hereinafter also referred to as precompression.

As described below, another region in the X direction 231 of the elastically deformed portion 23*b* vibrates to generate sliding friction on the surface 211*b* of the elastically deformed portion 21*b* of the leaf spring 21 to attenuate the vibration of the leaf spring 21.

The leaf springs 22 and 23 according to the present embodiment vibrate to generate sliding friction on the leaf spring 21 and thereby configure a second vibration attenuating member to attenuate the vibration of the leaf spring 21.

The bent portion 23*c* connects the other end in the D4 direction of the elastically deformed portion 23*a* with one end in the X direction of the elastically deformed portion 23*b*. The leaf spring 23 according to the present embodiment is configured by plastically deforming a long metal plate member.

Concerning the spring units 10A and 20A configured as above, the D1 direction as the longitudinal direction of the elastically deformed portions 11*a*, 12*a*, and 13*a* intersects (for example, orthogonally) the D4 direction as the longitudinal direction of the elastically deformed portions 21*a*, 22*a*, and 23*a*.

The D2 direction as the thickness direction of the elastically deformed portions 11*b*, 12*b*, and 13*b* intersects (for example, orthogonally) the D5 direction as the thickness direction of the elastically deformed portions 21*b*, 22*b*, and 23*b*.

The X direction as the thickness direction of the elastically deformed portions 11*a*, 12*a*, and 13*a* intersects (for example, orthogonally) the D2 direction as the thickness direction of the elastically deformed portions 11*b*, 12*b*, and 13*b*.

The X direction as the thickness direction of the elastically deformed portions 21*a*, 22*a*, and 23*a* intersects (for example, orthogonally) the D5 direction as the thickness direction of the elastically deformed portions 21*b*, 22*b* and 23*b*.

As illustrated in FIG. 1, the spring unit 10B connects the support portion 3*c* of the vibration transmission portion 3 with another side in the X direction of the vibration source 2. The spring units 10B and 10A are symmetrically configured in the X direction.

Specifically, the spring unit 10B includes leaf springs 11B, 12B, and 13B. The leaf springs 11B and 11 are symmetrically configured in the X direction. The leaf springs 12B and 12 are symmetrically configured in the X direction. The leaf springs 13B and 13 are symmetrically configured in the X direction.

One end of the leaf spring 11B is secured to another side in the X direction of the vibration source 2 by fastening two bolts. The other end of the leaf spring 11B is secured to the support portion 3*c* of the vibration transmission portion 3 by fastening the bolts 30*k* and 30*m*.

As illustrated in FIG. 1, the spring unit 20B connects the support portion 3*d* of the vibration transmission portion 3 with another side in the X direction of the vibration source 2. The spring unit 20B and 20A are symmetrically configured in the X direction.

The spring unit 20B includes leaf springs 21B, 22B, and 23B. The leaf springs 21B and 21 are symmetrically configured in the X direction. The leaf springs 22B and 22 are symmetrically configured in the X direction. The leaf springs 23B and 23 are symmetrically configured in the X direction. A detailed description of the configurations of the spring unit 10B and the spring unit 20B is omitted for brevity.

One end of the leaf spring 21B is secured to another side in the X direction of vibration source 2 by fastening two bolts. The other end of the leaf spring 21B is secured to the support portion 3*d* of the vibration transmission portion 3 by fastening the bolts 30*i* and 30*j*. Reference numerals 31*j* and 31*i* on the spring unit 20B in FIG. 5 represent through-holes for the bolts 30*j* and 30*i* to fasten the spring unit 20B to the vibration transmission portion 3.

The description below explains operations of the anti-vibration device 1 according to the present embodiment.

The vibration source 2 operates to generate vibration. The vibration generated from the vibration source 2 is transmitted to the elastically deformed portion 11*a*, the bent portion 11*c*, and the elastically deformed portion 11*b* of the leaf spring 11.

At this time, the elastically deformed portion 11*a* is elastically deformed by the vibration transmitted from the vibration source 2 and vibrates in the X direction. The elastically deformed portion 11*b* is elastically deformed by the vibration transmitted from the vibration source 2 and vibrates in the D2 direction. Namely, the elastically deformed portions 11*a* and 11*b* each vibrate in the thickness direction due to the elastic deformation. Therefore, each of the elastically deformed portions 11*a* and 11*b* can attenuate the vibration transmitted from the vibration source 2.

At this time, the elastically deformed portion 12*b* uses the elastic force to press another region in the X direction 121 against the surface 111*c* of the elastically deformed portion 11*b* of the leaf spring 11. Then, another region in the X direction 121 vibrates to generate sliding friction on the surface 111*c* of the elastically deformed portion 11*b* of the leaf spring 11. Consequently, another region in the X direction 121 of the elastically deformed portion 12*b* can attenuate the vibration of the elastically deformed portion 11*b* of the leaf spring 11.

The elastically deformed portion 13*b* uses the elastic force to press another region in the X direction 131 against the surface 111*b* of the elastically deformed portion 11*b* of the leaf spring 11. At this time, another region in the X direction 131 vibrates to generate sliding friction on the surface 111*b* of the elastically deformed portion 11*b* of the leaf spring 11. Consequently, another region in the X direction 131 of the elastically deformed portion 13*b* can attenuate the vibration of the elastically deformed portion 11*b* of the leaf spring 11.

The spring unit 10A can inhibit transmission of the vibration from the vibration source 2 to the support portion 3*a* of the vibration transmission portion 3. In addition, the spring unit 10A can inhibit transmission of the vibration from the vibration transmission portion 3 to the vibration source 2.

The vibration generated from the vibration source 2 is also transmitted to the elastically deformed portion 21*a*, the bent portion 21*c*, and the elastically deformed portion 21*b* of the leaf spring 21.

At this time, the elastically deformed portion 21*a* is elastically deformed by the vibration transmitted from the vibration source 2 and vibrates in the X direction. The elastically deformed portion 21*b* is elastically deformed by the vibration transmitted from the vibration source 2 and vibrates in the D5 direction. Namely, the elastically deformed portions 21*a* and 21*b* each vibrate in the thickness direction due to the elastic deformation. Therefore, each of the elastically deformed portions 21*a* and 21*b* can attenuate the vibration transmitted from the vibration source 2.

The elastically deformed portion 23*b* uses the elastic force to press another region in the X direction 221X against the surface 211*c* of the elastically deformed portion 21*b* of the leaf spring 21. At this time, another region in the X direction 221X vibrates to generate sliding friction on the surface 211*c* of the elastically deformed portion 21*b* of the leaf spring 21. Consequently, another region in the X direction 221X of the elastically deformed portion 22*b* can attenuate the vibration of the elastically deformed portion 21*b* of the leaf spring 21.

The elastically deformed portion 23*b* uses the elastic force to press another region in the X direction 231 against the surface 211*b* of the elastically deformed portion 21*b* of the leaf spring 21. At this time, another region in the X direction 231 vibrates to generate sliding friction on the surface 211*b* of the elastically deformed portion 21*b* of the leaf spring 21. Consequently, another region in the X direction 231 of the elastically deformed portion 23*b* can attenuate the vibration of the elastically deformed portion 21*b* of the leaf spring 21.

As above, the spring unit 20A can inhibit the vibration of the vibration source 2 from being transmitted to the support portion 3*b* of the vibration transmission portion 3 via the leaf spring 21.

Like the spring unit 10A, the spring unit 10B can inhibit the vibration of the vibration source 2 from being transmitted to the support portion 3*c* of the vibration transmission portion 3.

Like the spring unit 20A, the spring unit 20B can inhibit the vibration of the vibration source 2 from being transmitted to the support portion 3*d* of the vibration transmission portion 3.

According to the above-described embodiment, the anti-vibration device 1 includes the leaf springs 11 and 21 secured to the vibration source 2 and the vibration transmission portion 3.

The leaf spring 11 is formed into a plate being thick in the X direction. The leaf spring 11 configures a vibration transmission path through which vibration is transmitted from the vibration source 2 to the vibration transmission portion 3. The leaf spring 11 further includes the elastically deformed portion 11*a* that is elastically deformed by vibration transmitted from the vibration source 2 and vibrates in the X direction. The leaf spring 21 is formed into a plate being thick in the X direction. The leaf spring 21 configures the above-described vibration transmission path. The leaf spring 21 further includes the elastically deformed portion 21*a* that is elastically deformed by vibration transmitted from the vibration source 2 and vibrates in the X direction.

The leaf spring 11 is formed into a plate being thick in the D2 direction. The leaf spring 11 configures the above-described vibration transmission path. The leaf spring 11 further includes the elastically deformed portion 11*b* that is elastically deformed by vibration transmitted from the vibration source 2 and vibrates in the D2 direction. The leaf spring 21 is formed into a plate being thick in the D5 direction. The leaf spring 21 includes the elastically deformed portion 21*b* that is elastically deformed by vibration transmitted from the vibration source 2 and vibrates in the D5 direction.

The X direction and the D2 direction are configured differently from each other (for example, orthogonally). The X direction and the D5 direction are configured differently from each other (for example, orthogonally). The D2 direction and the D5 direction are configured differently from each other (for example, orthogonally).

Therefore, the anti-vibration device 1 vibrates in three different directions (X, D2, and D5 directions) due to vibration transmitted from the vibration source 2. Therefore, it is possible to attenuate vibrations in the three directions transmitted from the vibration source 2 to the vibration transmission portion 3.

Figure 7:
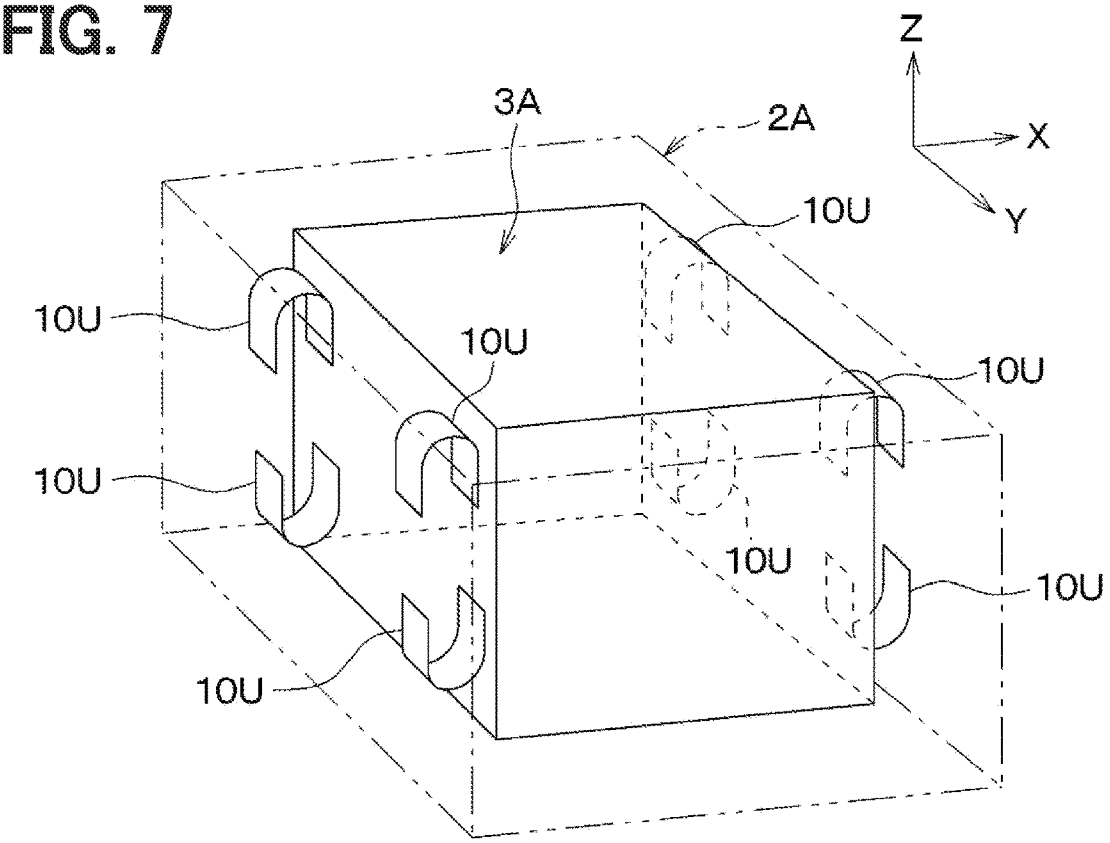
FIG. 7 is a perspective view of multiple U-shaped leaf springs (viewed through the vibrating body) positioned between the anti-vibration support and the vibrating body according to a first comparative example of the first embodiment.

As illustrated in FIG. 7, the anti-vibration device according to a first comparative example is proposed to provide anti-vibration through the use of multiple U-shaped leaf springs 10U secured to an anti-vibration support 3A and a vibrating body 2A. Each of the multiple U-shaped leaf springs 10U is formed by bending a long plate into a U shape being thick in the X and Z directions and wide in the Y direction in the Cartesian coordinates.

Each of the U-shaped leaf springs 10U indicates low rigidity in the X and Z directions and high rigidity in the Y direction. The U-shaped leaf springs 10U can facilitate bending deformation in the X and Z directions. It is possible to inhibit vibrations in the X and Z directions from being transmitted from the vibrating body 2A to the anti-vibration support 3A.

According to the present embodiment, however, the anti-vibration device 1 is thick in three different directions (X, D2, and D5 directions) and vibrates, by elastic deformation, in the three different directions due to the vibration transmitted from the vibration source 2. It is possible to attenuate vibrations transmitted from the vibration source 2 in the three directions. Therefore, it is possible to reduce vibration generated from the vibration source 2.

As above, it is possible to provide the anti-vibration device 1 characterized by the improved anti-vibration performance so that the vibration source 2 is inhibited from transmitting vibrations to the vibration transmission portion 3.

The present embodiment configured as above can provide the following operations and effects (a), (b), (c), (d), (e), (f), (g), (h), (i), (j), and (k). (a) The elastically deformed portion 11*a* configures the surface 111*a* flatly spreading in a direction orthogonal to the X direction. The elastically deformed portion 21*a* configures the surface 211*a* flatly spreading in a direction orthogonal to the X direction. The elastically deformed portion 11*b* configures the surfaces 111*b* and 111*c* flatly spreading in a direction orthogonal to the D2 direction. The elastically deformed portion 21*b* configures surfaces 211*b* and 211*c* that flatly expand in the direction orthogonal to the D5 direction.

The surfaces 111*a* and 211*a* (first surfaces) are non-parallel to the surfaces 111*b* and 111*c* (second surfaces). The surfaces 111*b* and 111*c* are non-parallel to the surfaces 211*b* and 211*c* (third surfaces). The surfaces 211*b* and 211*c* are non-parallel to the surfaces 111*a* and 211*a*.

Specifically, the X direction as the thickness direction of the surfaces 111*a* and 211*a* is orthogonal to the D2 direction as the thickness direction of the surfaces 111*b* and 111*c*. The D2 direction as the thickness direction of the surfaces 111*b* and 111*c* is orthogonal to the D5 direction as the thickness direction of the surfaces 211*b* and 211*c*. The D5 direction as the thickness direction of the surfaces 211*b* and 211*c* is orthogonal to the X direction as the thickness direction of the surfaces 111*a* and 211*a*.

The anti-vibration device 1 is composed of the leaf springs having the three thickness directions such as D2, D5, and X. It is possible to attenuate vibrations transmitted from the vibration source 2 in the three directions. It is possible to more reliably reduce vibrations generated from the vibration source 2. (b) The elastically deformed portions 11*a* and 11 *b* along with the bent portion 11*c* configure the leaf spring 11 as an integrated formation. The elastically deformed portions 21*a* and 21*b* along with the bent portion 21*c* configure the leaf spring 21 as an integrated formation.

The elastically deformed portion 11*a* is formed to extend in the D1 direction as the longitudinal direction orthogonal to the X direction. The elastically deformed portion 21*a* is formed to extend in the D4 direction as the longitudinal direction orthogonal to the X direction. The D1 and D4 directions are configured differently from each other (for example, orthogonally).

Two leaf springs such as the leaf springs 11 and 21 configured as above can provide the anti-vibration device 1 indicating high anti-vibration performance. (c) Concerning the leaf spring 12, one region in the D1 direction 120 is secured to the vibration source 2. Another region in the X direction 121 is open to the vibration transmission portion 3 and the leaf spring 11. Concerning the leaf spring 13, one region in the D1 direction 130 is secured to the vibration source 2. Another region in the X direction 131 is open to the vibration transmission portion 3 and the leaf spring 11.

Another region in the X direction 121 of the leaf spring 12 vibrates to generate sliding friction on the surface 111*c* of the leaf spring 11 and attenuates the vibration of the leaf spring 11. Another region in the X direction 131 of the leaf spring 13 vibrates to generate sliding friction on the surface 111*b* of the leaf spring 11 and attenuates the vibration of the leaf spring 11.

Concerning the leaf spring 22, one region in the D4 direction 220 is secured to the vibration source 2. Another region in the X direction 221X is open to the vibration transmission portion 3 and the leaf spring 21. Concerning the leaf spring 23, one region in the D4 direction 230 is secured to the vibration source 2. Another region in the X direction 231X is open to the vibration transmission portion 3 and the leaf spring 21.

Concerning the leaf spring 22, another region in the X direction 221X vibrates to generate sliding friction on the surface 211*c* of the leaf spring 21 and attenuates the vibration of the leaf spring 21. Concerning the leaf spring 23, another region in the X direction 231 vibrates to generate sliding friction on the surface 211*b* of the leaf spring 21 and attenuates the vibration of the leaf spring 21.

The anti-vibration device 1 according to the present embodiment can cause the sliding friction to attenuate vibrations transmitted from the vibration source 2 to the vibration transmission portion 3 via the leaf springs 11 and 21 through the use of the leaf springs 12, 13, 22, and 23.

Figure 8:
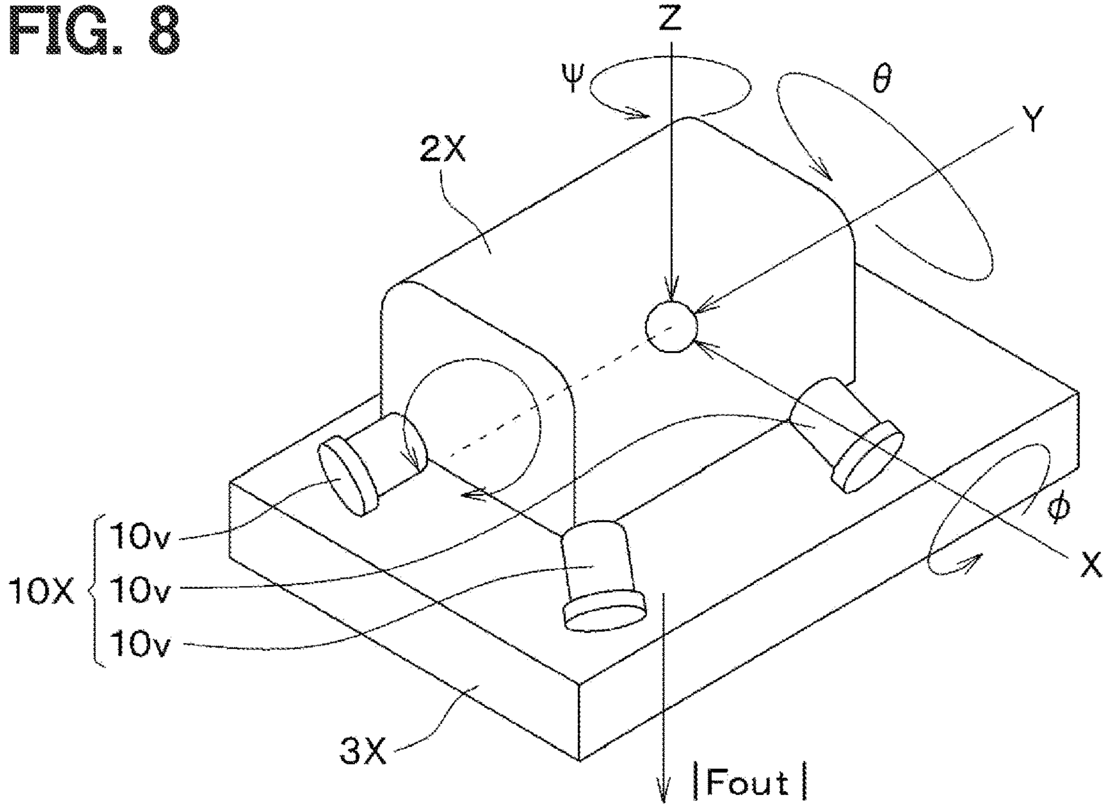
FIG. 8 is a diagram illustrating multiple anti-vibration members placed between a vibration source and a vibration transmission portion according to a second comparative example of the first embodiment, and provides a supplemental explanation about frequency characteristics of loads generated from the vibration source.

As illustrated in FIG. 8, the anti-vibration device 10X is placed between the vibration source 2X and the vibration transmission portion 3X to provide vibration insulation for a traction engine as the vibration source 2X. In this case, the inventors consider it necessary to insulate only vibrations during idling.

The anti-vibration device 10X illustrated in FIG. 8 includes multiple anti-vibration members 10*v* placed between the vibration source 2X and the vibration transmission portion 3X.

Figure 9:
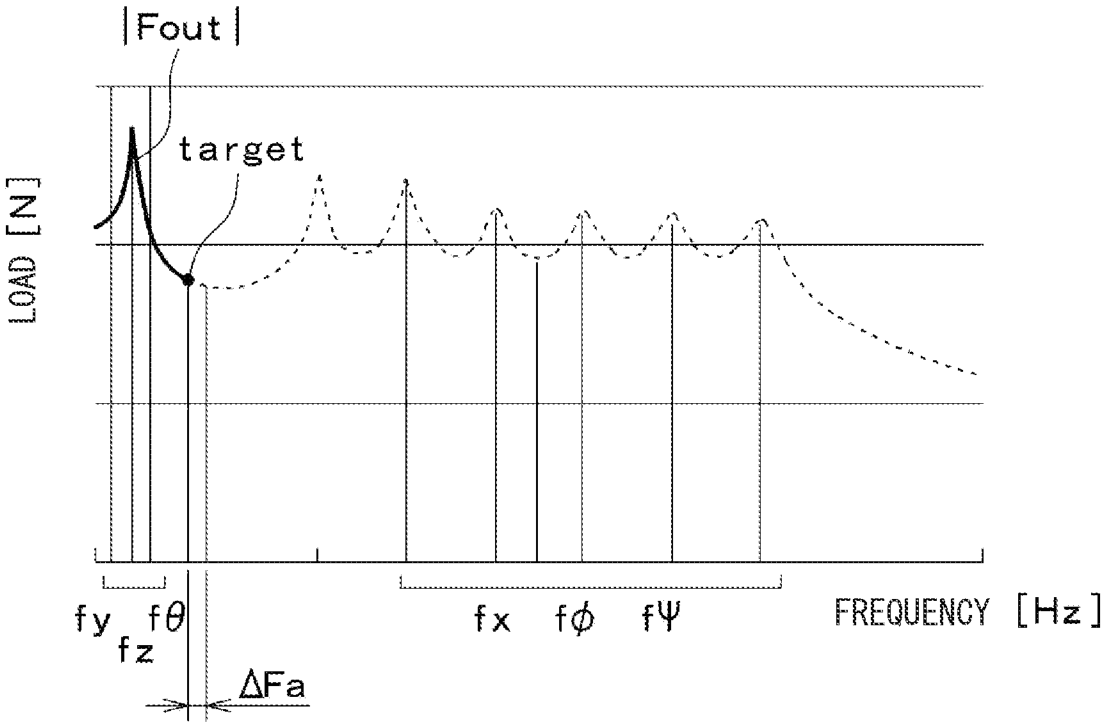
FIG. 9 is a diagram illustrating the relationship between a load and a vibration frequency generated during idling of a traction engine as a vibration source according to the second comparative example.

As illustrated in FIG. 9, the idling traction engine increases only loads Fz, Fy, and Fθ generated by traction engine vibrations. Load Fz is applied in the Z direction. Load Fy is applied in the Y direction. Load Fθ is applied in the θ direction.

When the anti-vibration device 10X is used to insulate the traction engine, it is necessary to decrease the rigidity in only the three directions Z, Y, and θ of the anti-vibration device 10X. The vibration is attenuated as a result of aggregating resonance frequencies fz, fy, and fθ in the Z, Y, and θ directions into a predetermined range ΔFa. This makes it possible to improve the anti-vibration effect of the anti-vibration device 10X.

The traction engine operating at a high revolution generates loads Fx, Fy, Fz, Fθ, Fϕ, and Fψ corresponding to six degrees of freedom. Load Fz is applied in the Z direction. Load Fψ Y is applied in the ψ direction.

However, a decrease in the rigidity of the anti-vibration device 10X in directions other than Z, Y, and θ above increases the vibration of the traction engine during high-speed travel, degrading the running stability of the vehicle. The vibration can be attenuated by aggregating resonance frequencies fz, fy, and fθ in the Z, Y, and θ directions into the predetermined range ΔFa.

In FIG. 9, the graph "target" indicates an example where the anti-vibration device 10X aggregates resonance frequencies fz, fy, and fθ into the predetermined range Δfa.

Figure 10:
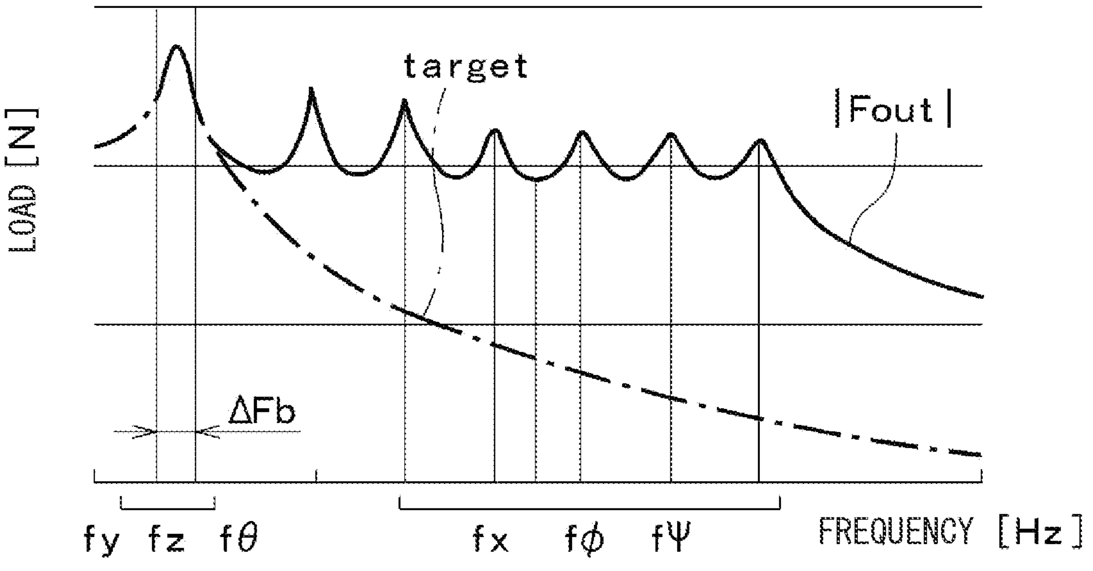
FIG. 10 is a diagram illustrating the relationship between a load and a vibration frequency generated from a compressor for an onboard air-conditioning system as a vibration source according to the second comparative example.

Suppose the anti-vibration device 10X inhibits the vibration of the electric compressor as the vibration source 2X from being transmitted to the vibration transmission portion 3X. Then, the electric compressor vibrates at frequencies from a low-frequency range to a high-frequency range. In this case, as illustrated in FIG. 10, it is necessary to attenuate resonance frequencies fx, fy, fz, fθ, fϕ, and fψ six directions of the electric compressor by aggregating these into a predetermined range ΔFb.

In FIG. 9, the graph "target" indicates an example where the anti-vibration device 10X aggregates resonance frequencies fx, fy, fz, fθ, fϕ, and fψ the electric compressor into the predetermined range Δfb.

As above, the anti-vibration device 1 according to the present embodiment includes the leaf springs 11 and 21 being thick in the three directions D2, D5, and X. As described below, it is possible to aggregate resonance frequencies fx, fy, fz, fθ, fϕ, and fψ determined by the vibration source 2 and the spring units 10A and 10B into a predetermined range capable of satisfying vibration insulation and durability.

Figure 11:
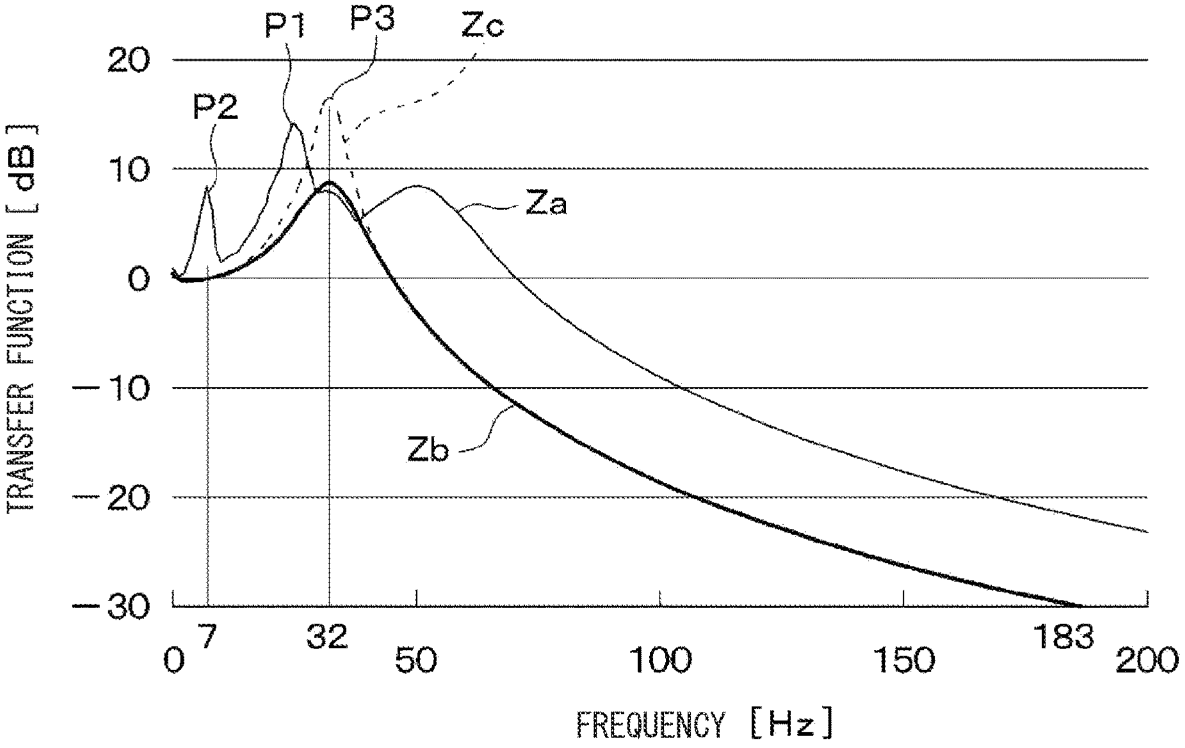
FIG. 11 is a diagram illustrating frequency characteristics of the transfer function of vibration transmitted from the vibration source to the vibration transmission portion based on whether or not the anti-vibration device according to the first embodiment is provided.

In FIG. 11, graph Za indicates frequency characteristics of the transfer function of vibrations transmitted from the vibration source 2 to the vibration transmission portion 3 when the vibration source 2 is directly secured to the vibration transmission portion 3 without providing the anti-vibration device 1 according to the present embodiment. Graph Zb indicates frequency characteristics of the transfer function of vibrations transmitted from vibration source 2 to vibration transmission portion 3 when the anti-vibration device 1 according to the present embodiment is provided. Graph Zc indicates frequency characteristics of the transfer function of vibrations transmitted from vibration source 2 to vibration transmission portion 3 without providing the leaf springs 12, 13, 22, and 23 of the spring units 10A and 20A of the anti-vibration device 1. Namely, graph Zc indicates frequency characteristics of the vibration transfer function of vibrations of the leaf springs 11 and 21 of the spring units 10A and 20A of the anti-vibration device 1.

When the anti-vibration device 1 is not used, graph Za in FIG. 11 indicates peaks P1 and P2 occurring in the low-frequency band in terms of the transfer function of vibrations transmitted from the vibration source 2 to the vibration transmission portion 3.

In the low-frequency band, vibrations increase displacements of the anti-vibration device 1 and the vibration source 2. A consequence is to degrade the durability of each of the vibration source 2 and the anti-vibration device 1. In addition, the vibration source 2 and the anti-vibration device 1 may interfere with other nearby components.

Resonance frequencies fx, fy, fz, fθ, fϕ, and fψ need to be aggregated into a predetermined range capable of satisfying vibration insulation and durability. Therefore, the anti-vibration device 1 according to the present embodiment needs to bring rigidity properties in the X, Y, and Z directions (or the θ, ϕ, and ψ directions) close to the same value.

The anti-vibration device 1 according to the present embodiment is composed of the leaf springs 11 and 21 whose thickness directions correspond to the three directions as described above. The anti-vibration device 1 can bring rigidity properties in the X, Y, and Z directions (or θ, ϕ, and ψ directions) close to the same value. Resonance frequencies fx, fy, fz, fθ, fϕ, and fψ can be aggregated into a predetermined range capable of satisfying vibration insulation and durability.

Graph Zc in FIG. 11 indicates peak P3 occurring at the frequency of 32 Hz as a trade-off of aggregating resonance frequencies fx, fy, fz, fθ, fϕ, fψ into the predetermined range, degrading the anti-vibration effect at the frequency of 32 Hz.

However, as indicated by graph Zb, the present embodiment can inhibit the anti-vibration effect from degrading by decreasing peak P3 based on the vibration-damping effect of the leaf springs 12, 13, 22, and 23 of the anti-vibration device 1 described above. (d) The U-shaped leaf spring 10U causes low rigidity in the X and Z directions and high rigidity in the Y direction. The U-shaped leaf spring 10U can attenuate vibrations in the X and Z directions, but not those in the Y direction, out of vibrations transmitted from the vibrating body 2A.

To decrease the rigidity in the Y direction, it is necessary to increase the division result of dividing thickness Ta by width Wh of the U-shaped leaf spring 10U. However, an increase in the division result degrades the strength of the U-shaped leaf spring 10U. It is difficult to achieve an excellent anti-vibration effect against excitation forces in the three directions X, Y, and Z.

Figure 12:
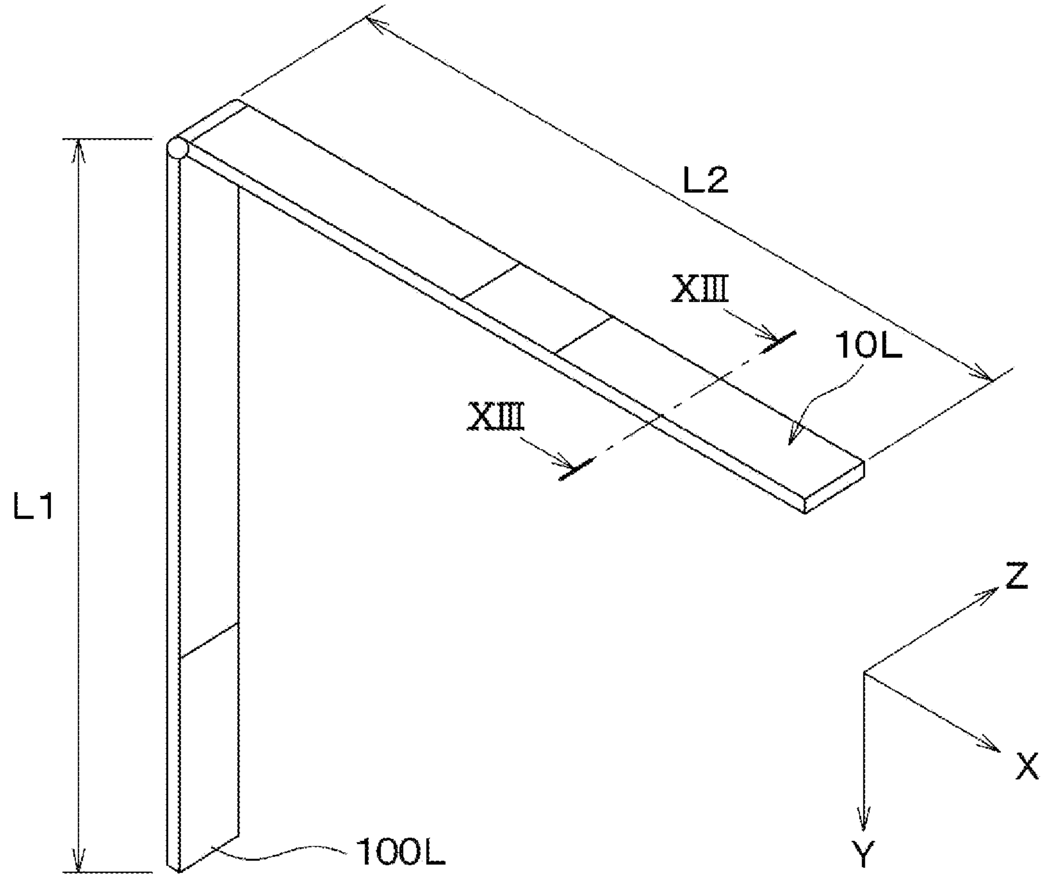
FIG. 12 is a perspective view illustrating the leaf spring according to a third comparative example and is used to explain that the strength of the leaf spring deteriorates according to an increase in a division result from dividing the thickness of the leaf spring by its width.

FIG. 12 illustrates a leaf spring 10L as the anti-vibration device in which dimension L1 in the Y direction is 100 mm, dimension L2 in the X direction is 53.2 mm, and a lower end 100L is secured to the vibration transmission portion.

Figure 13:
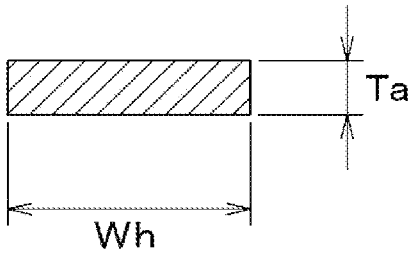
FIG. 13 is a section view of the leaf spring taken along the line XIII-XIII of FIG. 12.

Ta in FIG. 13 indicates the thickness of the leaf spring 10L. Wh in FIG. 13 indicates the width of the leaf spring 10L.

Figure 14:
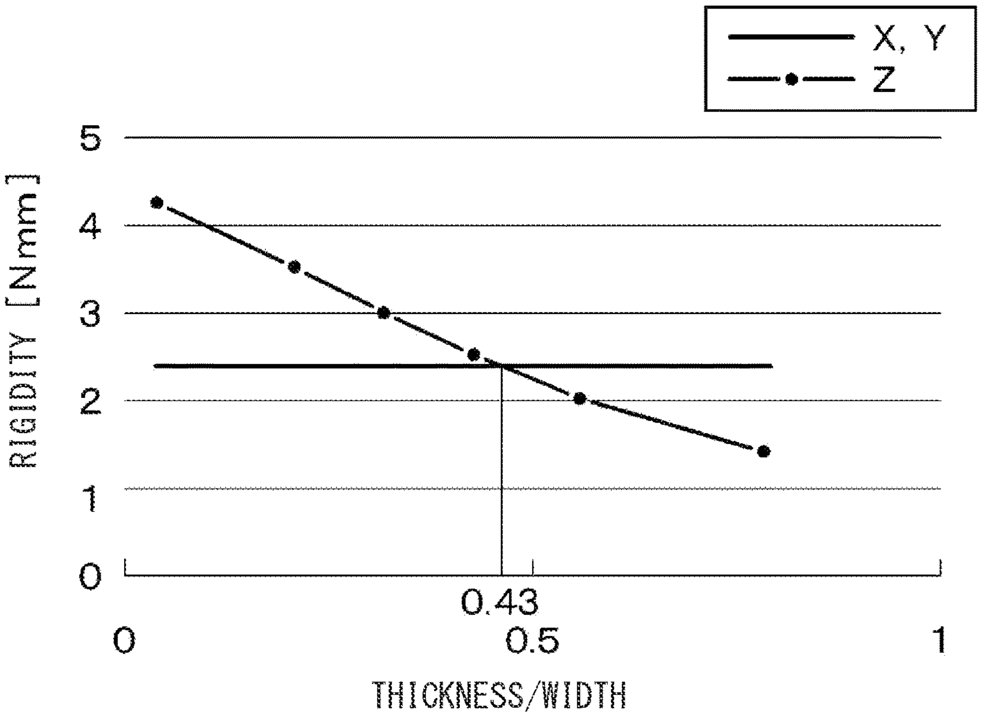
FIG. 14 is a diagram illustrating the relationship between the above-described division result and the rigidity in the directions of X, Y, and Z concerning the leaf spring according to the third comparative example of FIG. 12.
Figure 15:
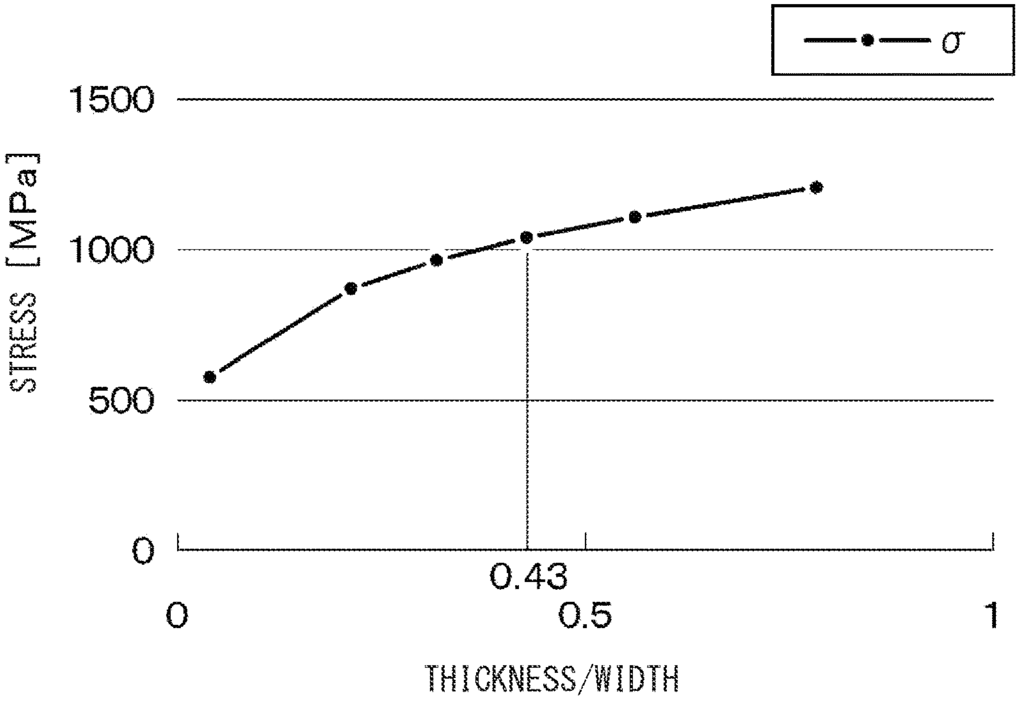
FIG. 15 is a diagram illustrating the above-described division result and the stress acting on the lower end of the leaf spring according to the third comparative example of FIG. 12.

FIG. 14 illustrates the rigidity in each of the X, Y, and Z directions by varying the above-described division result when excitation forces in three directions X, Y, and Z are applied to the tip of the leaf spring 10L. The solid line graph in FIG. 14 indicates the rigidity in the X and Y directions. The dashed-dotted line graph in FIG. 14 indicates the rigidity in the Z direction. FIG. 15 illustrates stress a acting on the lower end 100L of the leaf spring 10L when the division result of the leaf spring 10L is varied.

As can be seen from FIG. 14, the division result needs to be set to 0.43 to provide the same rigidity in each of the X, Y, and Z directions. However, as can be seen from FIG. 15, the division result set to 0.43 causes the stress of 1000 N acting on the lower end 100L of the leaf spring 10L. The stress exceeds the strength limit of leaf spring 10L. It is practically difficult to provide the leaf spring 10L as an anti-vibration device.

Figure 16:
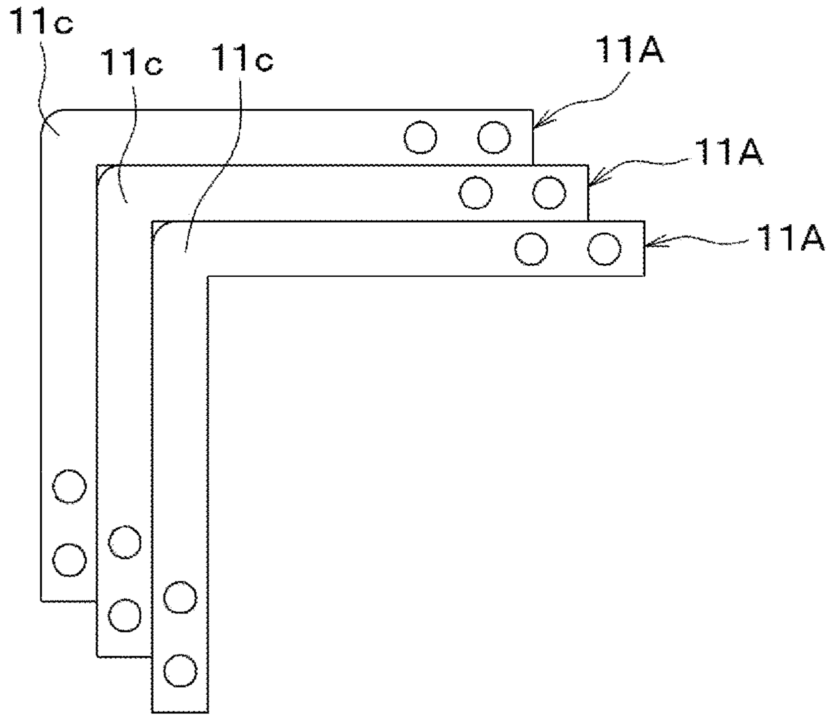
FIG. 16 is a diagram supplementing the explanation of a process to manufacture the leaf spring, made of plate material, used for the spring unit of the anti-vibration device according to the first embodiment illustrated in FIG. 1.
Figure 17:
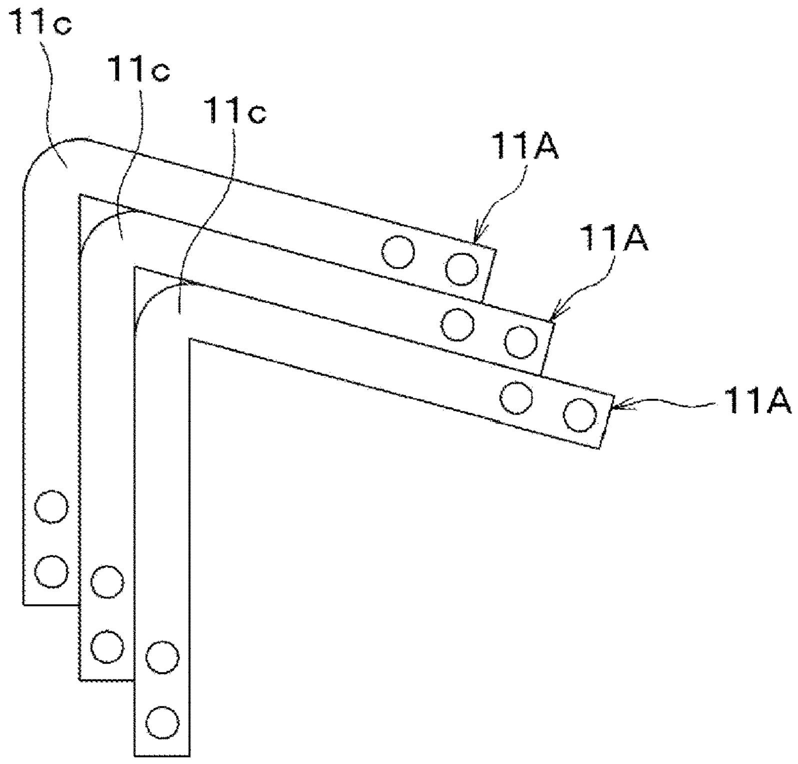
FIG. 17 is a diagram supplementing the explanation of a process to manufacture the leaf spring, made of plate material, used for the spring unit of the anti-vibration device according to the first embodiment illustrated in FIG. 1.

As above, the anti-vibration device 1 according to the present embodiment is composed of leaf springs whose thickness directions correspond to three directions D2, D5, and X. There is no need to use an excessively stiff spring. (e) The present embodiment fabricates multiple plate members 11A illustrated in FIG. 16 by press-punching one plate member. Each of the plate members 11A is bent to form one bent portion 11*c* for each plate member 11A and thereby fabricate the multiple leaf springs 11 from the multiple plate members 11A.

It is possible to reduce unused parts of one plate as a result of fabricating multiple leaf springs 11. Therefore, it is possible to improve the fabrication yield of multiple leaf springs 11.

Similarly, the multiple leaf springs 12 and 13 are also fabricated by press-punching a single plate member, making it possible to provide the same effect as the case of the multiple leaf springs 11.

(f) The description below explains the relationship among a longitudinal direction D1 of the elastically deformed portion 11*a* of the leaf spring 11, a longitudinal direction D4 of the elastically deformed portion 22*a* of the leaf spring 22, and a resonance frequency of the anti-vibration device 1 by reference to FIGS. 18, 19, and 20. For ease of explanation, the following description assumes that preset angle 81 is formed between the longitudinal directions D1 and Y and preset angle 82 is formed between the longitudinal directions D4 and X.

Figure 18:
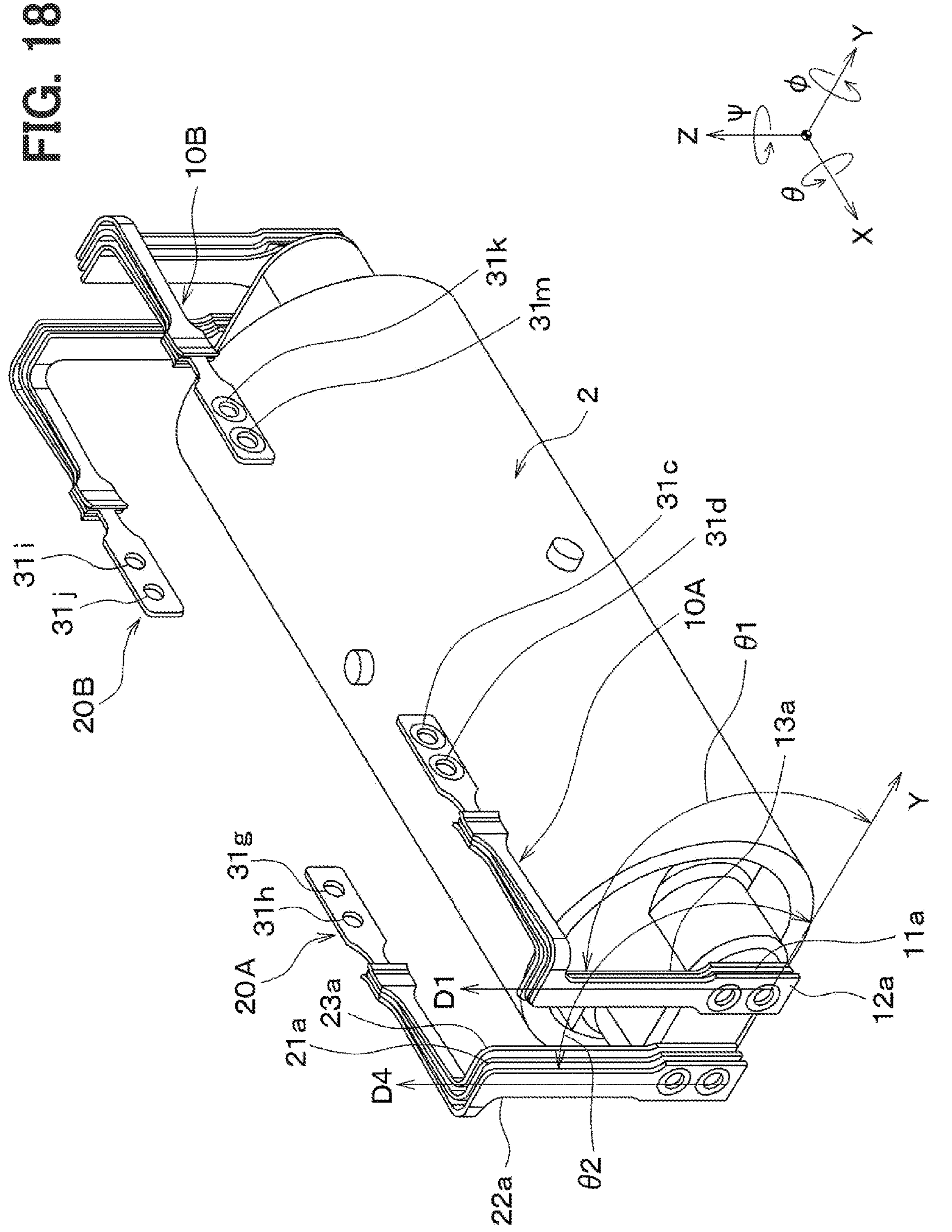
FIG. 18 is a perspective view of the same preset angle provided for two spring units of the anti-vibration device according to a fourth comparative example of the first embodiment and supplements the explanation of the positional relationship between the two spring units of the anti-vibration device.

As illustrated in FIG. 18, the longitudinal direction D1 of the elastically deformed portion 11*a* is parallel to the longitudinal direction D4 of the elastically deformed portion 22*a* of the leaf spring 22. θ1 and θ2 are set to the same 90 degrees. The difference between θ1 and θ2 is 0 degrees.

In FIG. 18, reference numerals 31*d* and 31*c* for the spring unit 10A represent through-holes for the bolts 31*d* and 30*c* to fasten the spring unit 10A to the vibration transmission portion 3. Reference numerals 31*h* and 31*g* for the spring unit 20A represent through-holes for the bolts 30*h* and 30*g* to fasten the spring unit 20A to the vibration transmission portion 3.

Reference numerals 31*m* and 31*k* for the spring unit 10B represent through-holes for the bolts 30*m* and 30*k* to fasten the spring unit 20A to the vibration transmission portion 3. Reference numerals 31*j* and 31*i* for the spring unit 20B represent through-holes for the bolts 30*j* and 30*i* to fasten the spring unit 20B to the vibration transmission portion 3.

Figure 19:
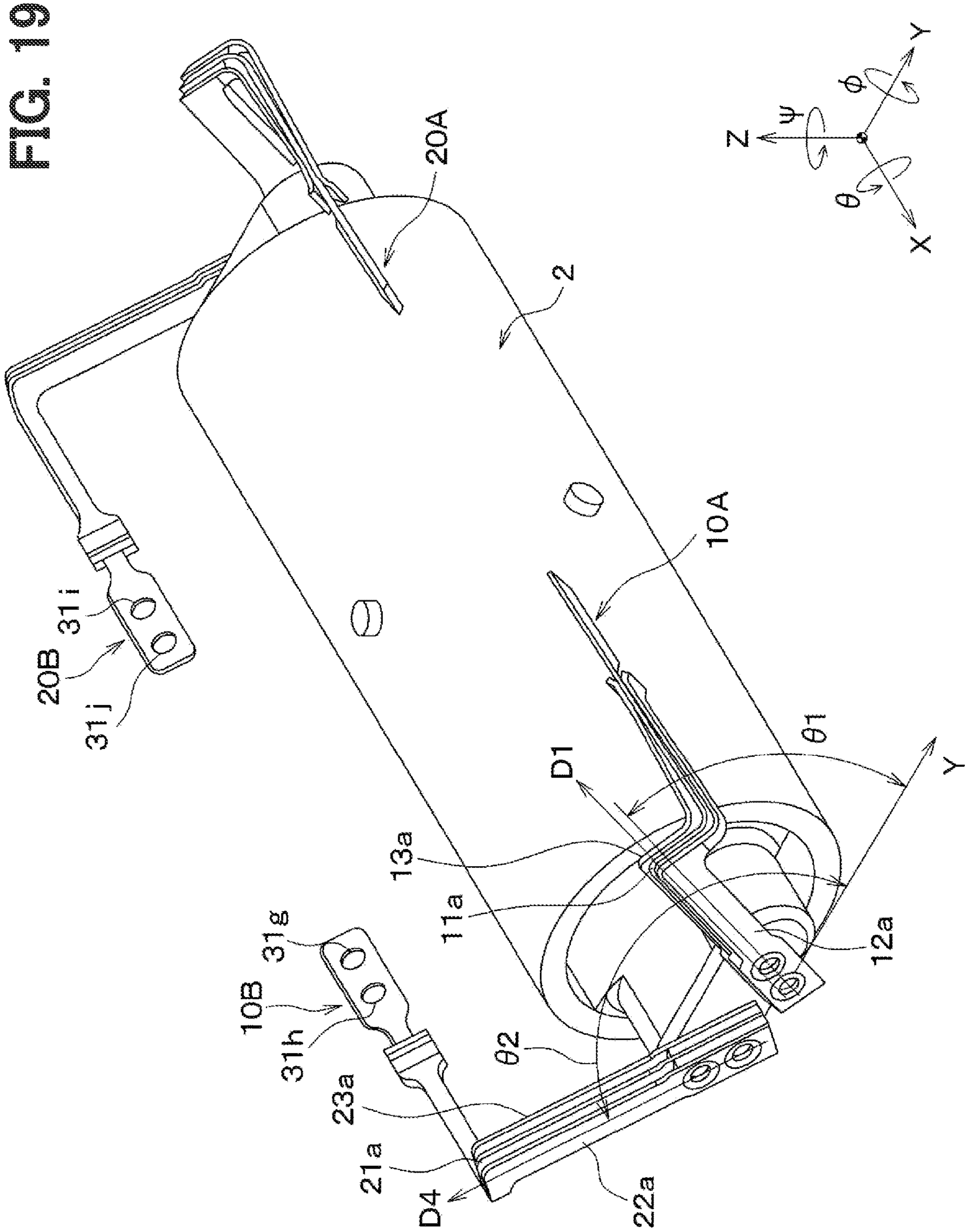
FIG. 19 is a perspective view of different preset angles provided for two spring units of the anti-vibration device according to the first embodiment and supplements the explanation of the positional relationship between the two spring units of the anti-vibration device.

As illustrated in FIG. 19, the longitudinal direction D1 and the longitudinal direction D4 intersect. θ1 is set to 52.5 degrees. 82 is set to 127.5 degrees. The difference between θ1 and θ2 is 75 degrees.

Figure 20:
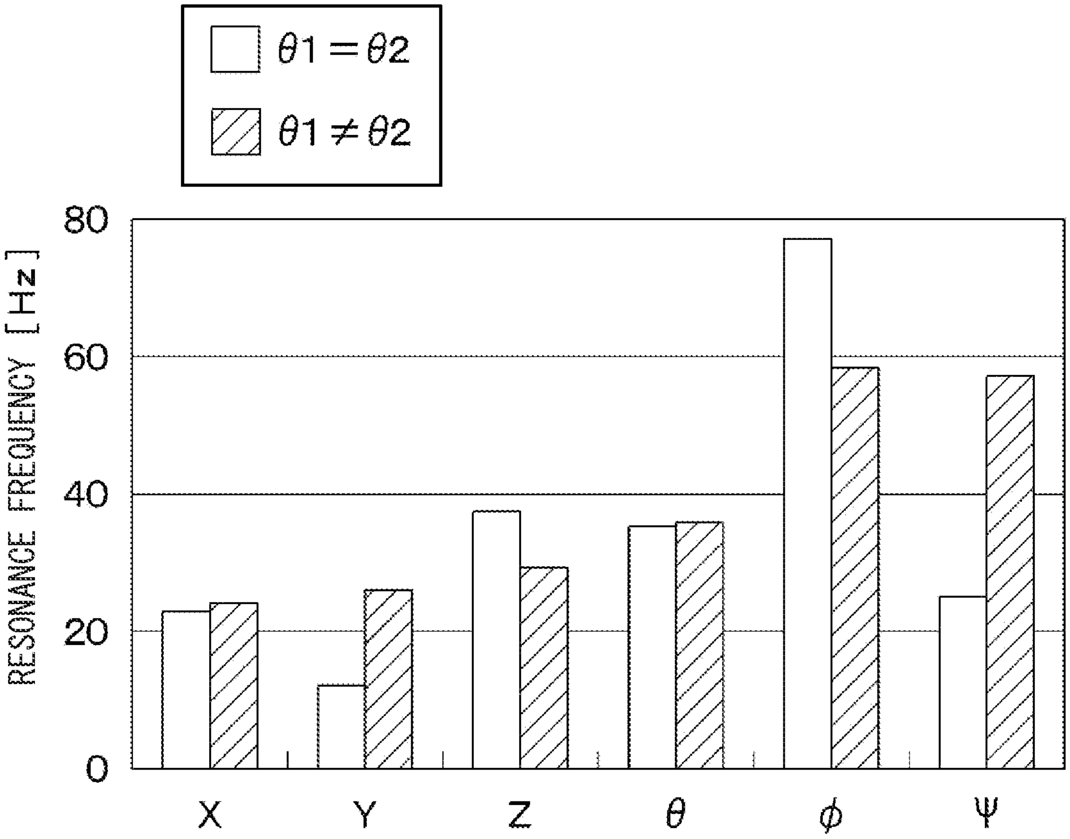
FIG. 20 is a diagram illustrating the comparison among resonance frequencies in six directions of the anti-vibration device according to the first embodiment based on whether or not the preset angles of the two spring units are identical.

FIG. 20 illustrates resonance frequencies in the X, Y, Z, θ, ϕ, and ψ directions depending on whether or not θ1 and θ2 are equal.

When θ1 and θ2 are each equal to 90 degrees as illustrated in FIG. 20, an increased difference can be seen between the maximum resonance frequency fϕ and the minimum resonance frequency fy out of the resonance frequencies fx, fy, fz, fθ, fϕ, and fψ.

When θ1 and θ2 differ from each other such that θ1 is set to 52.5 degrees and θ2 is set to 127.5 degrees, a decreased difference can be seen between the maximum resonance frequency fϕ and the minimum resonance frequency fx out of the resonance frequencies fx, fy, fz, fθ, fϕ, and fψ.

Compared to the case of setting 81 and 82 to the same angle, the configuration of setting 81 and 82 to different angles can decrease the difference between the maximum resonance frequency and the minimum resonance frequency out of resonance frequencies fx, fy, fz, fθ, fϕ, and fψ. The use of the leaf springs 12, 13, 22, and 23 can easily attenuate vibrations of the leaf springs 11 and 21.

Figure 21:
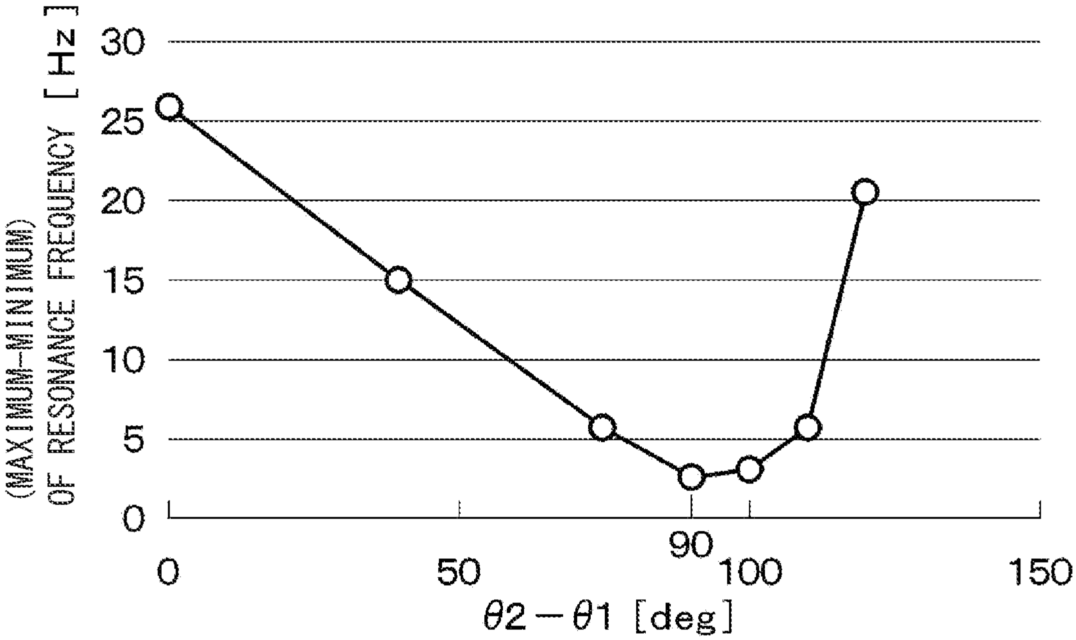
FIG. 21 is a diagram supplementing the explanation of the relationship between the difference between the preset angles of the two spring units of the anti-vibration device and the difference between the maximum resonance frequency and the minimum resonance frequency in three translational directions according to the first embodiment.

(g) FIG. 21 illustrates the relationship between a mounting angle difference and a difference between the maximum and minimum values of resonance frequencies fx, fy, and fz in the X, Y, and Z directions. Concerning the graph in FIG. 21, the vertical axis represents the difference between the maximum and minimum values as above and the horizontal axis represents the mounting angle difference. The mounting angle difference results from subtracting θ1 from θ2.

As can be seen from FIG. 21, the difference between the maximum and minimum values of resonance frequencies fx, fy, and fz is minimized when θ1 is 45 degrees, θ2 is 135 degrees, and the difference acquired by subtracting θ1 from θ2 is 90 degrees. The three resonance frequencies fx, fy, and fz in the X, Y, and Z directions can be aggregated in a narrow range. The use of the leaf springs 12, 13, 22, and 23 can more easily attenuate vibrations of the leaf springs 11 and 21.

Figure 22:
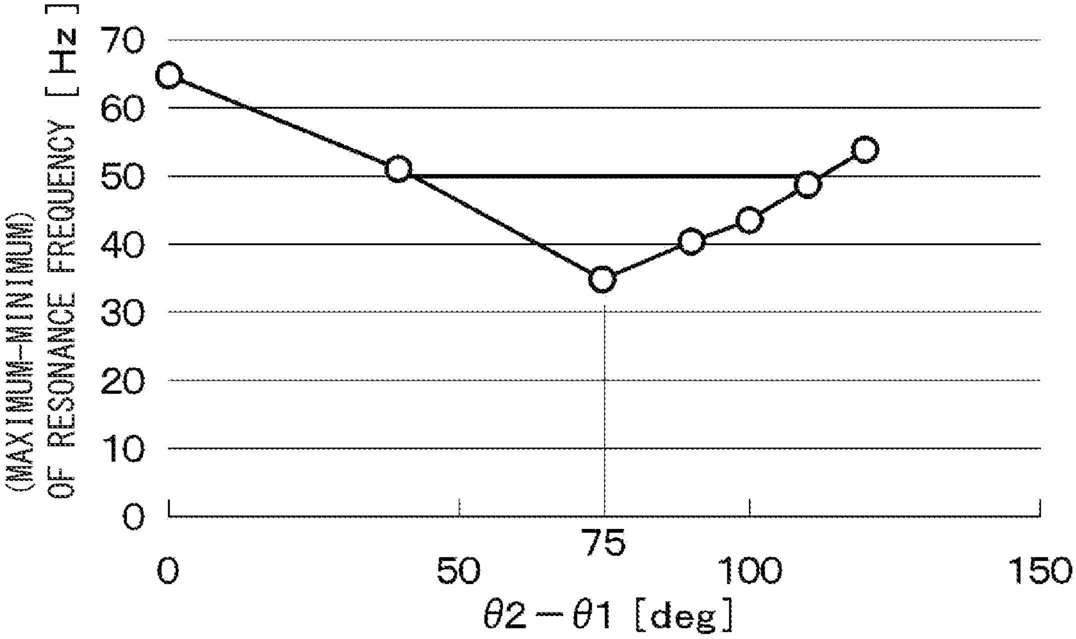
FIG. 22 is a diagram supplementing the explanation of the relationship between the difference between the preset angles of the two spring units of the anti-vibration device and the difference between the maximum resonance frequency and the minimum resonance frequency in six directions according to the first embodiment.

(h) FIG. 22 illustrates the relationship between a mounting angle difference and a difference between the maximum and minimum values of resonance frequencies fx, fy, fz, fθ, fϕ, and fψ. Concerning the graph in FIG. 22, the vertical axis represents the difference between the maximum and minimum values as above and the horizontal axis represents the mounting angle difference. The mounting angle difference results from subtracting θ1 from θ2.

As can be seen from FIG. 22, the difference between the maximum and minimum values as above is minimized when θ1 is 52.5 degrees and θ1 is 127.5 degrees to cause the angle difference of 75 degrees. Six resonance frequencies fx, fy, fz, fθ, fϕ, and fψ can be aggregated in a narrow range. The mounting angle difference results from subtracting θ1 from θ2.

Figure 23:
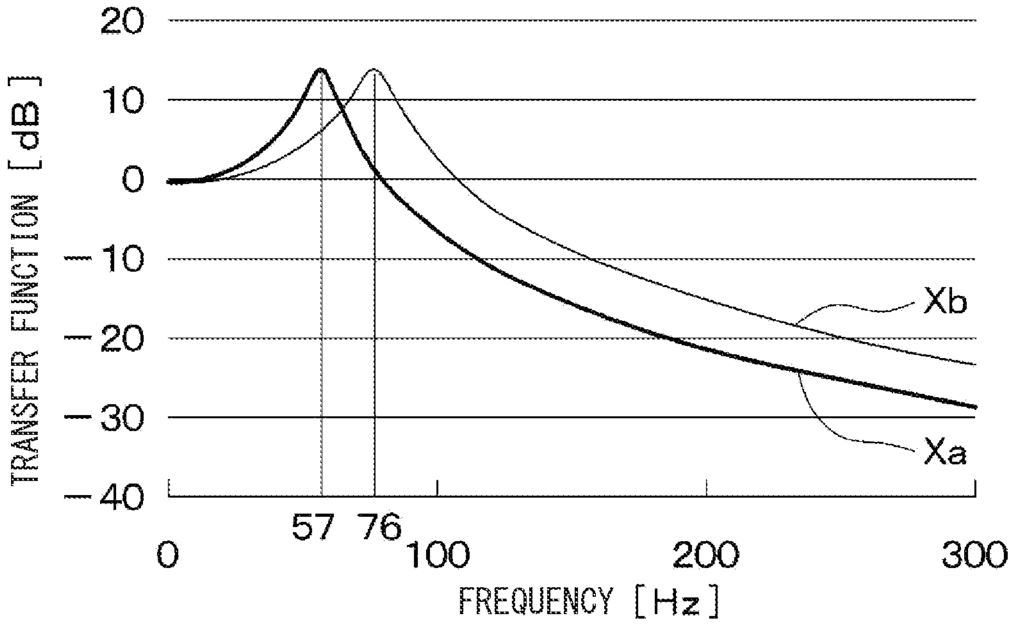
FIG. 23 is a diagram illustrating frequency characteristics of the transfer function corresponding to 0 and 75 degrees as differences between the preset angles of the two spring units on condition that the transfer function concerns vibrations transmitted from the vibration source to the vibration transmission portion via the anti-vibration device.

(i) As illustrated in FIG. 23, graph Xa illustrates frequency characteristics of the transfer function of vibrations transmitted from the vibration source 2 to the vibration transmission portion 3 via the anti-vibration device 1 when the angular difference is 0 degrees. Graph Xb illustrates frequency characteristics of the transfer function of vibrations transmitted from the vibration source 2 to the vibration transmission portion 3 when the angular difference is 75 degrees.

A change in the angle difference from 0 degrees to 75 degrees changes the maximum value of the resonance frequency from 76 Hz to 57 Hz. It can be seen that the anti-vibration effect in the high-frequency range can be improved when the angular difference is 75 degrees compared to the angular difference set to 0 degrees.

Figure 24:
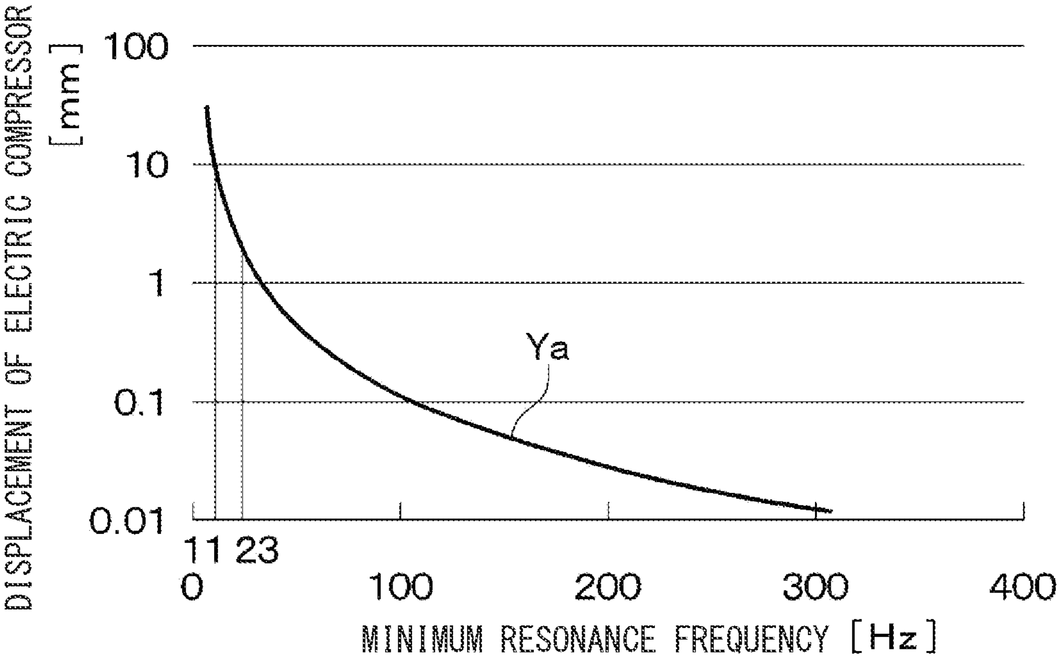
FIG. 24 is a diagram illustrating the relationship between the minimum one of the six resonance frequencies of the anti-vibration device and the displacement of an electric compressor as a vibration source.

(j) When an electric compressor operates as the vibration source 2, the electric compressor is displaced as the vibration is generated. Graph Ya in FIG. 24 illustrates the relationship between the amount of displacement of the electric compressor as the vibration source 2 and the minimum value of resonance frequencies fx, fy, fz, fθ, fϕ, and fψ.

When the angular difference is 0 degrees, the minimum resonance frequency is 11 Hz. When the angular difference is 75 degrees, the minimum resonance frequency is 23 Hz. When the angular difference is 75 degrees, the amount of displacement of the electric compressor is smaller than when the angular difference is 0 degrees. Consequently, it can be seen that the electric compressor can be restricted from colliding with other nearby parts.

(k) By reference to FIGS. 25 to 28, the description below explains the relationship between the amount of displacement of the vibration source 2 and the elastic force (precompression) previously provided for the leaf springs 12 and 13 according to the present embodiment.

Figure 25:
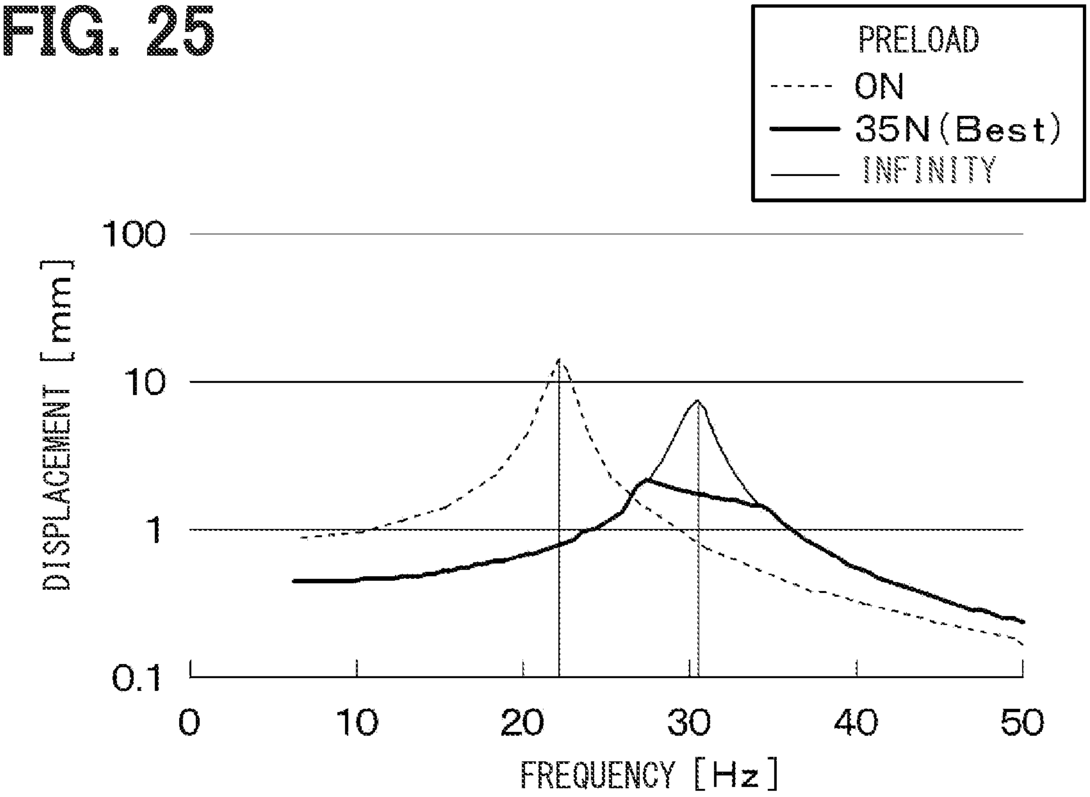
FIG. 25 is a diagram illustrating the relationship between a displacement and a vibration frequency of the vibration source based on the leaf spring precompression set to zero, 35 N, and infinity according to the first embodiment.

In FIG. 25, the vertical axis indicates the displacement of the vibration source 2, and the horizontal axis indicates the frequency of vibration. The dashed-line graph illustrates the relationship between the displacement of the vibration source 2 and the frequency when the precompression is zero N. The thick-line graph illustrates the relationship between the displacement of the vibration source 2 and the frequency when the precompression is 35 N. The thin-line graph illustrates the relationship between the displacement of the vibration source 2 and the frequency when the precompression is infinite.

As can be seen from FIG. 25, the precompression of 35 N specified for the leaf springs 12 and 13 causes the displacement of the vibration source 2 to be smaller than the precompression of zero N or infinite.

Figure 26:
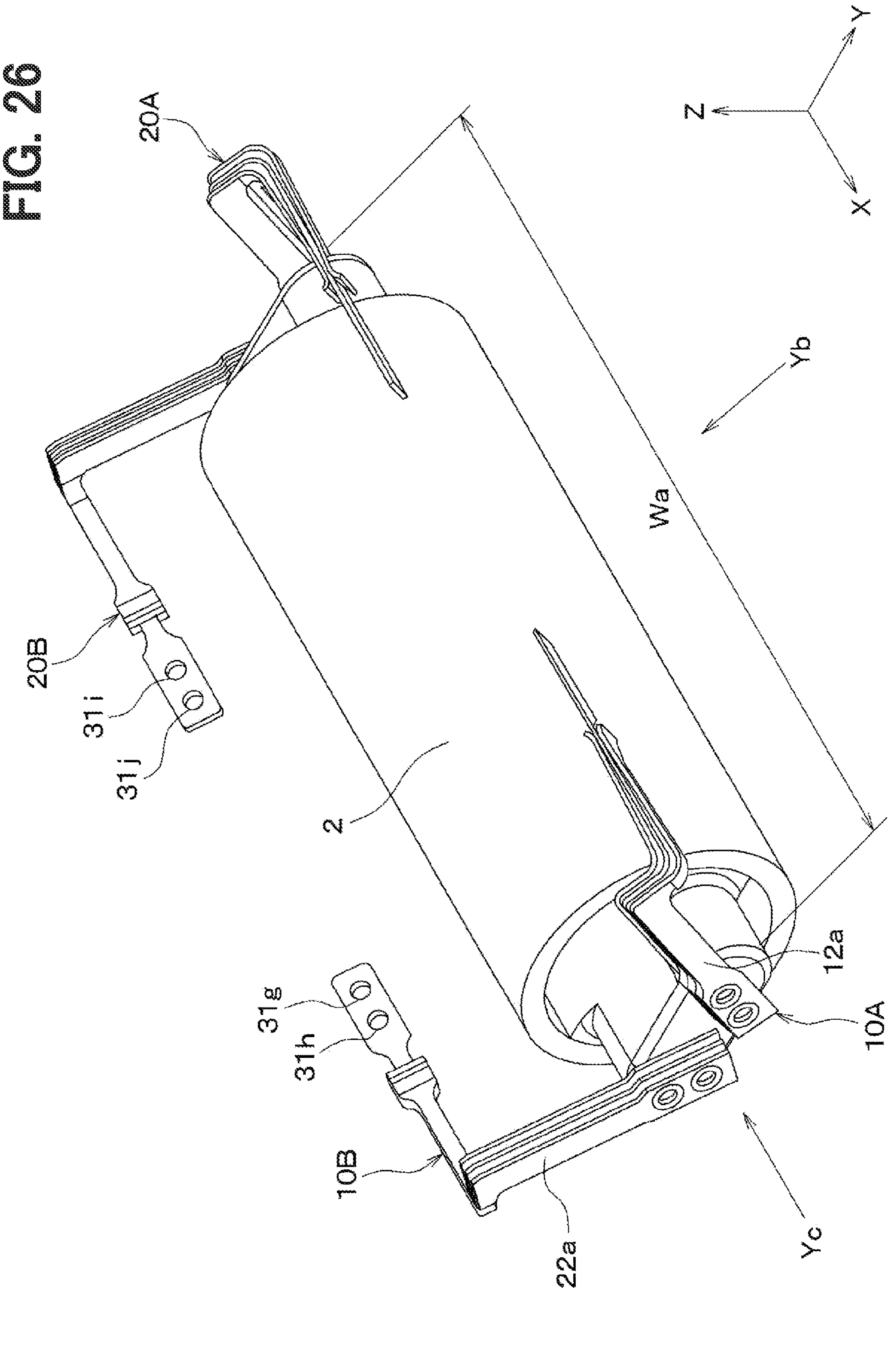
FIG. 26 is an overall perspective view of the anti-vibration device according to the first embodiment and supplements the explanation of the dimensional relationship of the anti-vibration device to be used to investigate the relationship among the leaf spring precompression, the vibration source displacement, and the vibration frequency.
Figure 27:
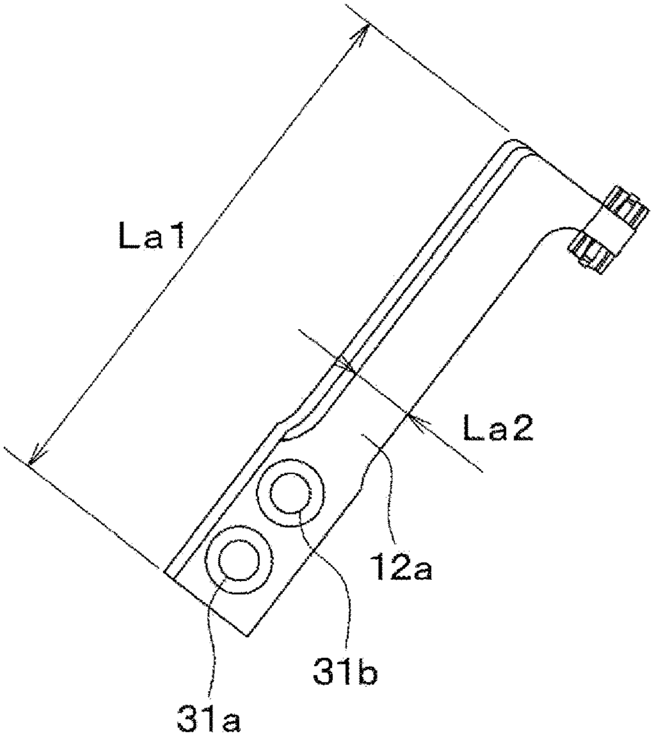
FIG. 27 illustrates the spring unit of the anti-vibration device viewed along arrow Yc in FIG. 26 and supplements the explanation of the dimensional relationship of leaf springs in the spring unit to be used to investigate the relationship among the leaf spring precompression, the vibration source displacement, and the vibration frequency.
Figure 28:
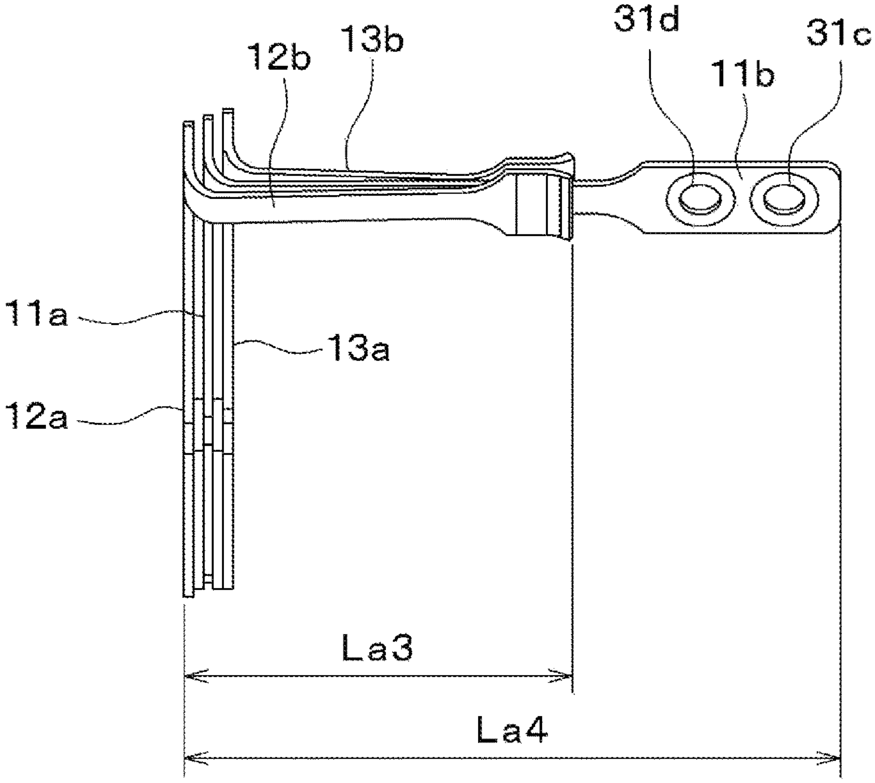
FIG. 28 illustrates the spring unit of the anti-vibration device viewed along arrow Yb in FIG. 26 and supplements the explanation of the dimensional relationship of leaf springs in the spring unit to be used to investigate the relationship among the leaf spring precompression, the vibration source displacement, and the vibration frequency.

FIGS. 26, 27, and 28 illustrate dimensional relationships among the electric compressor as the vibration source 2 and the leaf springs 11, 12, and 13 that are used to investigate the relationship between the displacement and the frequency of the vibration source 2 in FIG. 25.

In FIG. 26, X-direction dimension Wa of the vibration source 2 is 342 mm. In FIG. 27, longitudinal dimension La1 of the elastically deformed portion 12*a* of the leaf spring 12 is 100 mm. In FIG. 27, widthwise dimension La2 of the elastically deformed portion 12*a* of the leaf spring 12 is 12 mm. In FIG. 28, longitudinal dimension La3 of the elastically deformed portions 12*a* and 13*a* of the leaf springs 12 and 13 is 70 mm. In FIG. 28, longitudinal dimension La4 of the elastically deformed portion 11*a* of the leaf spring 11 is 118 mm.

In FIG. 26, reference numerals 31*h* and 31*g* for the elastically deformed portion 11*b* represent through-hole portions for the bolts 30*g* and 30*h* to fasten the leaf spring 11 to the vibration transmission portion 3. In FIG. 26, reference numerals 31*j* and 31*i* for the spring unit 20B represent through-holes for the bolts 30*j* and 30*i* to fasten the spring unit 20B to the vibration transmission portion 3.

In FIG. 27, reference numerals 31*a* and 31*b* for the elastically deformed portion 12*a* represent through-holes for the bolts 30*a* and 30*b* to fasten the spring unit 10A to the vibration source 2. In FIG. 28, reference numerals 31*d* and 31*c* for the elastically deformed portion 11*b* represent through-holes for the bolts 30*d* and 30*c* to fasten the leaf spring 11 to the vibration transmission portion 3.

Second Embodiment

In the example according to the first embodiment described above, the elastically deformed portion 11*a* of the leaf spring 11 of the spring unit 10A is formed to extend in the D1 direction. The elastically deformed portion 21*a* of the leaf spring 21 of the spring unit 20A is formed to extend in the D4 direction.

By reference to FIGS. 29, 30, and 31, instead, the description below explains the second embodiment in which the elastically deformed portions 11*a* and 21*a* are each formed to bend.

Figure 29:
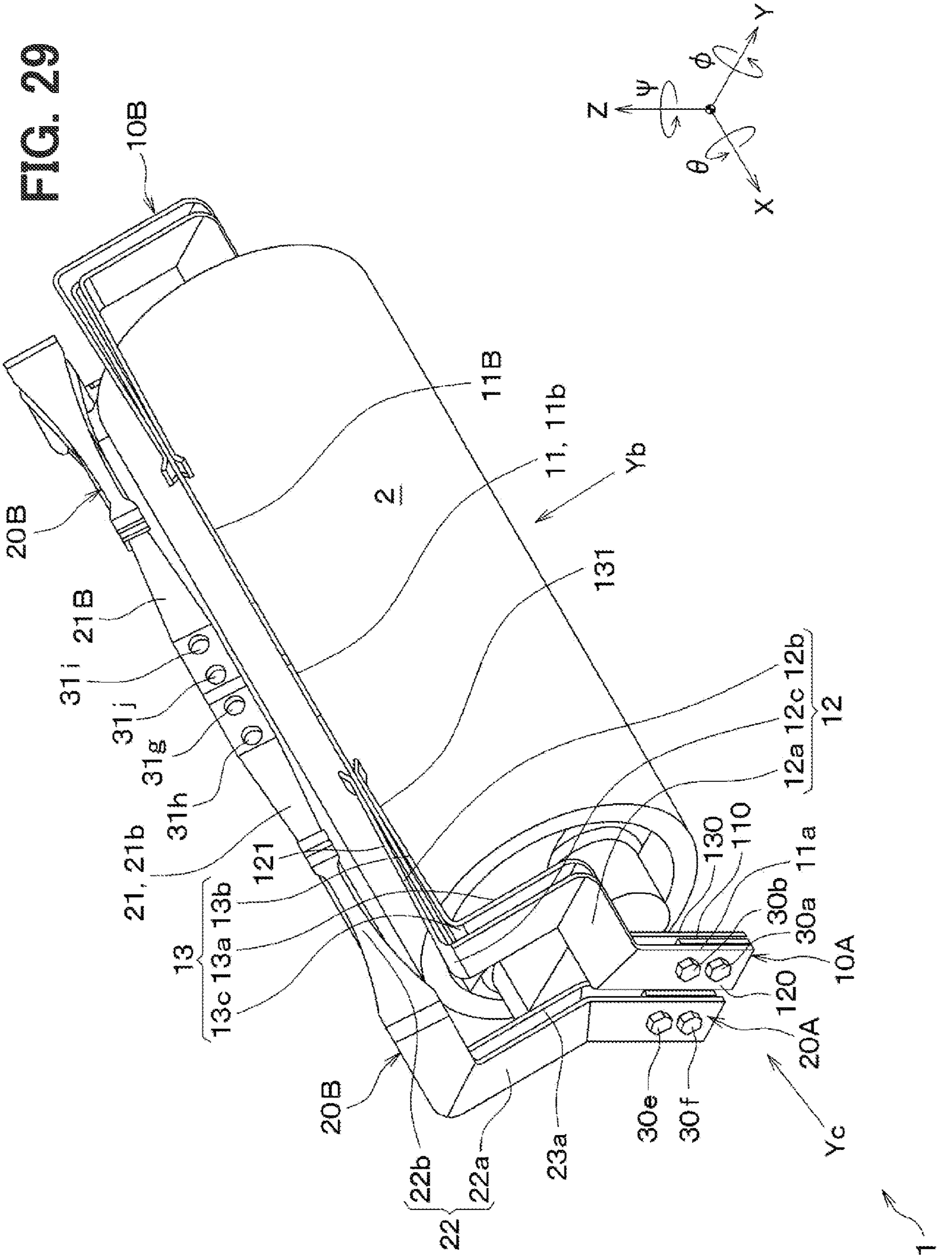
FIG. 29 is an overall perspective view illustrating the vehicular anti-vibration device connected to the vibration source according to a second embodiment by omitting the illustration of the vibration transmission portion and illustrates in detail the structure of the four spring units configuring the anti-vibration device.

FIG. 29 is a perspective view illustrating the connection of the spring units 10A, 10B, 20A, and 20B of the anti-vibration device 1 to the vibration source 2 while the illustration of the vibration transmission portion 3 is omitted. FIG. 30 illustrates the anti-vibration device 1 in FIG. 29, viewed along arrow Yb in FIG. 29. FIG. 31 illustrates the anti-vibration device 1 in FIG. 29, viewed along arrow Yc by omitting the leaf springs 12 and 22.

Figure 30:
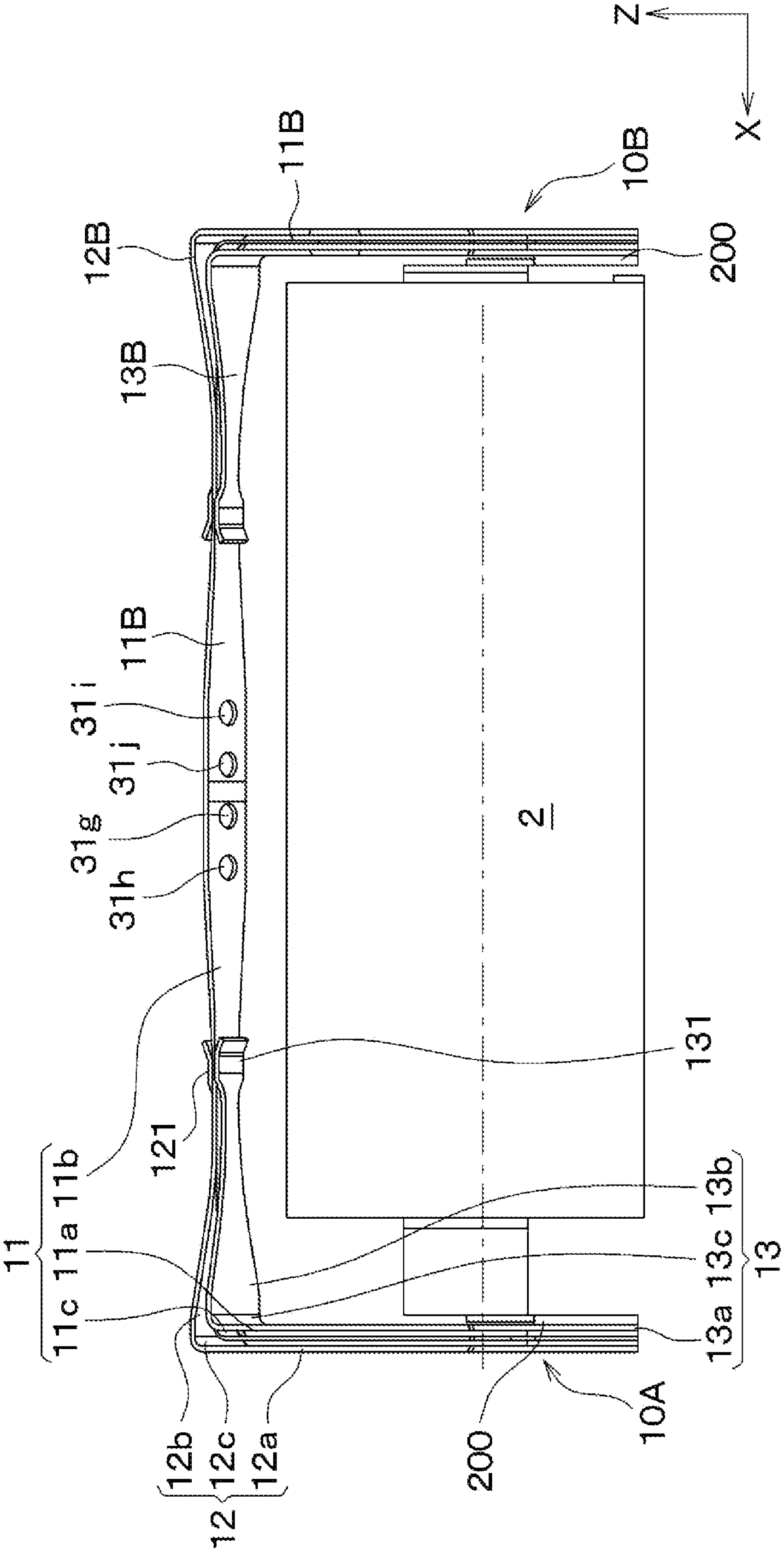
FIG. 30 illustrates the anti-vibration device according to the second embodiment viewed along arrow Yb in FIG. 29 and supplements the explanation of the configuration of the leaf springs of each of the two spring units.

As illustrated in FIGS. 29 and 30, the leaf spring 11 of the spring unit 10A according to the present embodiment differs from the leaf spring 11 of the spring unit 10A according to the first embodiment mainly in the elastically deformed portion 11*a*.

Figure 31:
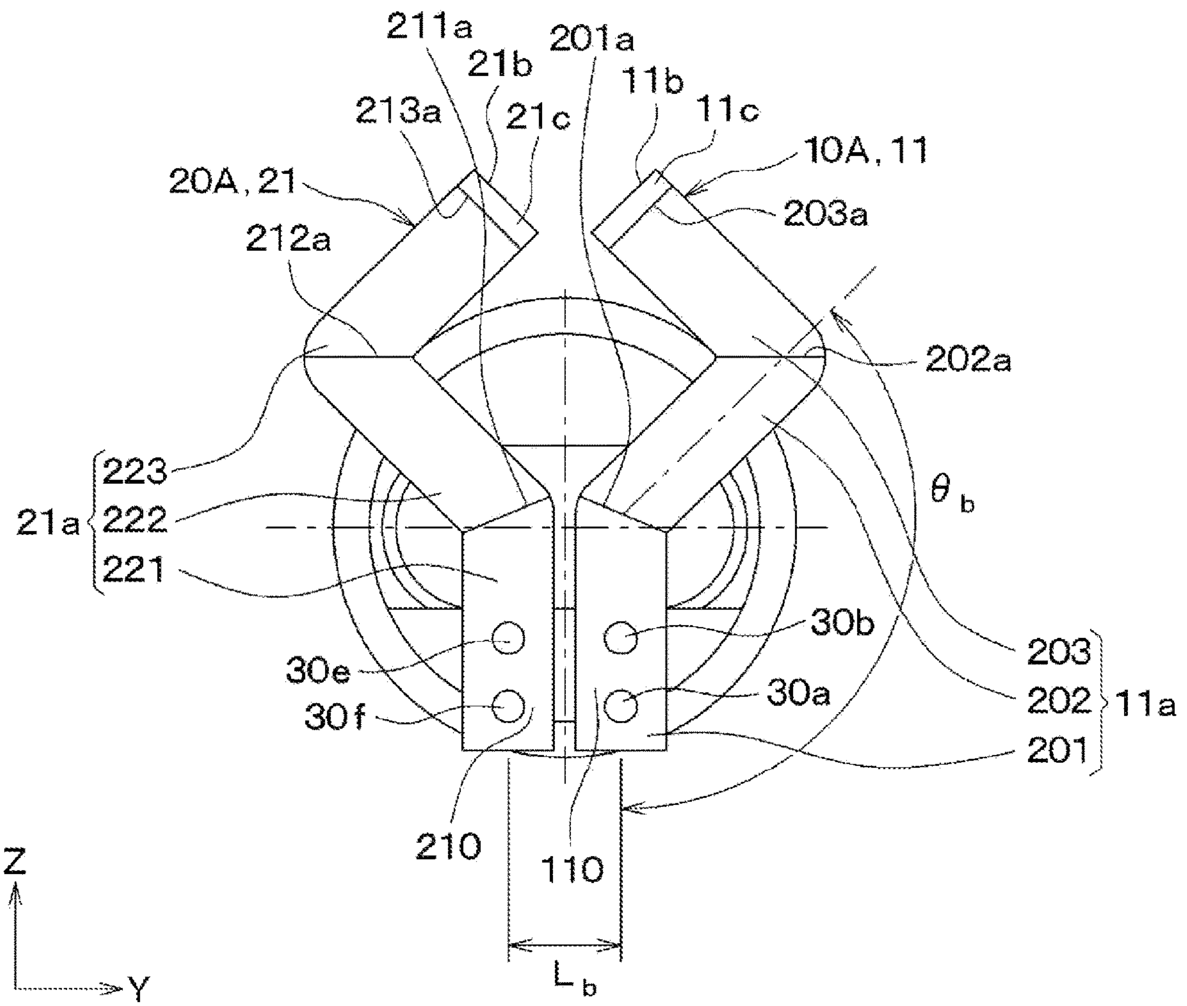
FIG. 31 illustrates the anti-vibration device according to the second embodiment viewed along arrow Yc in FIG. 29 and supplements the explanation of the configuration of the leaf springs of each of the two spring units.

As illustrated in FIG. 31, the elastically deformed portion 11*a* according to the present embodiment is located at one side in the Y direction relative to the elastically deformed portion 21*a* of the leaf spring 21 of the spring unit 20A. As illustrated in FIG. 31, the elastically deformed portion 11*a* includes long plate portions 201, 202, and 203.

Each of the long plate portions 201, 202, and 203 is formed into a plate being thick in the X direction. The long plate portion 201 is a first long plate portion including one region in the D1 direction 110 being secured to a mount base portion 200 of the vibration source 2 by fastening the bolts 30*a* and 30*b*.

The long plate portion 201 is formed to extend to one side in the Z direction. The long plate portion 202 is a third long plate portion and is formed to extend to one side in the Y direction from one end 201*a* in the Z direction of the long plate portion 201 to one side in the Z direction. The long plate portion 203 is formed to extend to another side in the Y direction from one end 202*a* in the Z direction of the long plate portion 202 to one side in the Z direction.

The elastically deformed portion 11*b* is located at another side in the Y direction relative to one end 203*a* of the long plate portion 203*i* in the Z direction. The elastically deformed portion 11*b* is connected to one end 203*a* of the long plate portion 203 in the Z direction via the bent portion 11*c*. The elastically deformed portion 11*b* according to the present embodiment is configured similarly to the elastically deformed portion 11*a* according to the first embodiment.

The elastically deformed portion 12*a*, along with the elastically deformed portions 11*a* and 13*a*, is secured to the mount base portion 200 of the vibration source 2 by fastening the bolts 30*a* and 30*b*. As illustrated in FIG. 29, the elastically deformed portion 12*a* is formed to bend along the elastically deformed portion 11*a*. The elastically deformed portion 12*b* is located at another side in the Y direction relative to the elastically deformed portion 12*a*. The elastically deformed portion 12*b* is connected to the elastically deformed portion 12*a* via the bent portion 12*c*.

The elastically deformed portion 13*a*, along with the elastically deformed portions 11*a* and 12*a*, is secured to the mount base portion 200 of the vibration source 2 by fastening the bolts 30*a* and 30*b*. As illustrated in FIG. 29, the elastically deformed portion 13*a* is formed to bend along the elastically deformed portion 11*a*. The elastically deformed portion 13*b* is located at another side in the Y direction relative to the elastically deformed portion 13*a*. The elastically deformed portion 13*b* is connected to the elastically deformed portion 13*a* via the bent portion 13*c*.

As illustrated in FIGS. 29 and 30, the leaf spring 21 of the spring unit 20A according to the present embodiment differs from the leaf spring 21 of the spring unit 20A according to the first embodiment mainly in the elastically deformed portion 21*a*. As illustrated in FIG. 31, the elastically deformed portion 21*a* includes long plate portions 221, 222, and 223.

The long plate portions 221, 222, and 223 are each formed into a plate being thick in the X direction. The long plate portion 221 is a second long plate portion and includes one region in the D4 direction 210 secured to the mount base portion 200 of the vibration source 2 by fastening the bolts 30*e* and 30*f*.

The long plate portion 221 is formed to extend toward one side in the Z direction. The long plate portion 222 is a fourth long plate portion and is formed to extend to another side in the Y direction from one end 201*a* of the long plate portion 201 in the Z direction to one side in the Z direction. The long plate portion 223 is formed to extend to one side in the Y direction from one end 222*a* in the Z direction of the long plate portion 222 to one side in the Z direction.

The elastically deformed portion 21*b* is located at one side in the Y direction of the long plate portion 223 relative to one end 223*a* in the Z direction. The elastically deformed portion 21*b* is connected to one end 223*a* of the long plate portion 223 in the Z direction via the bent portion 21*c*. The elastically deformed portion 21*b* according to the present embodiment is configured similarly to the elastically deformed portion 11*a* according to the first embodiment.

The elastically deformed portion 22*a*, along with the elastically deformed portions 21*a* and 23*a*, is secured to the mount base portion 200 of the vibration source 2 by fastening the bolts 30*e* and 30*f*. As illustrated in FIG. 29, the elastically deformed portion 22*a* is formed to bend along the elastically deformed portion 21*a*. The elastically deformed portion 22*b* is located at another side in the Y direction relative to the elastically deformed portion 22*a*. The elastically deformed portion 22*b* is connected to the elastically deformed portion 22*a* via the bent portion 21*c*.

The elastically deformed portion 23*a*, along with the elastically deformed portions 21*a* and 22*a*, is secured to the mount base portion 200 of the vibration source 2 by fastening the bolts 30*e* and 30*f*. The elastically deformed portion 23*a* is formed to bend along the elastically deformed portion 21*a*. The elastically deformed portion 23*b* is located at one side in the Y direction relative to the elastically deformed portion 23*a*. The elastically deformed portion 23*b* is connected to the elastically deformed portion 23*a* via the bent portion 13*c*.

As illustrated in FIG. 29, the spring units 10B and 10A are symmetrically configured in the X direction. The spring units 20B and 10A are symmetrically configured in the X direction.

According to the present embodiment described above, the anti-vibration device 1 includes the leaf springs 11 and 21 secured to the vibration source 2 and the vibration transmission portion 3. The leaf spring 11 includes the elastically deformed portion 11*a* that is formed into a plate being thick in the X direction and is elastically deformed by vibration transmitted from the vibration source 2 to vibrate in the X direction. The leaf spring 21 includes the elastically deformed portion 21*a* that is formed into a plate being thick in the X direction and is elastically deformed by vibration transmitted from the vibration source 2 to vibrate in the X direction.

The leaf spring 11 includes the elastically deformed portion 11*b* that is formed into a plate being thick in the D2 direction and is elastically deformed by vibration transmitted from the vibration source 2 to vibrate in the D2 direction. The leaf spring 21 is formed into a plate being thick in the D5 direction. The leaf spring 21 includes the elastically deformed portion 21*b* that is elastically deformed by vibration transmitted from the vibration source 2 and vibrates in the D5 direction.

Similar to the first embodiment, the anti-vibration device 1 vibrates in three different directions (X, D2, and D5 directions) by vibration transmitted from the vibration source 2.

Similar to the first embodiment, another region in the X direction 121 of the elastically deformed portion 12*b* vibrates to generate sliding friction on the elastically deformed portion 11*b* of the leaf spring 11. Similar to the first embodiment, another region in the X direction 131 of the elastically deformed portion 13*b* vibrates to generate sliding friction on the elastically deformed portion 11*b* of the leaf spring 11. Consequently, the elastically deformed portions 12*b* and 13*b* can attenuate the vibration of the elastically deformed portion 11*b* of the leaf spring 11.

Similar to the first embodiment, another region in the X direction 221X of the elastically deformed portion 22*b* vibrates to generate sliding friction on the elastically deformed portion 21*b* of the leaf spring 21. Similar to the first embodiment, elastically deformed portion 23*b* vibrates to generate sliding friction on the elastically deformed portion 21*b* of the leaf spring 21. Consequently, the elastically deformed portions 22*b* and 23*b* can attenuate the vibration of the elastically deformed portion 21*b* of the leaf spring 21.

As above, similar to the first embodiment, the anti-vibration device 1 can attenuate vibrations transmitted from the vibration source 2 to the vibration transmission portion 3 in six directions X, Y, Z, 8, 1, and Y.

According to the present embodiment, the long plate portion 201 of the elastically deformed portion 11*a* is formed to extend in the Z direction. The long plate portion 201 is secured to the mount base portion 200 of the vibration source 2 through the use of the bolts 30*a* and 30*b*. The long plate portions 201 and 221 are aligned in the Y direction. The long plate portion 221 of the elastically deformed portion 21*a* is formed to extend in the Z direction. The long plate portion 221 is secured to the mount base portion 200 of the vibration source 2 through the use of the bolts 30*e* and 30*f*.

It is possible to decrease the maximum dimension Lb in the Y direction between the bolts 30*a* and 30*f* or between the bolts 30*b* and 30*e* compared to the first embodiment. Therefore, it is possible to decrease resonance frequencies fθ, fϕ, and fψ in the θ, ϕ, and ψ directions determined by the vibration source 2 and the spring units 10A and 10B. It is possible to decrease the difference between the maximum and minimum values of resonance frequencies fx, fy, fz, fθ, fϕ, and fψ. The use of the leaf springs 12, 13, 22, and 23 can easily attenuate vibrations of the leaf springs 11 and 21.

Third Embodiment

In the example according to the second embodiment described above, the leaf spring 11 is formed independently of the leaf spring 21. By reference to FIGS. 32 and 33, instead, the description below explains the third embodiment in which the leaf springs 11 and 21 are integrated to configure an integrated formation.

Figure 32:
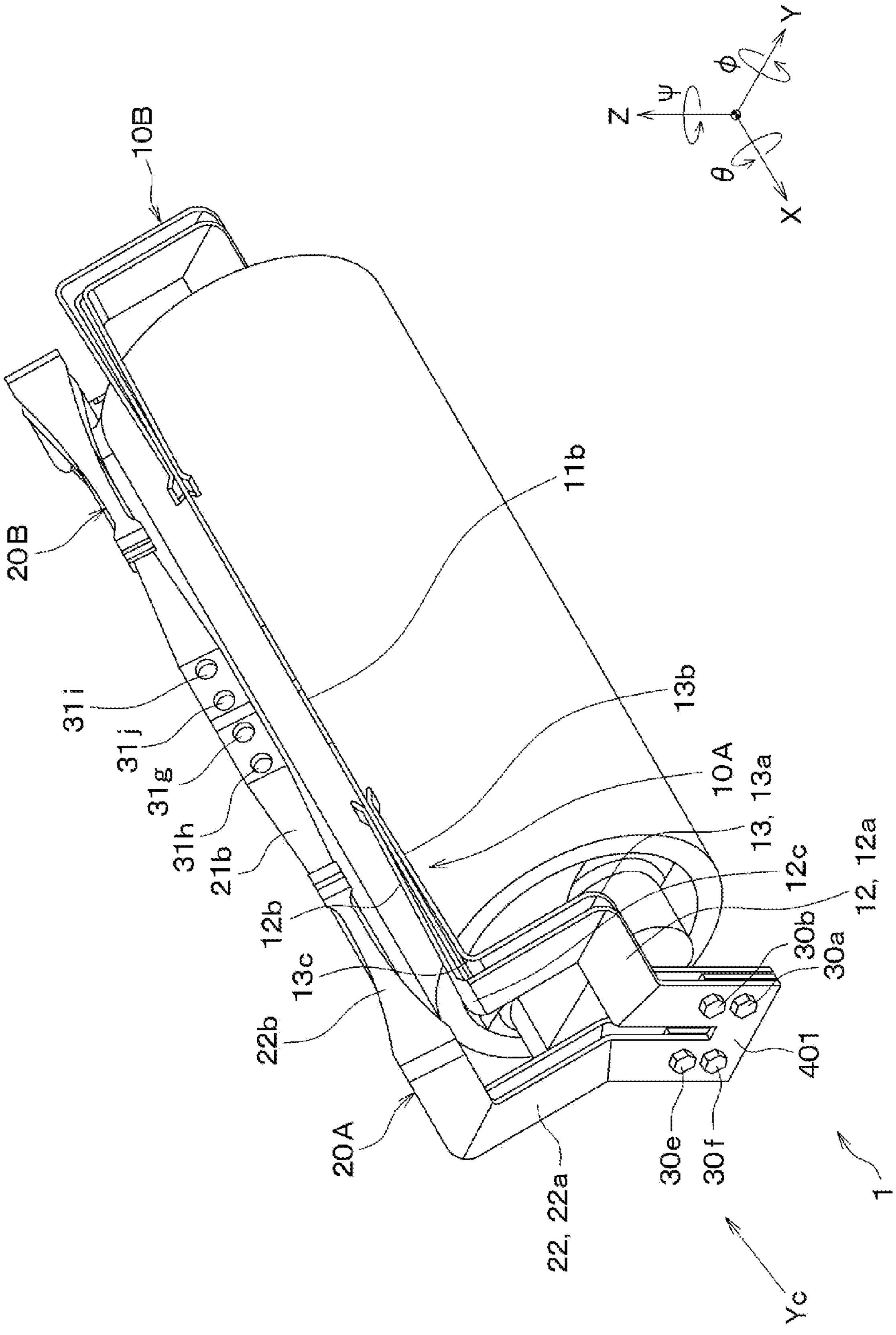
FIG. 32 is an overall perspective view illustrating the vehicular anti-vibration device connected to the vibration source according to a third embodiment by omitting the illustration of the vibration transmission portion and illustrates in detail the structure of the four spring units configuring the anti-vibration device.
Figure 33:
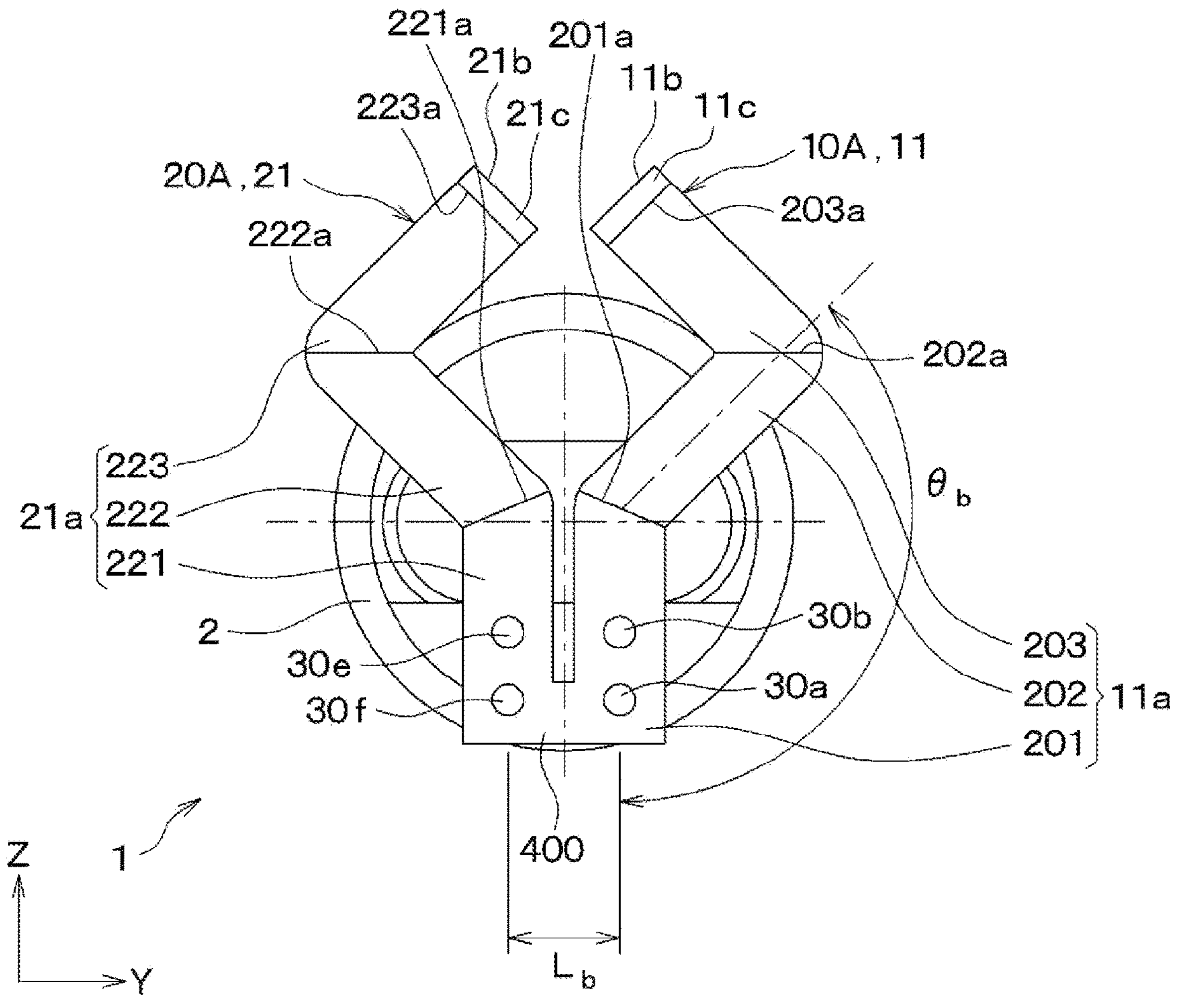
FIG. 33 illustrates the anti-vibration device according to the third embodiment viewed along arrow Yc in FIG. 32 and supplements the explanation of the configuration of the leaf springs of each of the two spring units.

FIG. 33 is a perspective view illustrating the connection of the spring units 10A, 10B, 20A, and 20B of the anti-vibration device 1 to the vibration source 2 while the illustration of the vibration transmission portion 3 is omitted. FIG. 33 is a perspective view illustrating the anti-vibration device 1 in FIG. 32, viewed along arrow Yc after removing the leaf springs 12 and 22.

As illustrated in FIG. 33, the present embodiment additionally supplements the leaf springs 11 and 21 according to the second embodiment with a connection portion 400 that connects the leaf springs 11 and 21. The connection portion 400 connects another side in the Z direction of the long plate portion 201 of the elastically deformed portion 11*a* of the leaf spring 11 and another side in the Z direction of the long plate portion 221 of the elastically deformed portion 21*a* of the leaf spring 21. The leaf springs 11 and 21 configured as above configure an integrated formation.

As illustrated in FIG. 32, the present embodiment additionally supplements the leaf springs 12 and 22 according to the second embodiment with a connection portion 401 that connects the leaf springs 12 and 22. The connection portion 401 connects one end in the Z direction of the elastically deformed portion 11*a* of the leaf spring 11 and one end in the Z direction of the elastically deformed portion 21*a* of the leaf spring 21. The leaf springs 12 and 22 configured as above configure an integrated formation.

Similarly, the present embodiment additionally supplements the leaf springs 13 and 23 according to the second embodiment with a connection portion that connects the leaf springs 13 and 23. The connection portion connects one end in the Z direction of the elastically deformed portion 13*a* of the leaf spring 13 and one end in the Z direction of the elastically deformed portion 23*a* of the leaf spring 23. The leaf springs 13 and 23 configured as above configure an integrated formation.

According to the present embodiment described above, the leaf springs 12 and 22 configure an integrated formation. It is possible to decrease the number of parts configuring the anti-vibration device 1 compared to the second embodiment.

In addition, the leaf springs 12 and 22 according to the present embodiment form an integrated formation. The leaf springs 13 and 23 configure an integrated formation. Therefore, it is possible to further decrease the number of parts configuring the anti-vibration device 1 compared to the second embodiment.

Fourth Embodiment

In the example according to the second embodiment described above, the bolts 30*a* and 30*b* and the bolts 30*e* and 30*f* separately secure the leaf spring 11 of the spring unit 10A and the leaf spring 21 of the spring unit 20A to the vibration source 2.

By reference to FIGS. 34 through 37, instead, the description below explains the fourth embodiment in which the common bolt 30*a* secures the elastically deformed portion 11*a* of the leaf spring 11 and the elastically deformed portion 21*a* of the leaf spring 21 to the vibration source 2.

Figure 34:
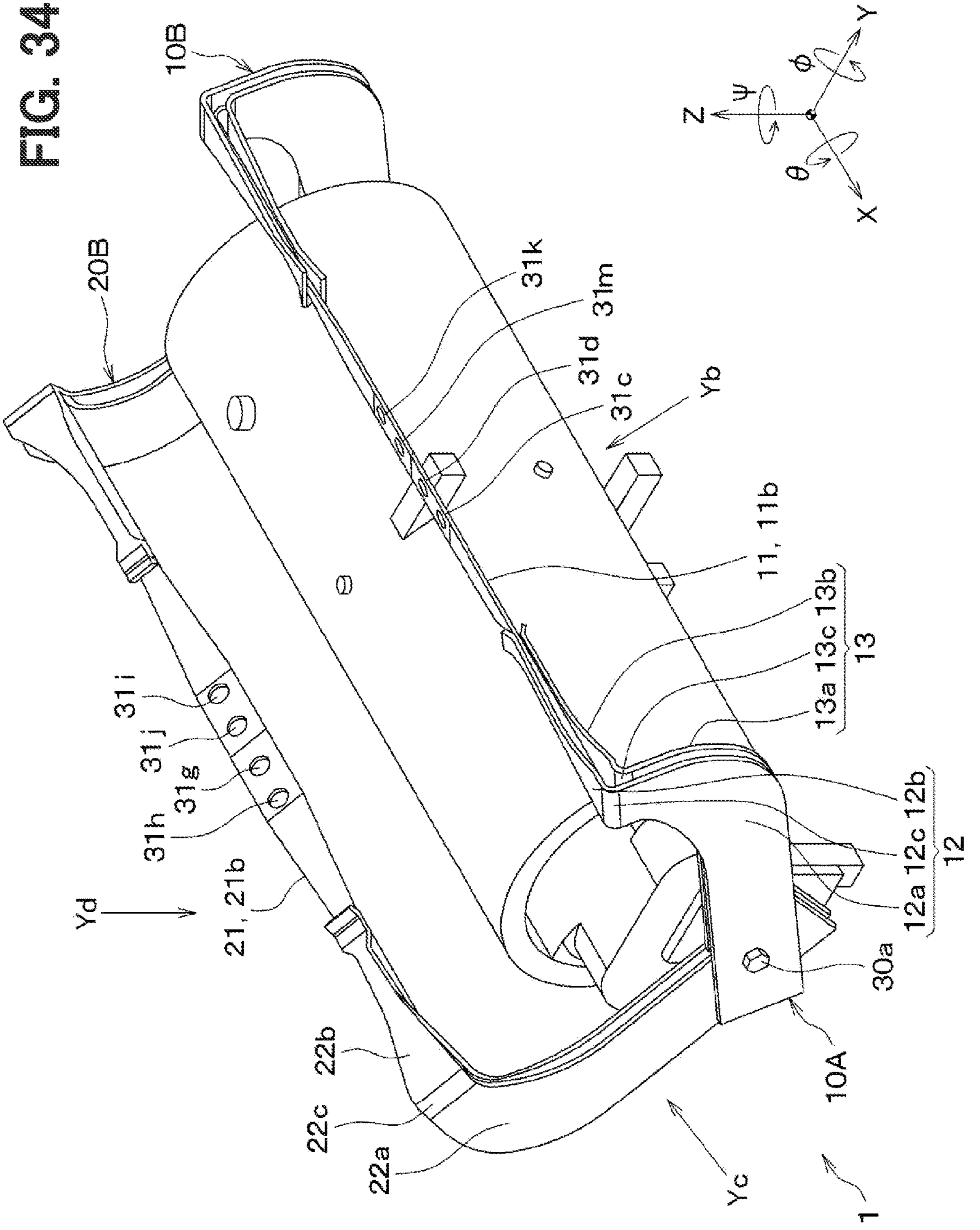
FIG. 34 is an overall perspective view illustrating the vehicular anti-vibration device connected to the vibration source according to a fourth embodiment by omitting the illustration of the vibration transmission portion and illustrates in detail the structure of the four spring units configuring the anti-vibration device.
Figure 35:
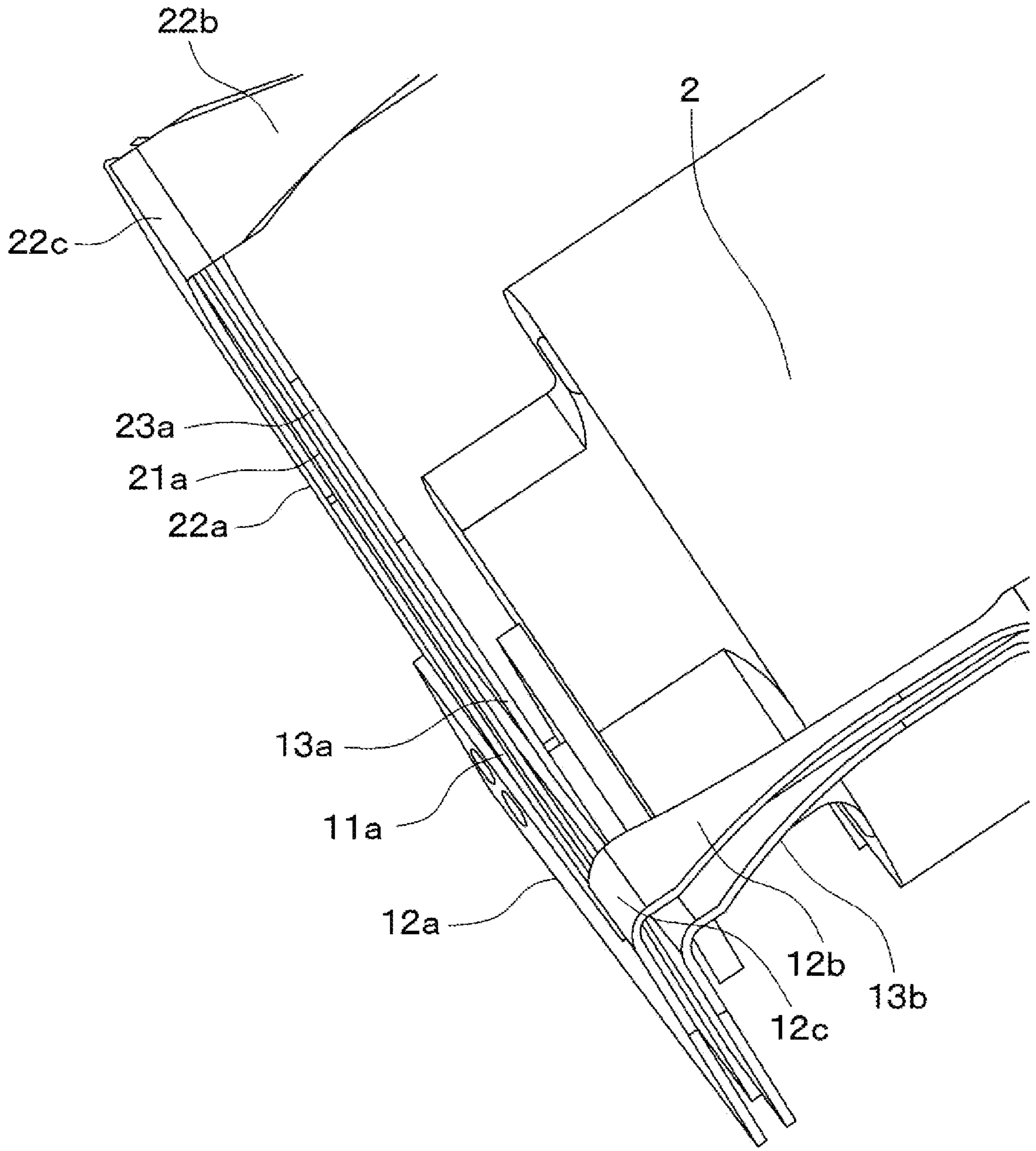
FIG. 35 illustrates the anti-vibration device according to the fourth embodiment viewed along arrow Yd in FIG. 34 and supplements the explanation of the positional relationship among the leaf springs of each of the two spring units.

FIG. 34 is a perspective view illustrating the connection of the spring units 10A, 10B, 20A, and 20B of the anti-vibration device 1 to the vibration source 2 according to the present embodiment while the illustration of the vibration transmission portion 3 is omitted. FIG. 35 illustrates the anti-vibration device in FIG. 34, viewed along arrow Yd. FIG. 35 illustrates the positional relationship between the spring unit 10A, in terms of the elastically deformed portions 11*a*, 12*a*, and 13*a* of the leaf springs 11, 12, and 13, and the spring unit 20A, in terms of the elastically deformed portions 21*a*, 22*a*, and 23*a* of the leaf springs 21, 22, and 23.

Figure 36:
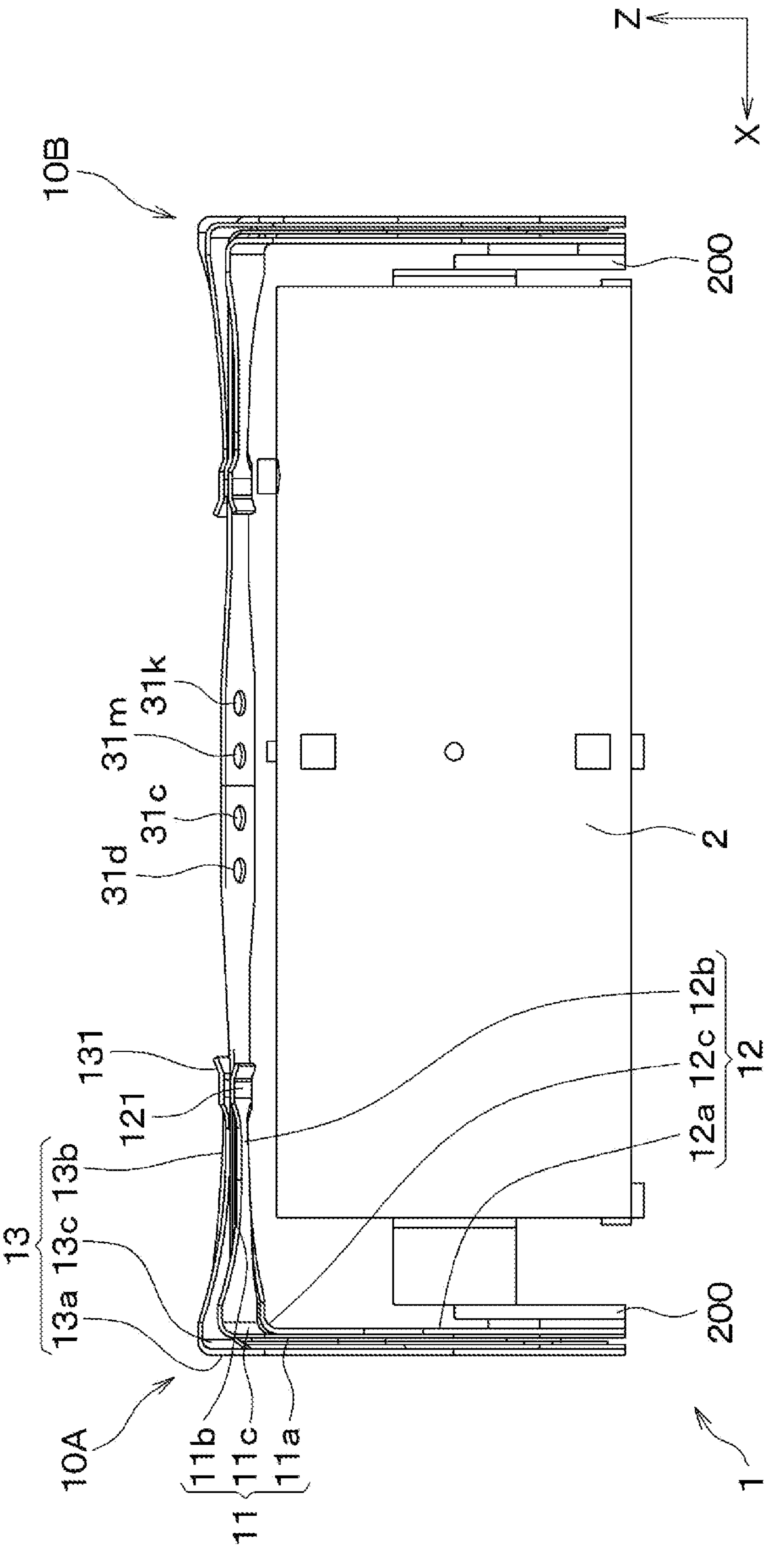
FIG. 36 illustrates the anti-vibration device according to the fourth embodiment viewed along arrow Yb in FIG. 34 and supplements the explanation of the configuration of the leaf springs of each of the two spring units.
Figure 37:
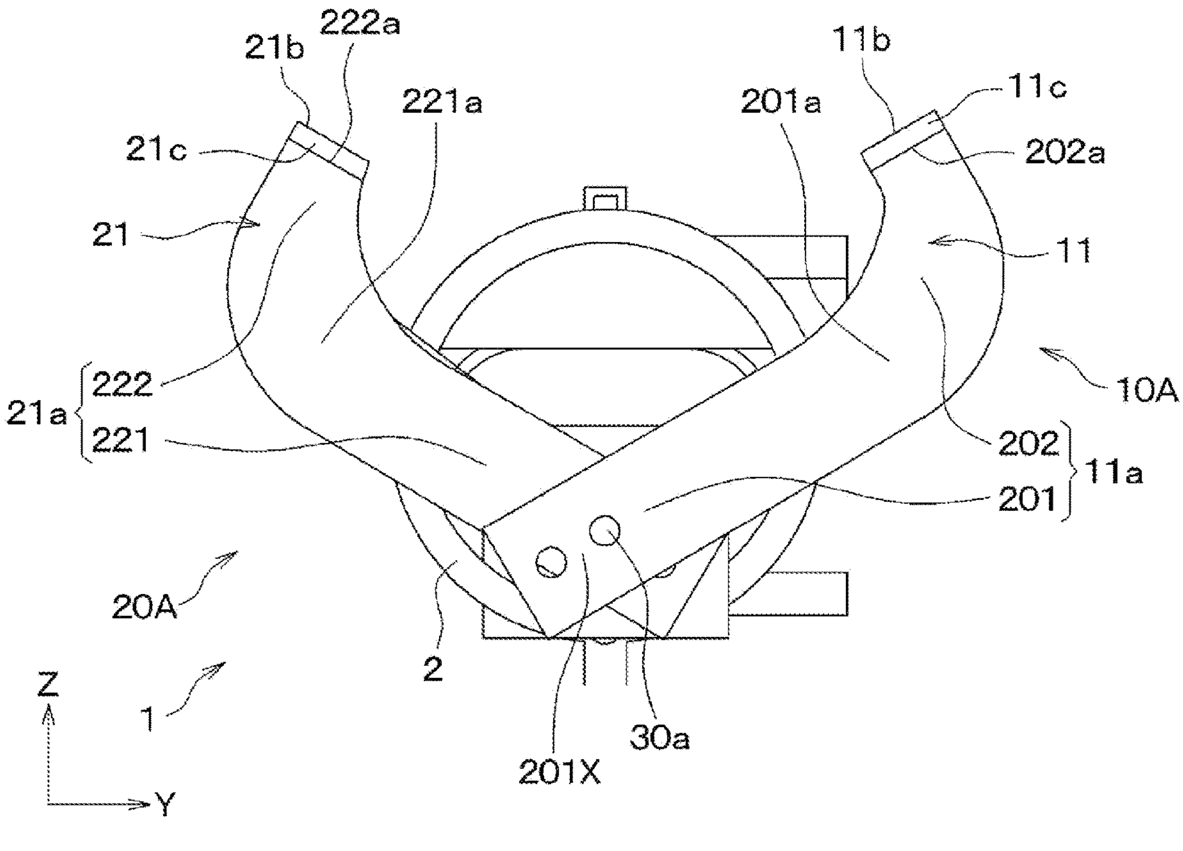
FIG. 37 illustrates the anti-vibration device according to the fourth embodiment viewed along arrow Yc in FIG. 34 and supplements the explanation of the configuration of the leaf springs of each of the two spring units.

FIG. 36 illustrates the anti-vibration device in FIG. 34, viewed along arrow Yb. FIG. 37 is a perspective view illustrating the anti-vibration device 1 in FIG. 34, viewed in the direction of Yc by omitting the leaf springs 12 and 22.

According to the present embodiment, as illustrated in FIGS. 34 and 35, the elastically deformed portions 11*a*, 12*a*, and 13*a* of the leaf springs 11, 12, and 13 overlap with the elastically deformed portions 21*a*, 22*a*, and 23*a* of the leaf springs 21, 22, and 23 in the X direction.

As illustrated in FIG. 35, the elastically deformed portions 11*a*, 12*a*, 13*a*, 21*a*, 22*a*, and 23*a* are placed from one side to another side in the X direction in the order of the elastically deformed portions 12*a*, 22*a*, 11*a*, 21*a*, 13*a*, and 23*a*.

The elastically deformed portion 11*a* is curved to protrude toward one side in the Y direction. Specifically, as illustrated in FIG. 37, the elastically deformed portion 11*a* includes the long plate portions 201 and 202. Each of the long plate portions 201 and 202 is formed into a plate being thick in the X direction.

The long plate portion 201 is the first long plate portion and is formed to extend to one side in the Y direction toward one side in the Z direction. The long plate portion 202 is formed to extend to one side in the Y direction from one end 201*a* of the long plate portion 201 in the Z direction to one side in the Z direction.

The elastically deformed portion 11*b* is located at another side in the Y direction relative to one end 202*a* of the long plate portion 202 in the Z direction. The elastically deformed portion 11*b* is connected to one end 202*a* in the Z direction of the long plate portion 202 via the bent portion 11*c*. The elastically deformed portion 11*a* according to the present embodiment is configured similarly to the elastically deformed portion 11*a* according to the first embodiment.

According to the present embodiment, another side region 201X in the Z direction of the long plate portion 201 for the elastically deformed portion 11*b* provides an overlap region formed to overlap in the X direction (first thickness direction) with another region in the Z direction of the long plate portion 221 of the elastically deformed portion 21*b*.

Specifically, another side region 201X in the Z direction of the long plate portion 201 for the elastically deformed portion 11*b* is formed to overlap with the elastically deformed portions 12*b*, 13*b*, 22*b*, and 13*b* in the X direction (first thickness direction).

Another side region 201X in the Z direction of the long plate portion 201 for the elastically deformed portion 11*b*, along with another region in the Z direction of the long plate portion 221 of the elastically deformed portion 21*b*, is secured to the mount base portion 200 of the vibration source 2 by fastening the common bolt 30*a* (securing member).

In addition, the common bolt 30*a* secures the elastically deformed portions 11*b* and 21*b*, along with the elastically deformed portions 12*b*, 13*b*, 22*b*, and 13*b*, to the mount base portion 200 of vibration source 2.

The elastically deformed portion 12*a*, along with the elastically deformed portions 11*a* and 13*a*, is secured to the mount base portion 200 of the vibration source 2 by fastening the bolt 30*a*. As illustrated in FIG. 35, the elastically deformed portion 12*a* is formed to bend along the elastically deformed portion 11*a*. The elastically deformed portion 12*b* is located on another side in the Y direction relative to the elastically deformed portion 12*a*. The elastically deformed portion 12*b* is connected to the elastically deformed portion 12*a* via the bent portion 11*c*. FIGS. 35 and 36 omit the illustration of the bolt 30*a*.

The elastically deformed portion 13*a*, along with the elastically deformed portions 11*a* and 12*a*, is secured to the mount base portion 200 of the vibration source 2 by fastening the bolt 30*a*. As illustrated in FIG. 35, the elastically deformed portion 13*a* is formed to bend along the elastically deformed portion 11*a*. The elastically deformed portion 13*b* is located at another side in the Y direction relative to the elastically deformed portion 13*a*. The elastically deformed portion 13*b* is connected to the elastically deformed portion 13*a* via the bent portion 13*c*.

As illustrated in FIG. 37, the elastically deformed portion 21*a* is curved to protrude toward another side in the Y direction. Specifically, the elastically deformed portion 21*a* includes the long plate portions 221 and 222. Each of the long plate portions 221 and 222 is formed into a plate being thick in the X direction.

The long plate portion 221 is formed to extend to another side in the Y direction toward one side in the Z direction. The long plate portion 222 is formed to extend to one side in the Y direction from one end 221*a* of the long plate portion 221 in the Z direction to one side in the Z direction.

The elastically deformed portion 21*b* is located at one side in the Y direction relative to one end 222*a* in the Z direction of the long plate portion 221. The elastically deformed portion 21*b* is connected to one end 222*a* in the Z direction of the long plate portion 251 via the bent portion 21*c*. The elastically deformed portion 21*a* according to the present embodiment is configured similarly to the elastically deformed portion 21*a* according to the first embodiment.

The elastically deformed portion 22*a*, along with the elastically deformed portions 21*a* and 23*a*, is secured to the mount base portion 200 of the vibration source 2 by fastening the bolt 30*a*. As illustrated in FIG. 35, the elastically deformed portion 22*a* is formed to bend along the elastically deformed portion 21*a*. The elastically deformed portion 22*b* is located at one side in the Y direction relative to the elastically deformed portion 22*a*. The elastically deformed portion 22*b* is connected to the elastically deformed portion 22*a* via the bent portion 21*c*.

The elastically deformed portion 23*a*, along with the elastically deformed portions 21*a* and 22*a*, is secured to the mount base portion 200 of the vibration source 2 by fastening the bolt 30*a*. As illustrated in FIG. 35, the elastically deformed portion 23*a* is formed to bend along the elastically deformed portion 21*a*. The elastically deformed portion 23*b* is located on one side in the Y direction relative to the elastically deformed portion 23*a*. The elastically deformed portion 23*b* is connected to the elastically deformed portion 23*a* via the bent portion 23*c*.

As illustrated in FIG. 29, the spring units 10B and 10A are symmetrically configured in the X direction. The spring units 20B and 10A are symmetrically configured in the X direction.

According to the above-described embodiment, the anti-vibration device 1 includes the leaf springs 11 and 21 secured to the vibration source 2 and the vibration transmission portion 3. The elastically deformed portion 11*a* of the leaf spring 11 and the elastically deformed portion 21*a* of the leaf spring 21 are each formed into a plate being thick in the X direction and are elastically deformed by vibration transmitted from the vibration source 2 to vibrate in the X direction.

The elastically deformed portion 11*b* of the leaf spring 11 is formed into a plate being thick in the D2 direction and is elastically deformed by vibration transmitted from the vibration source 2 to vibrate in the D2 direction. The elastically deformed portion 21*b* of the leaf spring 21 is formed into a plate being thick in the D5 direction and is elastically deformed by vibration to vibrate in the D5 direction.

Similar to the first embodiment, the anti-vibration device 1 vibrates in three different directions (X, D2, and D5 directions) by vibration transmitted from the vibration source 2.

Similar to the first embodiment, the elastically deformed portions 12*b* and 13*b* of the leaf springs 12 and 13 vibrate to generate sliding friction on the elastically deformed portion 11*b* of the leaf spring 11.

Similar to the first embodiment, the elastically deformed portions 22*b* and 23*b* of the leaf springs 22 and 23 vibrate to generate sliding friction on the elastically deformed portion 21*b* of the leaf spring 21.

Similar to the first embodiment, it is possible to provide the anti-vibration device 1 characterized by the improved anti-vibration performance so that the vibration source 2 is inhibited from transmitting vibrations to the vibration transmission portion 3.

According to the present embodiment, the common bolt 30*a* secures the elastically deformed portion 11*a* of the leaf spring 11 and the elastically deformed portion 21*a* of the leaf spring 21 to the vibration source 2. Therefore, it is possible to decrease the difference between the maximum and minimum values of resonance frequencies fx, fy, fz, fθ, fϕ, and fψ, compared to the case where the elastically deformed portion 11*a* of leaf spring 11 and the elastically deformed portion 21*a* of leaf spring 21 are separately bolted to the vibration source 2.

The present embodiment can easily attenuate the vibration of the leaf springs 11 and 21 compared to the case where the leaf springs 11 and 21 are separately bolted to the vibration source 2.

Fifth Embodiment

In the example according to the fourth embodiment described above, the elastically deformed portion 11*a* is curved to protrude toward one side in the Y direction. The elastically deformed portion 21*a* is curved to protrude toward another side in the Y direction.

By reference to FIGS. 38, 39, and 40, instead, the description below explains the fifth embodiment in which the elastically deformed portion 11*a* is curved to protrude toward one side in the Z direction, and the elastically deformed portion 21*a* is curved to protrude toward one side in the Z direction.

Figure 38:
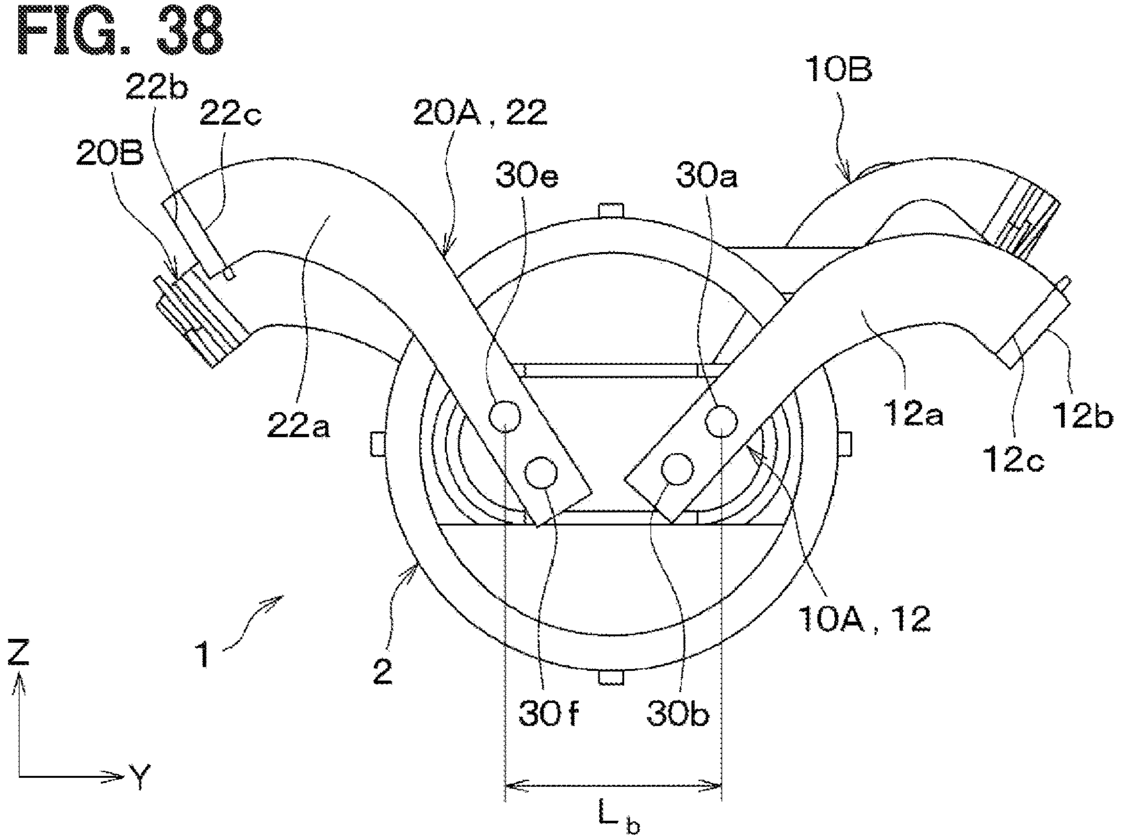
FIG. 38 is a perspective view illustrating the vehicular anti-vibration device connected to the vibration source according to a fifth embodiment by omitting the illustration of the vibration transmission portion and illustrates in detail the structure of two spring units configuring the anti-vibration device.
Figure 39:
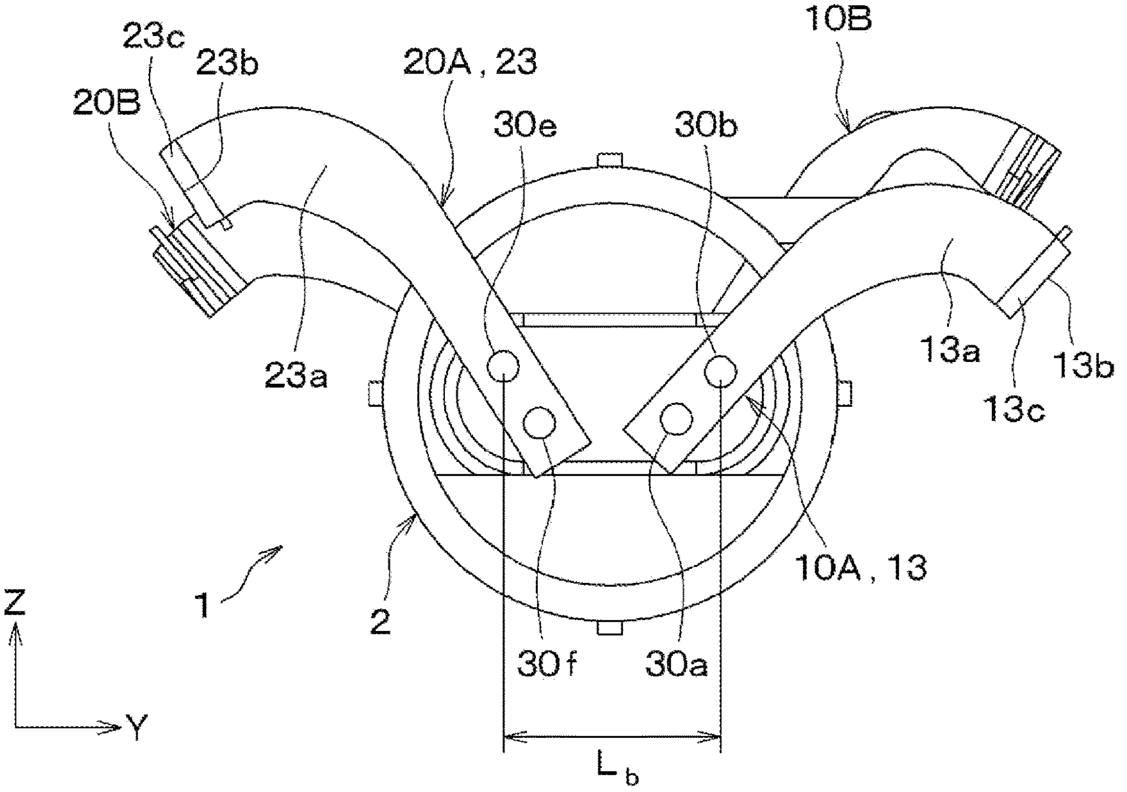
FIG. 39 is a perspective view illustrating the vehicular anti-vibration device connected to the vibration source according to the fifth embodiment in FIG. 38 by omitting the illustration of the vibration transmission portion and illustrates in detail the structure of the two spring units configuring the anti-vibration device.

FIG. 38 is a perspective view illustrating the connection of the spring units 10A, 10B, 20A, and 20B of the anti-vibration device 1 to the vibration source 2 according to the present embodiment while the illustration of the vibration transmission portion 3 is omitted. FIG. 39 illustrates the anti-vibration device 1 viewed axially from one side (front of FIG. 38) of the vibration source 2 after removing the leaf springs 11, 12, 21, and 22 in FIG. 38. FIG. 40 illustrates the anti-vibration device 1 viewed axially from one side (front of FIG. 38) of the vibration source 2 after removing the leaf springs 12 and 22 in FIG. 39.

Figure 40:
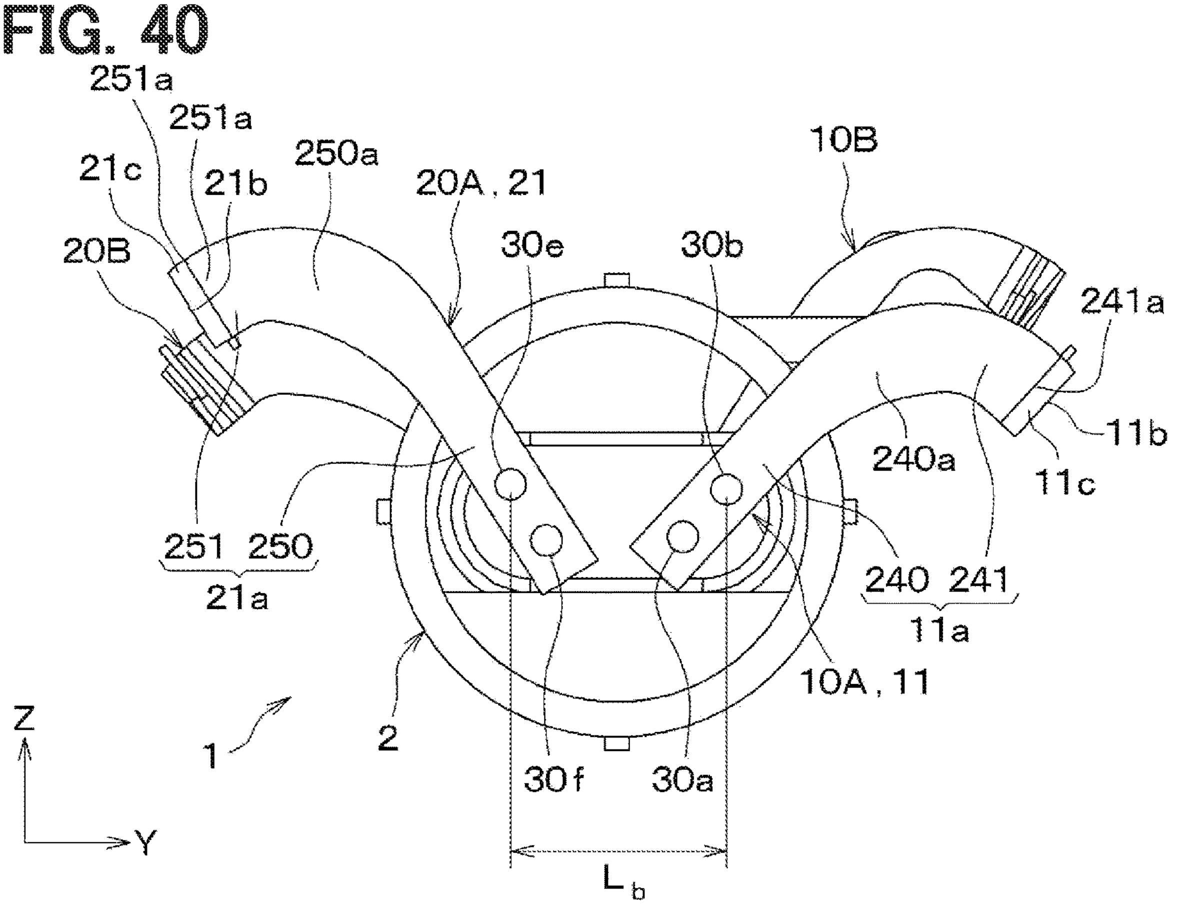
FIG. 40 is a perspective view illustrating the vehicular anti-vibration device connected to the vibration source according to the fifth embodiment in FIG. 38 by omitting the illustration of the vibration transmission portion and illustrates in detail the structure of the two spring units configuring the anti-vibration device.

As illustrated in FIG. 40, the leaf spring 11 of the spring unit 10A according to the present embodiment differs from the leaf spring 11 of the spring unit 10A according to the first embodiment mainly in the elastically deformed portion 11*a*.

The elastically deformed portion 11*a* includes long plate portions 240 and 241. Each of the long plate portions 240 and 241 is formed into a plate being thick in the X direction. The long plate portion 240 is the first long plate portion and is formed to extend to one side in the Y direction toward one side in the Z direction.

The long plate portion 241 is formed to extend to one side in the Y direction from one end 241*a* of the long plate portion 240 in the Z direction to another side in the Y direction. The elastically deformed portion 11*a* is thereby curved to protrude toward one side in the Y direction.

The elastically deformed portion 11*b* is located on another side in the Y direction relative to one end 241*a* of the long plate portion 241 in the Z direction. The elastically deformed portion 11*b* is connected to one end 241*a* of the long plate portion 241 in the Z direction via the bent portion 11*c*. The elastically deformed portion 11*a* according to the present embodiment is configured similarly to the elastically deformed portion 11*a* according to the first embodiment.

The leaf spring 12 of the spring unit 10A according to the present embodiment differs from the leaf spring 12 of the spring unit 10A according to the first embodiment mainly in the elastically deformed portion 12*a*.

The elastically deformed portion 12*a*, along with the elastically deformed portions 11*a* and 13*a*, is secured to the mount base portion 200 of the vibration source 2 by fastening the bolt 30*a*. The elastically deformed portion 12*a* is formed to bend along the elastically deformed portion 11*a*. The elastically deformed portion 12*b* is located on one side in the Y direction of the elastically deformed portion 12*a*. The elastically deformed portion 12*b* is connected to the elastically deformed portion 12*a* via the bent portion 11*c*.

The leaf spring 13 of the spring unit 10A according to the present embodiment differs from the leaf spring 13 of the spring unit 10A according to the first embodiment mainly in the elastically deformed portion 13*a*.

The elastically deformed portion 13*a*, along with the elastically deformed portions 11*a* and 12*a*, is secured to the mount base portion 200 of the vibration source 2 by fastening the bolt 30*a*. As illustrated in FIG. 35, the elastically deformed portion 13*a* is formed to bend along the elastically deformed portion 11*a*. The elastically deformed portion 13*b* is located at another side in the Y direction relative to the elastically deformed portion 13*a*. The elastically deformed portion 13*b* is connected to the elastically deformed portion 13*a* via the bent portion 13*c*.

The elastically deformed portions 11*a*, 12*a*, and 13*a* according to the present embodiment are secured to the mount base portion 200 of the vibration source 2 by fastening bolts 30*a* and 30*b*.

As illustrated in FIG. 40, the leaf spring 21 of the spring unit 20A according to the present embodiment differs from the leaf spring 21 of the spring unit 20A according to the first embodiment mainly in the elastically deformed portion 21*a*.

The elastically deformed portion 21*a* is curved to protrude toward one side in the Z direction. Specifically, the elastically deformed portion 21*a* includes the long plate portions 250 and 251. Each of the long plate portions 250 and 251 is formed into a plate being thick in the X direction.

The long plate portion 240 is the second long plate portion and is formed to extend to another side in the Y direction toward one side in the Z direction. The long plate portion 251 is formed to extend to another side in the Z direction from one end 241*a* of the long plate portion 250 in the Z direction to the other side in the Y direction.

The elastically deformed portion 21*b* is located on another side in the Y direction relative to one end 251*a* of the long plate portion 251 in the Z direction. The elastically deformed portion 21*b* is connected to one end 251*a* of the long plate portion 251 in the Z direction via the bent portion 21*c*.

The elastically deformed portion 21*a* according to the present embodiment is configured similarly to the elastically deformed portion 21*a* according to the first embodiment.

The leaf spring 22 of the spring unit 20A according to the present embodiment differs from the leaf spring 22 of the spring unit 20A according to the first embodiment mainly in the elastically deformed portion 22*a*.

The elastically deformed portion 22*a* is formed to bend along the elastically deformed portion 21*a*. The elastically deformed portion 22*b* is located on another side in the Y direction relative to the elastically deformed portion 22*a*. The elastically deformed portion 22*b* is connected to the elastically deformed portion 22*a* via the bent portion 21*c*.

The leaf spring 23 of the spring unit 20A according to the present embodiment differs from the leaf spring 23 of the spring unit 20A according to the first embodiment mainly in the elastically deformed portion 23*a*.

The elastically deformed portion 23*a* is formed to bend along the elastically deformed portion 21*a*. The elastically deformed portion 23*b* is located on another side in the Y direction relative to the elastically deformed portion 23*a*. The elastically deformed portion 23*b* is connected to the elastically deformed portion 23*a* via the bent portion 23*c*.

The elastically deformed portions 21*a*, 22*a*, and 23*a* according to the present embodiment are secured to the mount base portion 200 of the vibration source 2 by fastening the bolts 30*a* and 30*b*. Similar to the first embodiment, the elastically deformed portions 21*a*, 22*a*, and 23*a* are located on another side in the Y direction relative to the elastically deformed portions 11*a*, 12*a*, and 13*a*.

The spring units 10B and 10A are symmetrically configured in the X direction. The spring units 20B and 10A are symmetrically configured in the X direction.

In terms of the anti-vibration device 1 according to the present embodiment described above, the elastically deformed portion 11*a* of the leaf spring 11 and the elastically deformed portion 21*a* of the leaf spring 21 are each formed into a plate being thick in the X direction and are elastically deformed by vibration transmitted from the vibration source 2 to vibrate in the X direction.

The elastically deformed portion 11*b* of the leaf spring 11 is formed into a plate being thick in the D2 direction and is elastically deformed by vibration transmitted from the vibration source 2 to vibrate in the D2 direction. The elastically deformed portion 21*b* of the leaf spring 21 is formed into a plate being thick in the D5 direction and is elastically deformed by vibration to vibrate in the D5 direction.

Similar to the first embodiment, the anti-vibration device 1 vibrates in three different directions (X, D2, and D5 directions) by vibration transmitted from the vibration source 2.

Similar to the first embodiment, the elastically deformed portion 12*b* vibrates to generate sliding friction on the elastically deformed portion 11*b* of the leaf spring 11. Similar to the first embodiment, the elastically deformed portion 13*b* vibrates to generate sliding friction on the elastically deformed portion 11*b* of the leaf spring 11.

Similar to the first embodiment, the elastically deformed portion 22*b* vibrates to generate sliding friction on the elastically deformed portion 21*b* of the leaf spring 21. Similar to the first embodiment, elastically deformed portion 23*b* vibrates to generate sliding friction on the elastically deformed portion 21*b* of the leaf spring 21.

Similar to the first embodiment, it is possible to provide the anti-vibration device 1 characterized by the improved anti-vibration performance so that the vibration source 2 is inhibited from transmitting vibrations to the vibration transmission portion 3.

Sixth Embodiment

In the example according to the fifth embodiment described above, the elastically deformed portions 11*a*, 12*a*, and 13*a* of the spring unit 10A are located on one side in the Y direction relative to the elastically deformed portions 21*a*, 22*a*, and 23*a* of the spring unit 20A.

By reference to FIGS. 41, 42, 43, and 44, instead, the description below explains the sixth embodiment in which the elastically deformed portions 11*a*, 12*a*, and 13*a* of the spring unit 10A and the elastically deformed portions 21*a*, 22*a*, and 23*a* of the spring unit 20A are located to overlap in the X direction.

Figure 41:
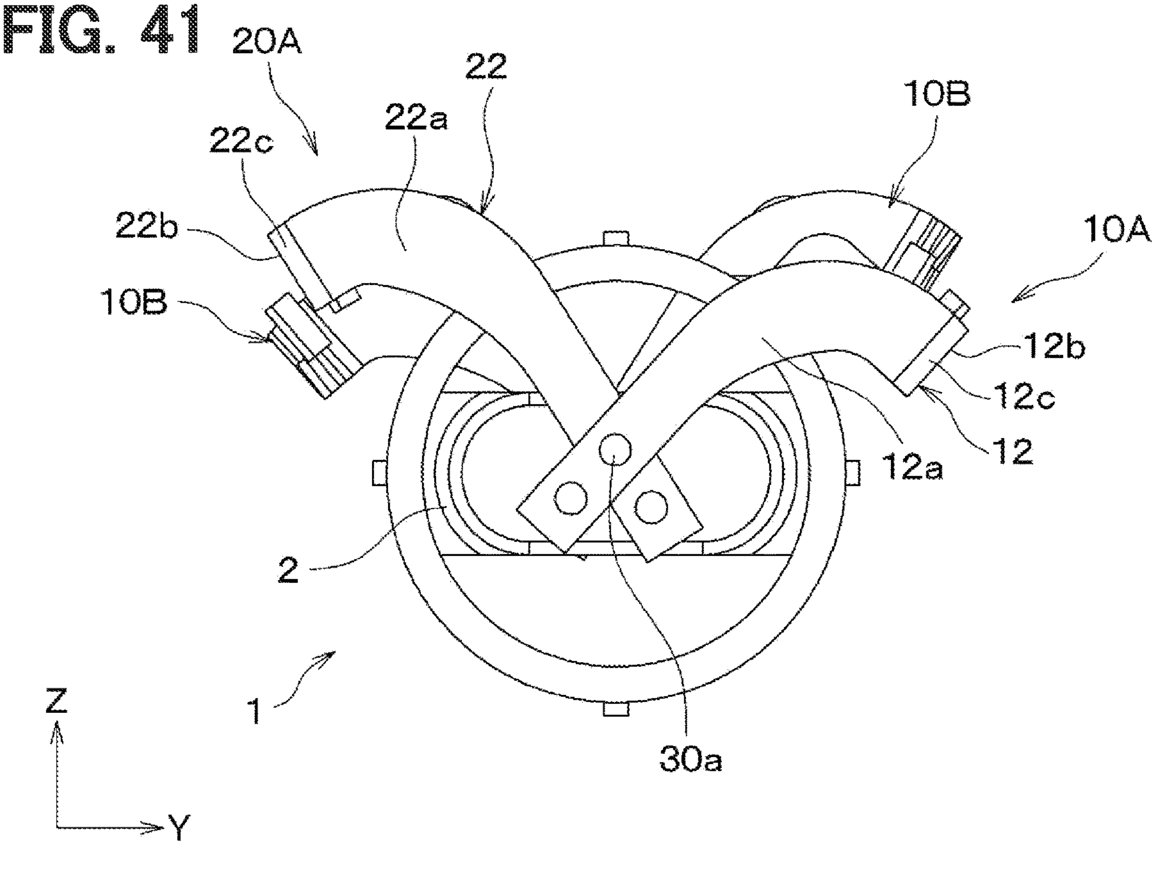
FIG. 41 is a perspective view illustrating the vehicular anti-vibration device connected to the vibration source according to a sixth embodiment by omitting the illustration of the vibration transmission portion and illustrates in detail the structure of the two spring units configuring the anti-vibration device.
Figure 42:
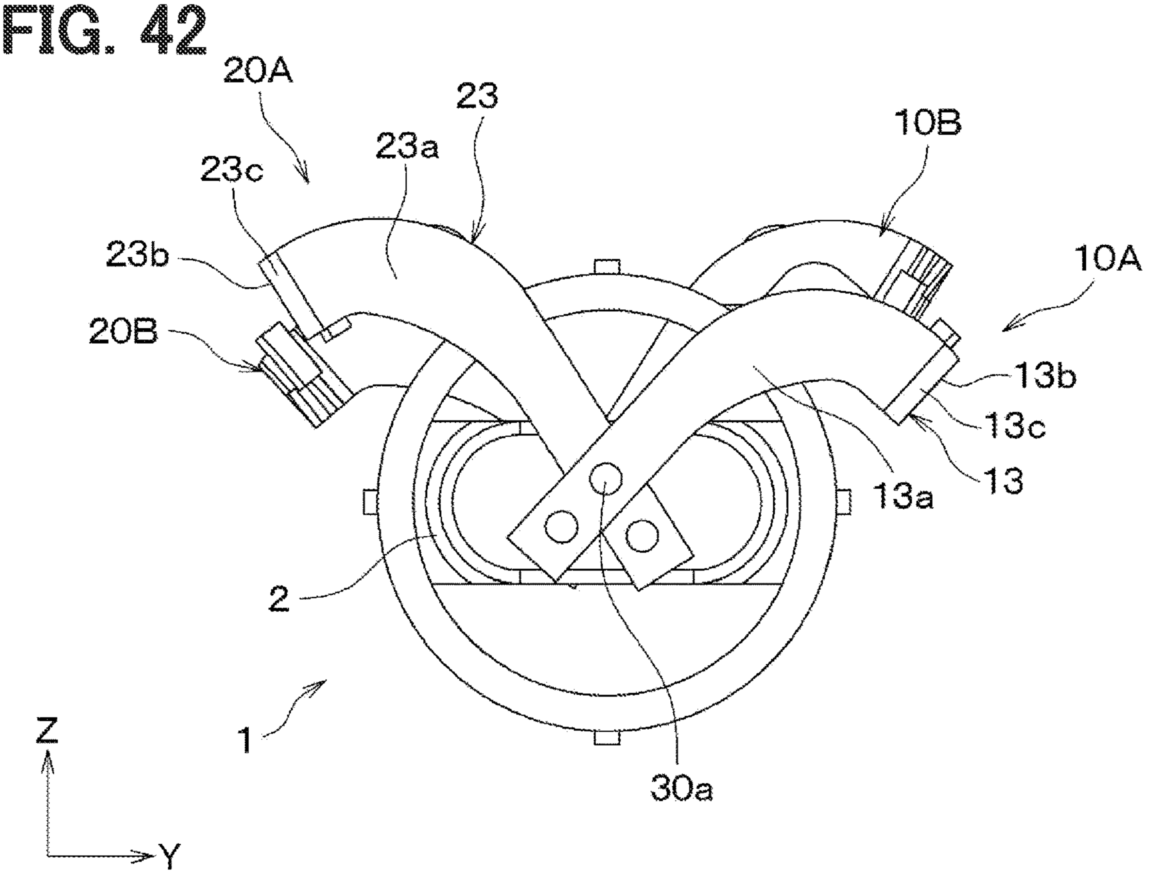
FIG. 42 is a perspective view illustrating the vehicular anti-vibration device connected to the vibration source according to the sixth embodiment in FIG. 41 by omitting the illustration of the vibration transmission portion and illustrates in detail the structure of the two spring units configuring the anti-vibration device.
Figure 43:
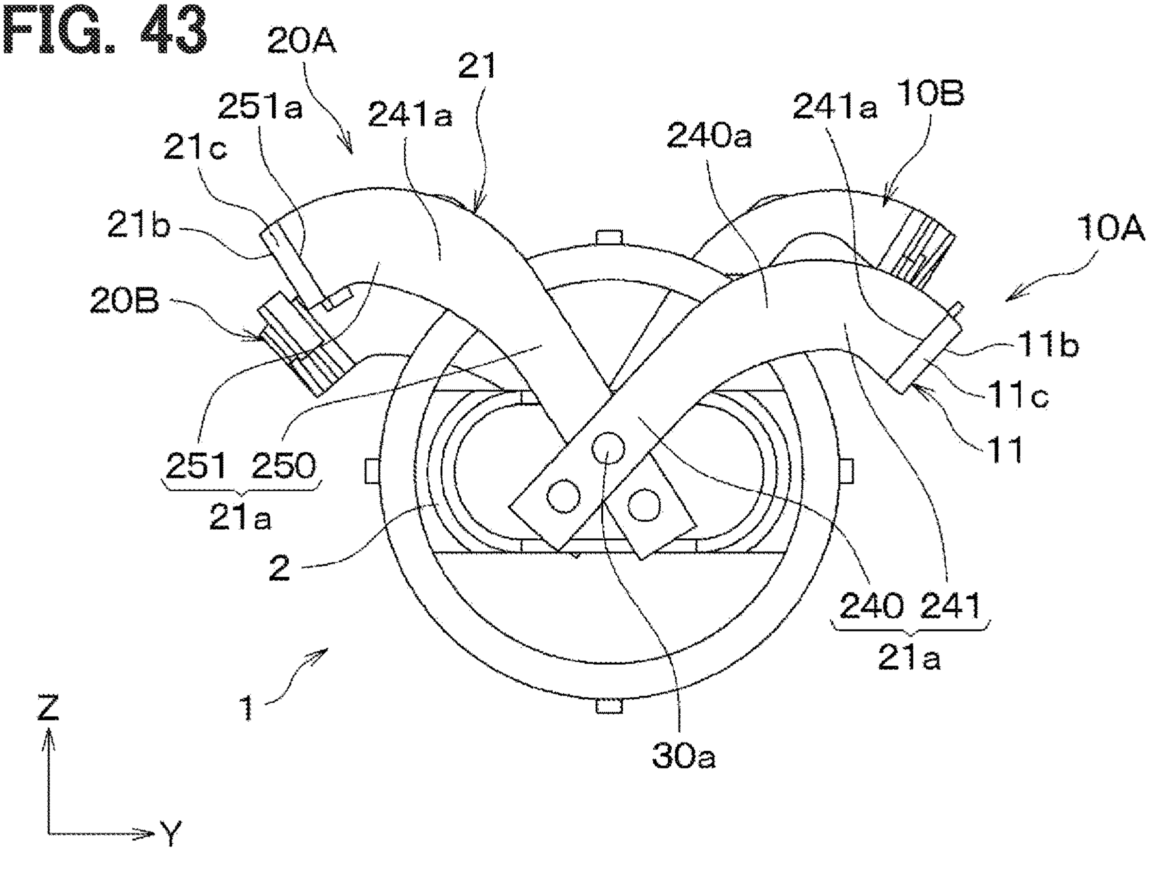
FIG. 43 is a perspective view illustrating the vehicular anti-vibration device connected to the vibration source according to the sixth embodiment in FIG. 41 by omitting the illustration of the vibration transmission portion and illustrates in detail the structure of the two spring units configuring the anti-vibration device.

FIG. 41 illustrates the anti-vibration device 1 according to the present embodiment, viewed axially from one side of the vibration source 2. FIG. 42 illustrates the anti-vibration device 1 viewed axially from one side of the vibration source 2 after removing the leaf springs 11, 12, 21, and 22 in FIG. 41. FIG. 43 illustrates the anti-vibration device 1 viewed axially from one side of the vibration source 2 after removing the leaf springs 12 and 22.

As illustrated in FIG. 41, the leaf spring 12 according to the present embodiment is shaped similarly to the leaf spring 12 according to the fifth embodiment. As illustrated in FIG. 41, the leaf spring 22 according to the present embodiment is shaped similarly to the leaf spring 22 according to the fifth embodiment.

As illustrated in FIG. 42, the leaf spring 13 according to the present embodiment is shaped similarly to the leaf spring 13 according to the fifth embodiment. As illustrated in FIG. 42, the leaf spring 23 according to the present embodiment is shaped similarly to the leaf spring 23 according to the fifth embodiment.

As illustrated in FIG. 43, the leaf spring 11 according to the present embodiment is shaped similarly to the leaf spring 11 according to the fifth embodiment. As illustrated in FIG. 43, the leaf spring 21 according to the present embodiment is shaped similarly to the leaf spring 21 according to the fifth embodiment.

Similar to the fourth embodiment, the elastically deformed portions 11*a*, 12*a*, and 13*a* and the elastically deformed portions 21*a*, 22*a*, and 23*a* are located to overlap in the Z direction. Similar to the fourth embodiment, the common bolt 30*a* secures the elastically deformed portions 11*a*, 12*a*, and 13*a* and the elastically deformed portions 21*a*, 22*a*, and 23*a* to the vibration source 2 at mutually overlapping regions.

In terms of the anti-vibration device 1 according to the present embodiment described above, the elastically deformed portions 11*a* and 21*a* of the leaf springs 11 and 21 are elastically deformed by vibration transmitted from the vibration source 2 to vibrate in the X direction. The elastically deformed portion 11*b* of the leaf springs 11 is elastically deformed by vibration transmitted from the vibration source 2 to vibrate in the D2 direction. The elastically deformed portion 21*b* of the leaf spring 21 is formed into a plate being thick in the D5 direction and is elastically deformed by vibration to vibrate in the D5 direction.

Similar to the first embodiment, the leaf springs 12 and 13 vibrate to generate sliding friction on the leaf spring 11. Therefore, leaf springs 12 and 13 can attenuate the vibration of the leaf spring 11 transmitted from the vibration source 2. Similar to the first embodiment, the leaf springs 22 and 23 vibrate to generate sliding friction on the leaf spring 21. Therefore, the leaf springs 22 and 23 can attenuate the vibration of the leaf spring 21 transmitted from the vibration source 2.

The spring units 20A and 10A can inhibit transmission of the vibration from the vibration source 2 to the support portion 3*a* of the vibration transmission portion 3.

According to the present embodiment, the common bolt 30*a* secures the elastically deformed portion 11*a* of the leaf spring 11 and the elastically deformed portion 21*a* of the leaf spring 21 to the vibration source 2.

Figure 44:
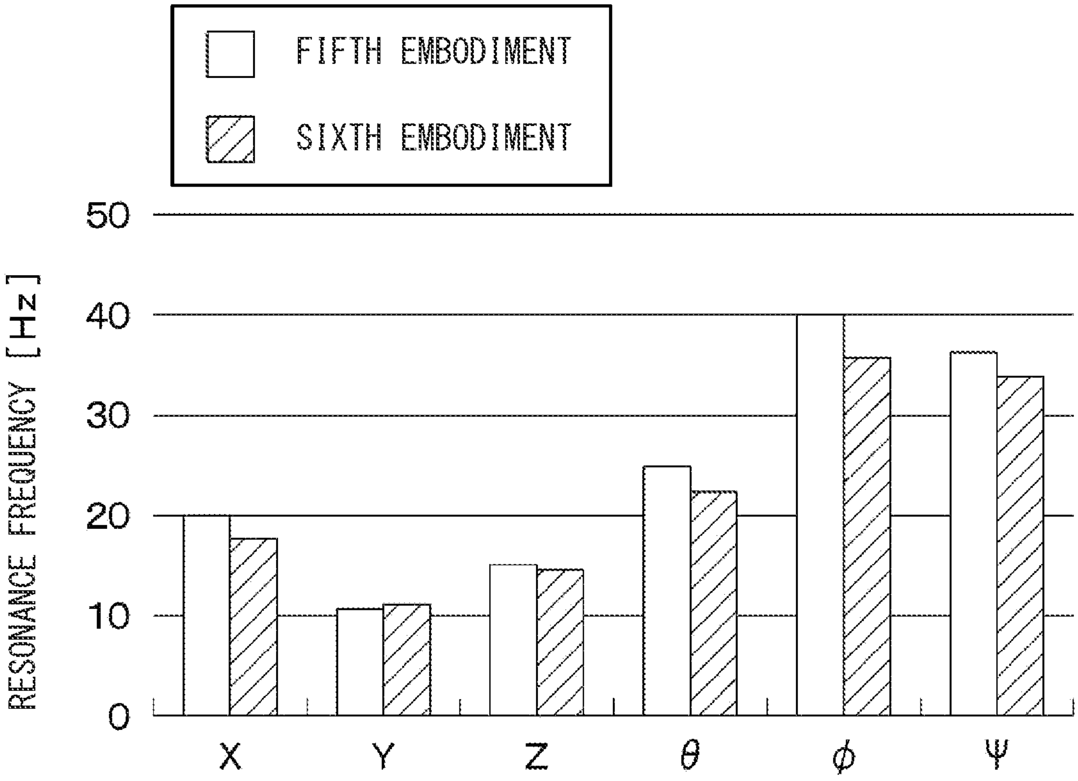
FIG. 44 is a diagram illustrating the comparison among resonance frequencies in six directions according to the sixth embodiment in FIG. 41 based on whether the two spring units are connected to the vibration source through the use of a common bolt or two independent bolts.

FIG. 44 is a diagram illustrating the comparison between the present embodiment and the fifth embodiment in terms of resonance frequencies fx, fy, fz, fθ, fϕ, and fψ in the x, y, z, θ, ϕ, and ψ directions of the anti-vibration device 1.

As illustrated in FIG. 44, the fifth embodiment indicates resonance frequency fϕ as the maximum value and resonance frequency fy as the minimum value out of resonance frequencies fx, fy, fz, fθ, fϕ, and fψ. The present embodiment indicates resonance frequency fϕ as the maximum value and resonance frequency fy as the minimum value out of resonance frequencies fx, fy, fz, fθ, fϕ, and fψ.

As can be seen from FIG. 44, it is possible to decrease the difference between the maximum and minimum values of resonance frequencies fx, fy, fz, fθ, and fψ, compared to the anti-vibration device 1 according to the fifth embodiment. The leaf springs 12, 13, 22, and 23 can more easily attenuate vibrations of the leaf springs 11 and 21 by using the common bolt 30*a* to secure the leaf springs 11 and 21 to the vibration source 2.

Seventh Embodiment

In the example according to the first embodiment described above, the leaf spring 11 includes the elastically deformed portion 11*b* located on one side in the Y direction relative to the elastically deformed portion 11*a*. Moreover, the leaf spring 12 includes the elastically deformed portion 21*b* located on another side in the Y direction relative to the elastically deformed portion 21*a*.

By reference to FIGS. 45, 46, and 47, instead, the description below explains the seventh embodiment in which the elastically deformed portion 11*b* of the leaf spring 11 is located on one side in the D1 direction relative to the elastically deformed portion 11*a* and the elastically deformed portion 21*b* of the leaf spring 12 is located on one side in the D4 direction relative to the elastically deformed portion 21*a*.

Figure 45:
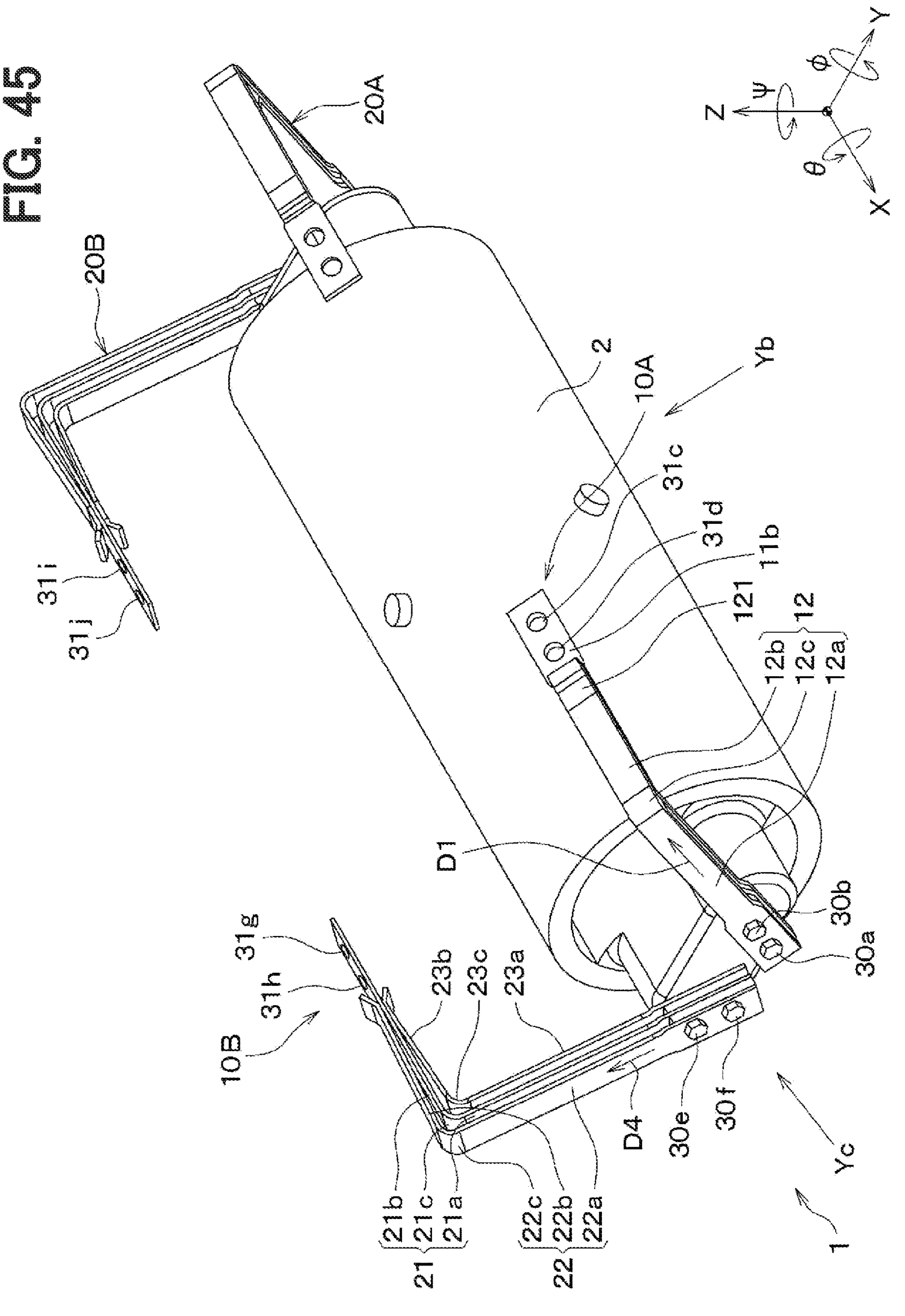
FIG. 45 is a perspective view illustrating the vehicular anti-vibration device connected to the vibration source according to a seventh embodiment by omitting the illustration of the vibration transmission portion and illustrates in detail the structure of the two spring units configuring the anti-vibration device.

FIG. 45 is a perspective view illustrating the connection of the spring units 10A, 10B, 20A, and 20B of the anti-vibration device 1 to the vibration source 2 according to the present embodiment while the illustration of the vibration transmission portion 3 is omitted. FIG. 46 illustrates the anti-vibration device in FIG. 45, viewed along arrow Yb. FIG. 47 is a perspective view illustrating the anti-vibration device 1 in FIG. 45, viewed in one axial direction of the vibration source 2 after removing the leaf springs 12 and 22.

The present embodiment differs from the first embodiment in the positional relationship between the elastically deformed portion 11*a* and the elastically deformed portion 11*b* of the leaf spring 11.

According to the present embodiment, the leaf spring 11 is formed into an L shape so that the elastically deformed portion 11*a* and the elastically deformed portion 11*b* are connected via the bent portion 11*c*. Similarly, the leaf spring 12 is formed into an L shape so that the elastically deformed portion 12*a* and the elastically deformed portion 12*b* are connected via the bent portion 12*c*. The leaf spring 13 is formed into an L shape so that the elastically deformed portion 13*a* and the elastically deformed portion 13*b* are connected via the bent portion 13*c*.

According to the present embodiment, each of the elastically deformed portions 11*b*, 12*b*, and 13*b* is formed into a plate that is thick in the D1 direction of FIG. 45 and extends in the X direction perpendicular to the D1 direction.

The present embodiment differs from the first embodiment in the positional relationship between the elastically deformed portion 21*a* and the elastically deformed portion 21*b* of the leaf spring 21.

According to the present embodiment, the leaf spring 21 is formed into an L shape so that the elastically deformed portion 21*a* and the elastically deformed portion 21*b* are connected via the bent portion 21*c*. Similarly, the leaf spring 22 is formed into an L shape so that the elastically deformed portion 22*a* and the elastically deformed portion 22*b* are connected via the bent portion 22*c*. The leaf spring 23 is formed into an L shape so that the elastically deformed portion 23*a* and the elastically deformed portion 23*b* are connected via the bent portion 23*c*.

According to the present embodiment, each of the elastically deformed portions 21*b*, 22*b*, and 23*b* is formed into a plate that is thick in the D4 direction of FIG. 45 and extends in the X direction perpendicular to the D4 direction. The D1 and D4 directions cross each other (for example, orthogonally).

Figure 46:
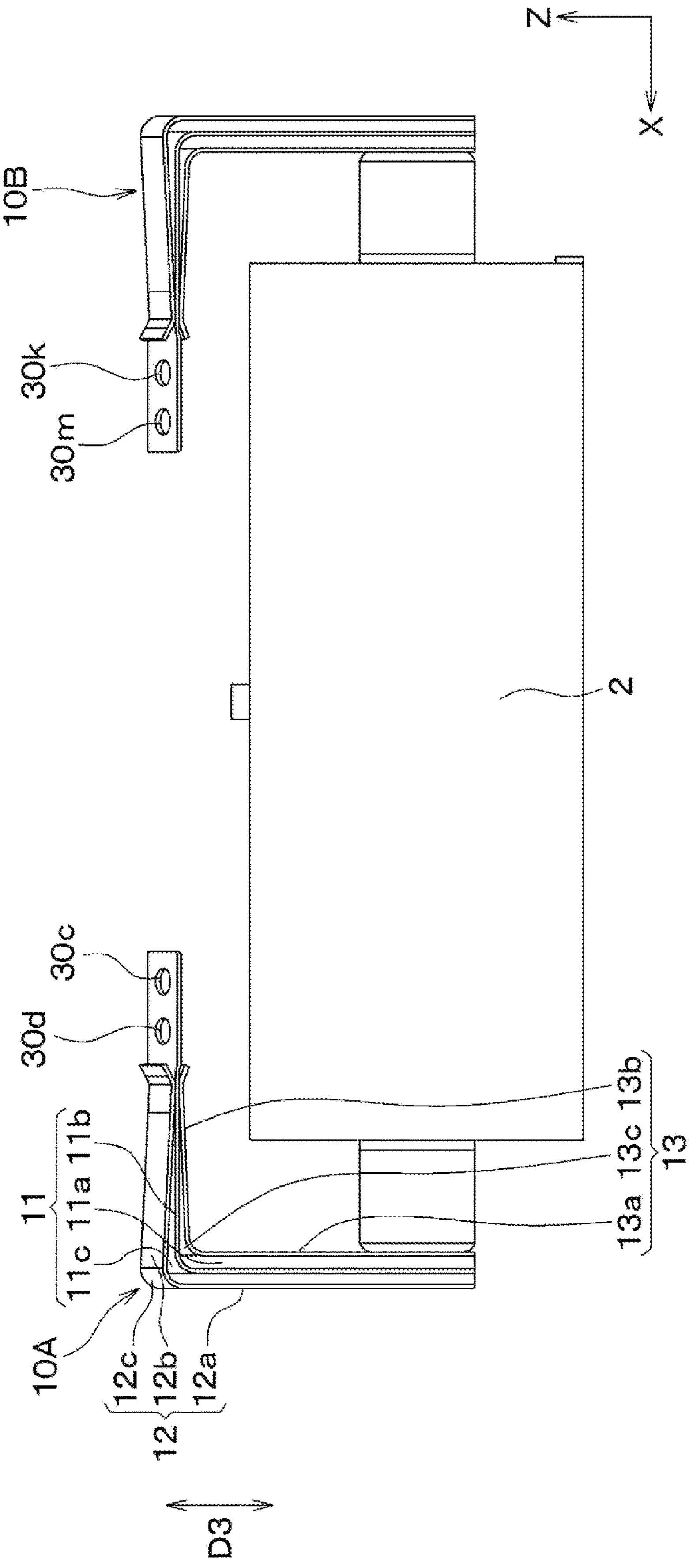
FIG. 46 illustrates the anti-vibration device according to the seventh embodiment viewed along arrow Yb in FIG. 45 and supplements the explanation of the configuration of the leaf springs of each of the two spring units.
Figure 47:
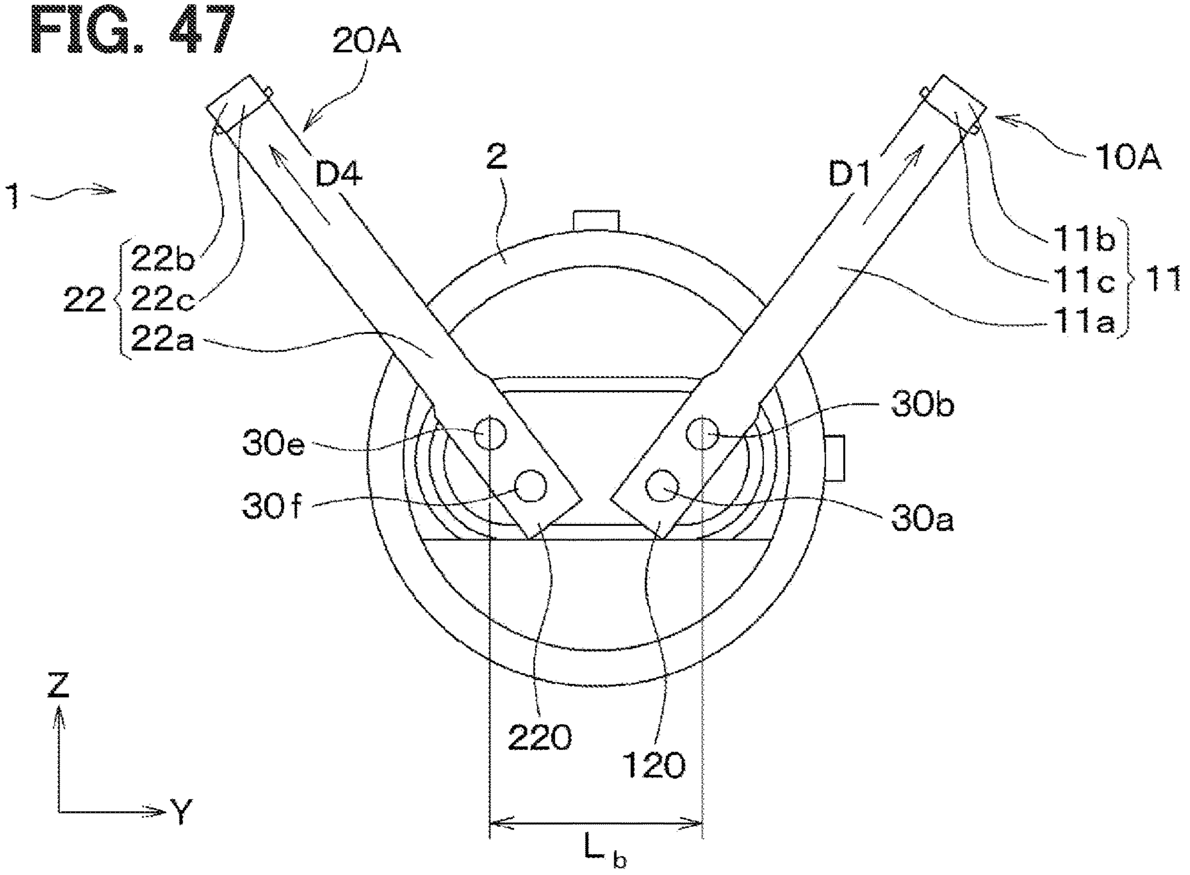
FIG. 47 illustrates the anti-vibration device according to the seventh embodiment viewed along arrow Yc in FIG. 45 and supplements the explanation of the configuration of the leaf springs of each of the two spring units.

As illustrated in FIGS. 45 and 46, the spring units 10B and 10A are symmetrically configured in the X direction. The spring units 20B and 10A are symmetrically configured in the X direction.

In terms of the anti-vibration device 1 according to the present embodiment described above, the elastically deformed portion 11*a* of the leaf spring 11 and the elastically deformed portion 21*a* of the leaf spring 21 are each formed into a plate being thick in the X direction and are elastically deformed by vibration transmitted from the vibration source 2 to vibrate in the X direction.

The elastically deformed portion 11*b* of the leaf spring 11 is formed into a plate being thick in the D1 direction and is elastically deformed by vibration transmitted from the vibration source 2 to vibrate in the D1 direction. The elastically deformed portion 21*b* of the leaf spring 21 is formed into a plate being thick in the D4 direction and is elastically deformed by vibration to vibrate in the D4 direction.

Practically similar to the first embodiment, the anti-vibration device 1 vibrates in three different directions (X, D1, and D4 directions) by vibration transmitted from the vibration source 2.

Similar to the first embodiment, another region in the X direction 121 of the elastically deformed portion 12*b* vibrates to generate sliding friction on the elastically deformed portion 11*b* of the leaf spring 11. The elastically deformed portion 13*b* vibrates to generate sliding friction on the elastically deformed portion 11*b* of the leaf spring 11.

Similar to the first embodiment, another region in the X direction 221X of the elastically deformed portion 22*b* vibrates to generate sliding friction on the elastically deformed portion 21*b* of the leaf spring 21. Similar to the first embodiment, elastically deformed portion 23*b* vibrates to generate sliding friction on the elastically deformed portion 21*b* of the leaf spring 21.

The anti-vibration device 1 can improve the anti-vibration performance of attenuating the vibration transmitted from the vibration source 2 to the vibration transmission portion 3.

Figure 48:
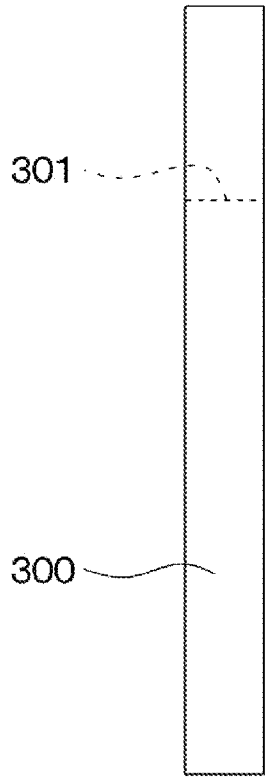
FIG. 48 illustrates a long plate material used to manufacture the leaf spring of the spring unit configuring the anti-vibration device according to the seventh embodiment in FIG. 45.

The leaf spring 11 according to the present embodiment is formed in such a way that multiple long plate members 300 illustrated in FIG. 48 are cut out from one plate and these long plate members 300 are each bent into an L shape along a boundary line 301. The leaf springs 12, 13, 21, 22, and 23 are also formed similarly. It is possible to improve the fabrication yield of the leaf springs 11, 12, 13, 21, 22, and 23 by decreasing members unused for the leaf springs. FIG. 48 is a front view illustrating the long plate member 300 used to manufacture the leaf spring 11.

Eighth Embodiment

In the example according to the first embodiment described above, the leaf springs 12, 13, 22, and 23 are each secured to the vibration source 2 and are open to the vibration transmission portion 3.

By reference to FIGS. 49, 50, 51, and 52, instead, the description below explains the fifth embodiment in which the leaf springs 12, 13, 22, and 23 are each secured to the vibration transmission portion 3 and are open to the vibration source 2.

Figure 49:
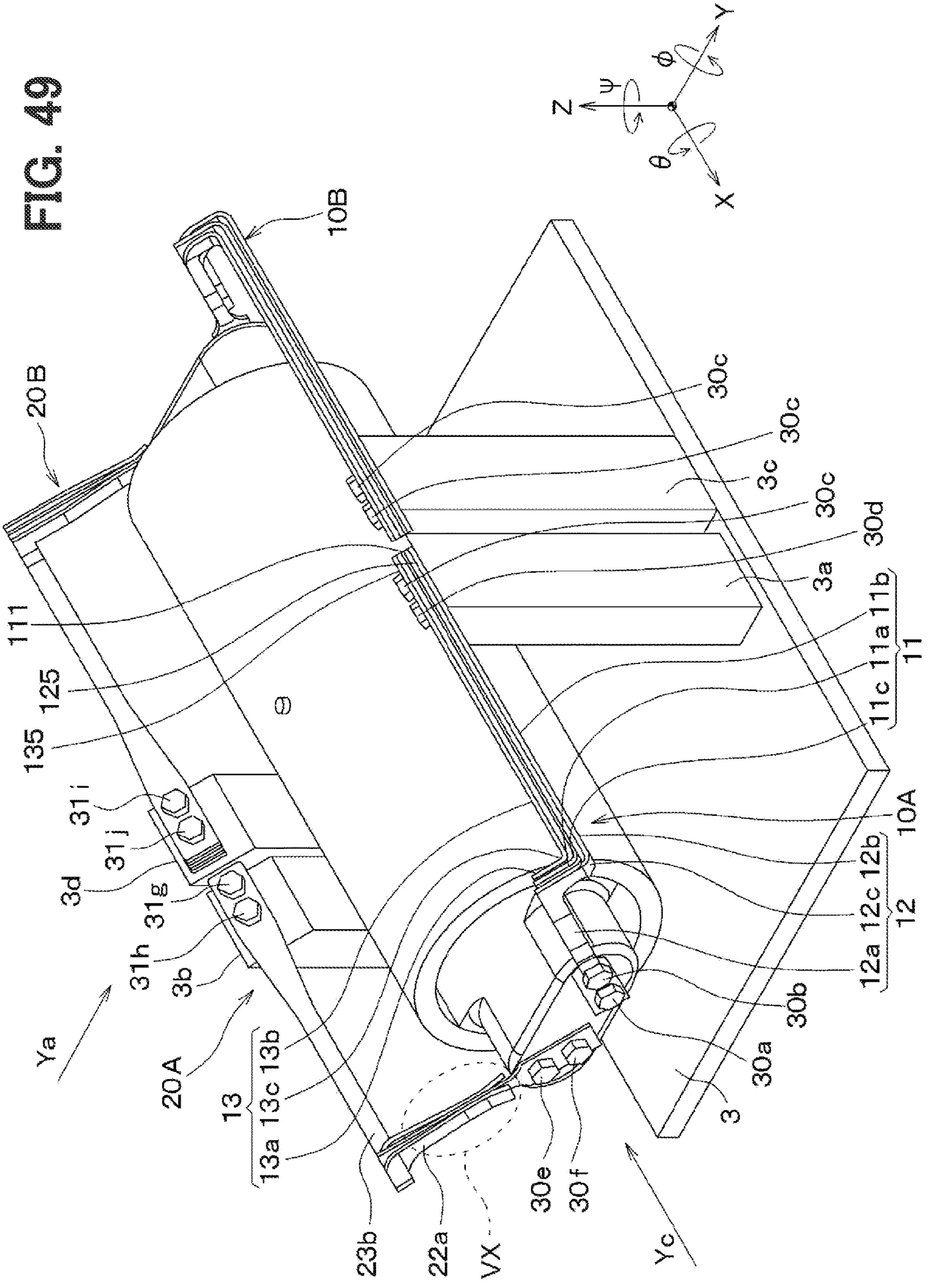
FIG. 49 is an overall perspective view illustrating the vehicular anti-vibration device according to an eighth embodiment connected among four support portions of a vibration transmission portion and a vibration source and illustrates in detail the structure of four spring units configuring the anti-vibration device.
Figure 50:
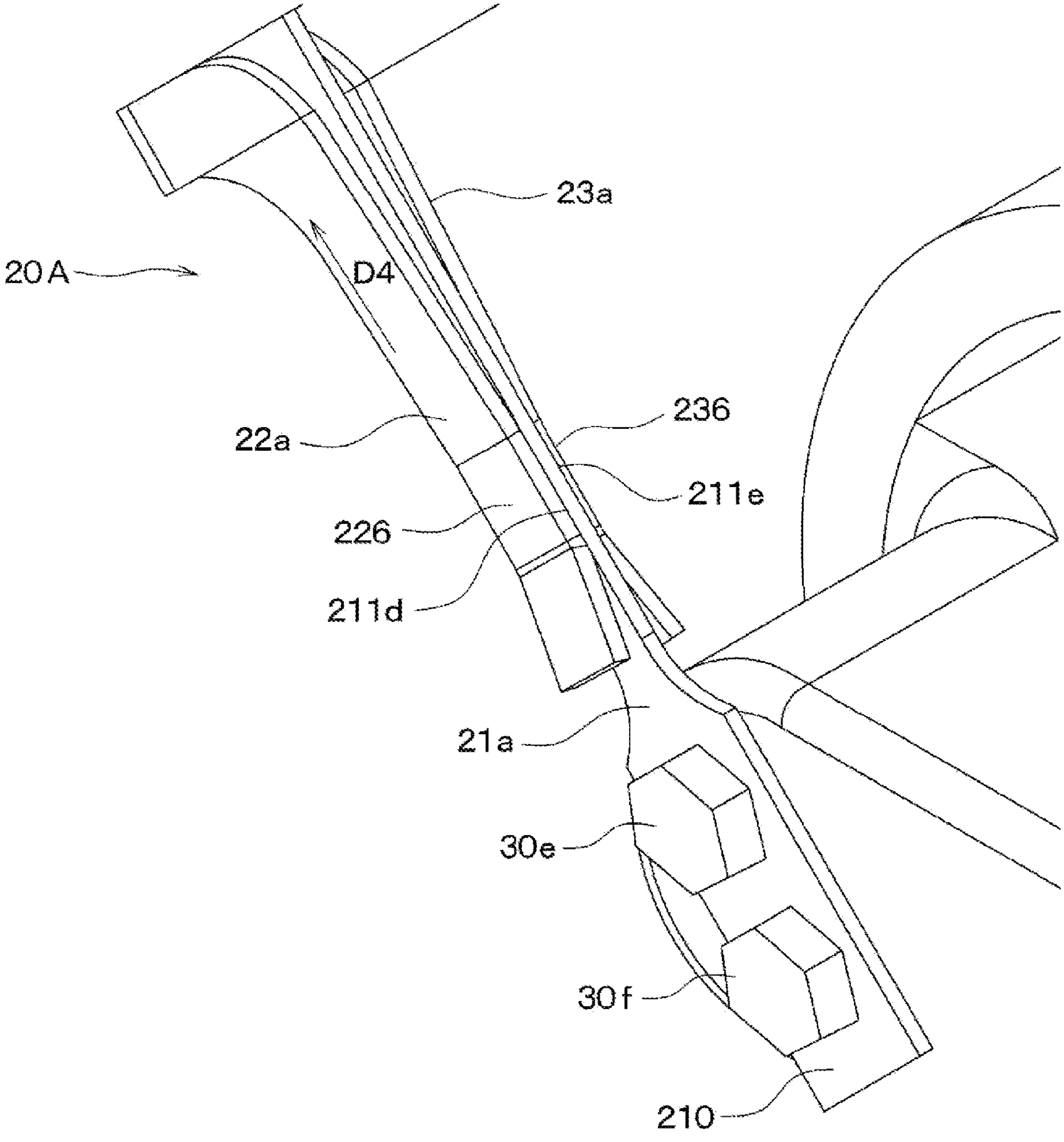
FIG. 50 is an enlarged view of part VX in the spring unit of the anti-vibration device according to the eighth embodiment in FIG. 49 and illustrates the spring unit causing sliding friction between the elastically deformed portion of one leaf spring and another region in the X direction of the elastically deformed portion of another leaf spring.
Figure 51:
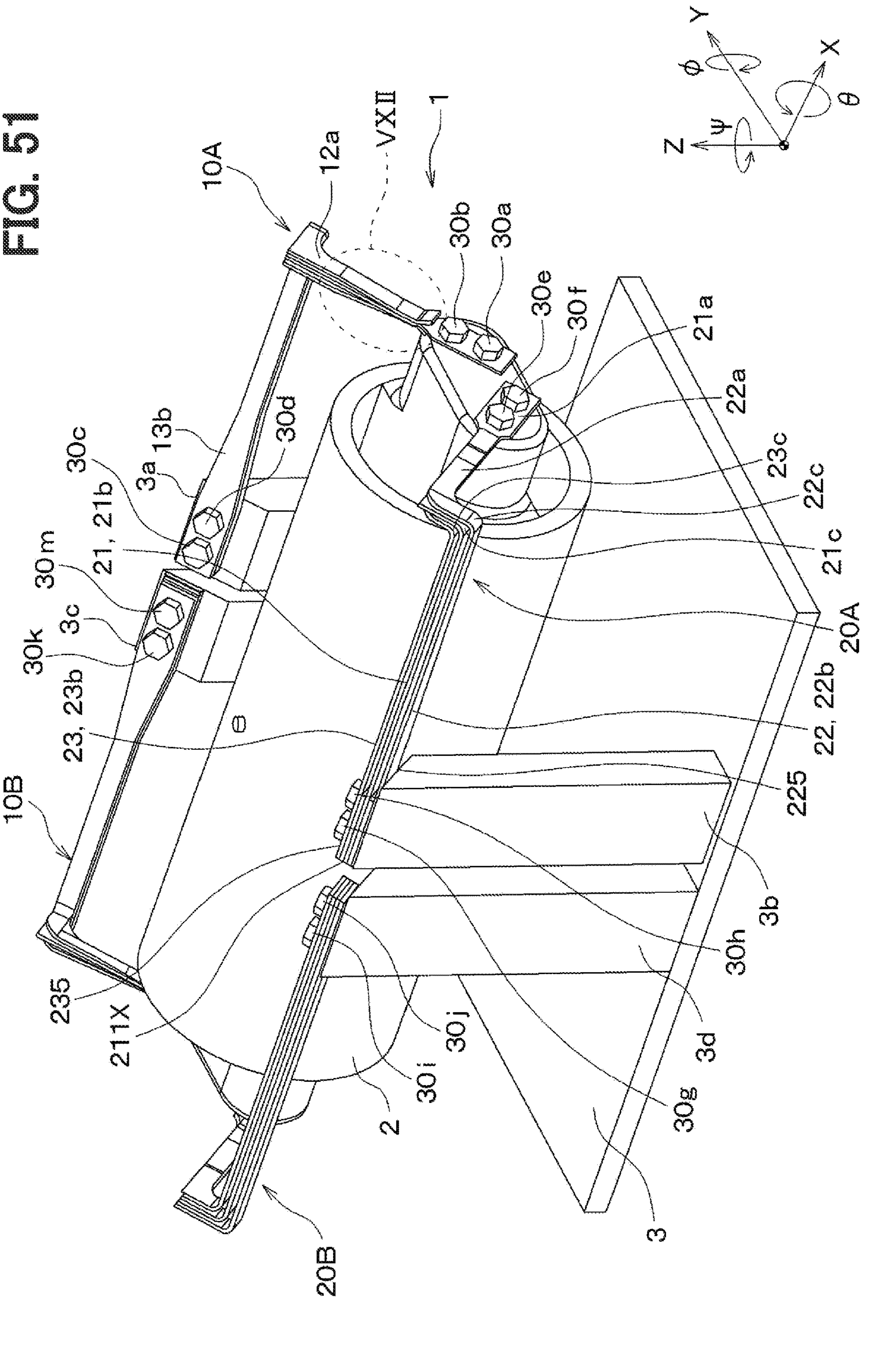
FIG. 51 illustrates the anti-vibration device according to the eighth embodiment viewed along arrow Ya in FIG. 49 and supplements the explanation of the configuration of the leaf springs of each of the four spring units.
Figure 52:
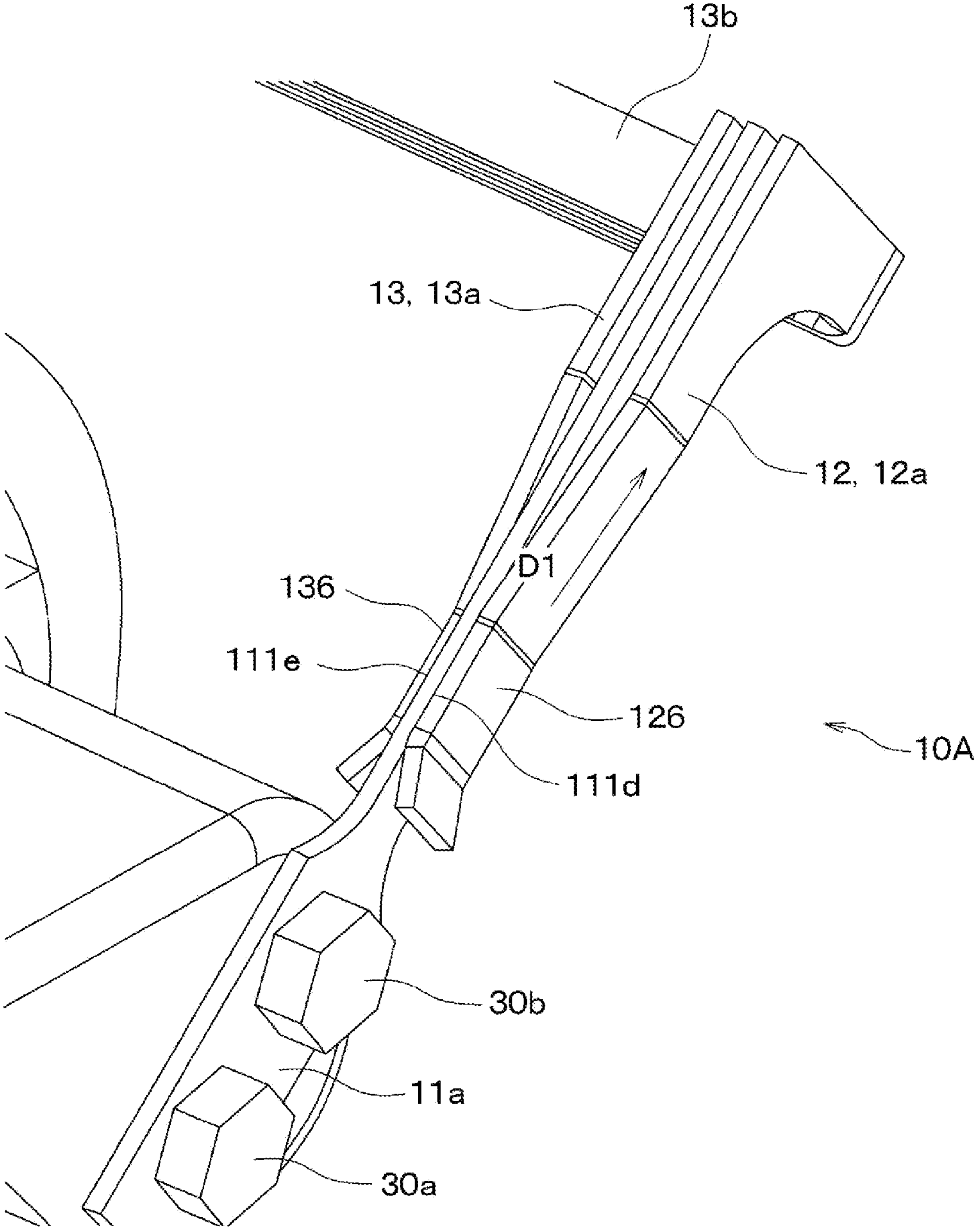
FIG. 52 is an enlarged view of part VXII in the spring unit of the anti-vibration device according to the eighth embodiment in FIG. 51 and illustrates the spring unit causing sliding friction between the surface of the elastically deformed portion of one leaf spring and another region in the X direction of the elastically deformed portion of another leaf spring.

FIG. 49 is a perspective view illustrating the anti-vibration device 1 according to the present embodiment secured to the vibration source 2 and the vibration transmission portion 3. FIG. 50 is an enlarged view of part VX of the anti-vibration device 1 in FIG. 49. FIG. 51 illustrates the anti-vibration device 1, the vibration source 2, and the vibration transmission portion 3 in FIG. 49, viewed along arrow Ya. FIG. 52 is an enlarged view of part VXII of the anti-vibration device 1 in FIG. 51.

As illustrated in FIGS. 49, 51, and 52, similar to the first embodiment, the leaf springs 11 and 21 of the anti-vibration device 1 according to the present embodiment are secured to the vibration source 2 through the use of the bolts 30*a* and 30*b* and to the vibration transmission portion 3 through the use of the bolts 30*c* and 30*d*.

The anti-vibration device 1 according to the present embodiment differs from the anti-vibration device 1 according to the first embodiment in the leaf springs 12, 13, 22, and 23.

One region in the Z direction 125 of the elastically deformed portion 12*b* of the leaf spring 12, along with another region in the X direction 111 of the elastically deformed portion 11*b* of the leaf spring 11, is secured to the support portion 3*a* of the vibration transmission portion 3 by fastening the bolts 30*c* and 30*d*.

The elastically deformed portion 12*a* of the leaf spring 12 is open to the vibration source 2 and the leaf spring 11. One region in the D1 direction 126 of the elastically deformed portion 12*a* of the leaf spring 12 vibrates to generate sliding friction on the surface 111*d* of the elastically deformed portion 11*a* of the leaf spring 11, inhibiting the transmission of vibration from the vibration source 2 to the vibration transmission portion 3 via the leaf spring 11.

According to the present embodiment, the elastically deformed portion 12 previously has an elastic force that pushes one region in the D1 direction 126 against the surface 111*d* of the elastically deformed portion 11*a* of the leaf spring 11.

One region in the Z direction 135 of the elastically deformed portion 13*b* of the leaf spring 13, along with another region in the X direction 111 of the elastically deformed portion 11*b*, is secured to the support portion 3*a* of the vibration transmission portion 3 by fastening the bolts 30*c* and 30*d*.

The elastically deformed portion 13*a* of the leaf spring 13 is open to the vibration source 2 and the leaf spring 11. As described below, one region in the D1 direction 136 of the elastically deformed portion 13*a* of the leaf spring 13 vibrates to generate sliding friction on the surface 111*e* of the elastically deformed portion 11*a* of the leaf spring 11, inhibiting the transmission of vibration from the vibration source 2 to the vibration transmission portion 3 via the leaf spring 11.

According to the present embodiment, the elastically deformed portion 13 previously has an elastic force that pushes one region in the D1 direction 136 against the surface 111*e* of the elastically deformed portion 11*a* of the leaf spring 11. The surfaces 111*d* and 111*e* of the elastically deformed portion 11*a* of the leaf spring 11 are each formed to flatly expand in the X direction. The surfaces 111*d* and 111*e* are aligned in the X direction. The surface 111*d* is located on one side in the X direction relative to the surface 111*e*.

The leaf springs 12 and 13 according to the present embodiment vibrate to generate sliding friction on the leaf spring 11 and thereby configures the first vibration attenuating member that inhibits the transmission of vibration from the vibration source 2 to the vibration transmission portion 3 via the leaf spring 11.

One region in the Z direction 225 of the elastically deformed portion 22*b* of the leaf spring 22, along with another region in the X direction 211X of the elastically deformed portion 21*b* of the leaf spring 21, is secured to the support portion 3*b* of the vibration transmission portion 3 by fastening the bolts 30*h* and 30*g*.

The elastically deformed portion 22*a* of the leaf spring 22 is open to the vibration source 2 and the leaf spring 22. As described below, one region in the D4 direction 226 of the elastically deformed portion 22*a* of the leaf spring 22 vibrates to generate sliding friction on the surface 211*d* of the elastically deformed portion 21*a* of the leaf spring 21, inhibiting the transmission of vibration from the vibration source 2 to the vibration transmission portion 3 via the leaf spring 21.

According to the present embodiment, the leaf spring 22 previously has an elastic force that pushes one region in the D4 direction 226 against the surface 211*d* of the elastically deformed portion 21*a* of the leaf spring 21.

One region in the Z direction 235 of the elastically deformed portion 23*b* of the leaf spring 23, along with another region in the X direction 211X of the elastically deformed portion 21*b*, is secured to the support portion 3*b* of the vibration transmission portion 3 by fastening the bolts 30*g* and 30*h*.

The elastically deformed portion 23*a* of the leaf spring 23 is open to the vibration source 2 and the leaf spring 21. As described below, one region in the D4 direction 236 of the elastically deformed portion 23*a* of the leaf spring 23 vibrates to generate sliding friction on the surface 211*e* of the elastically deformed portion 21*a* of the leaf spring 21, inhibiting the transmission of vibration from the vibration source 2 to the vibration transmission portion 3 via the leaf spring 21.

According to the present embodiment, the leaf spring 23 previously has an elastic force that pushes one region in the D4 direction 236 against the surface 211*e* of the elastically deformed portion 21*a* of the leaf spring 21.

The leaf springs 22 and 23 according to the present embodiment vibrate to generate sliding friction on the leaf spring 21 and thereby configures the second vibration attenuating member that inhibits the transmission of vibration from the vibration source 2 to the vibration transmission portion 3 via the leaf spring 21.

As illustrated in FIGS. 49 and 51, the spring units 10B and 10A are symmetrically configured in the X direction. The spring units 20B and 10A are symmetrically configured in the X direction.

The description below explains operations of the anti-vibration device 1 according to the present embodiment.

The vibration generated from the vibration source 2 is transmitted to the leaf springs 11 and 21. The elastically deformed portions 11*a* and 21*a* vibrate in the X direction due to the vibration transmitted from the vibration source 2. The elastically deformed portion 11*b* vibrates in the D2 direction due to the vibration transmitted from the vibration source 2. The elastically deformed portion 21*b* vibrates in the D5 direction due to the vibration transmitted from the vibration source 2.

The elastically deformed portions 11*a*, 21*a*, 11*b*, and 21*b* vibrate in different thickness directions. Therefore, the elastically deformed portions 11*a*, 21*a*, 11 *b*, and 21*b* can attenuate the vibration transmitted from the vibration source 2.

At this time, one region in the D1 direction 126 of the elastically deformed portion 12*a* of the leaf spring 12 vibrates to generate sliding friction on the surface 111*d* of the elastically deformed portion 11*a* of the leaf spring 11. One region in the D1 direction 136 of the elastically deformed portion 13*a* of the leaf spring 13 vibrates to generate sliding friction on the surface 111*e* of the elastically deformed portion 11*a* of the leaf spring 11.

One region in the D4 direction 226 of the elastically deformed portion 22*a* of the leaf spring 22 vibrates to generate sliding friction on the surface 211*d* of the elastically deformed portion 21*a* of the leaf spring 21. One region in the D4 direction 236 of the elastically deformed portion 23*a* of the leaf spring 23 vibrates to generate sliding friction on the surface 211*e* of the elastically deformed portion 21*a* of the leaf spring 21.

Consequently, the leaf springs 11, 12, 22, and 23 can attenuate the vibration of the leaf springs 11 and 21. It is possible to inhibit the transmission of vibration from the vibration source 2 to the vibration transmission portion 3 via the leaf springs 11 and 21.

Similar to the first embodiment, the anti-vibration device 1 can improve the anti-vibration performance of attenuating the vibration transmitted from the vibration source 2 to the vibration transmission portion 3.

Other Embodiments (1) In the first through eighth embodiments described above, the anti-vibration device 1 is composed of the four spring units 10A, 10B, 20A, and 20B. Instead, the anti-vibration device 1 may be composed of three or fewer spring units or five or more spring units.

(2) In the first through eighth embodiments described above, the spring unit 10A is composed of the leaf springs 11, 12, and 13. Instead, the spring unit 10A may be composed of the leaf spring 11 only or the leaf springs 11 and 12. The spring unit 10A may be composed of the leaf springs 11 and 13.

Similarly, the spring unit 20A may be composed of the leaf spring 21 only or the leaf springs 21 and 22. The spring unit 20A may be composed of the leaf springs 21 and 23.

(3) In the first through eighth embodiments described above, the spring unit 10A is secured to the vibration source 2 through the use of the bolts 30*a* and 30*b*. Alternatively, the spring unit 10A may be secured to the vibration source 2 through the use of joining such as welding or brazing. Similarly, the spring unit 10A may be secured to the vibration transmission portion 3 through the use of joining such as welding or brazing.

Similarly, the spring units 10B, 20A, and 20B may be secured to the vibration source 2 through the use of joining such as welding or brazing. The spring units 10B, 20A, and 20B may be secured to the vibration transmission portion 3 through the use of joining such as welding or brazing.

(4) In the first through eighth embodiments described above, the elastically deformed portions 12*b* and 13*b* previously have an elastic force that pushes another region in the X directions 121 and 131 against the surfaces 111*c* and 111*b* of the leaf spring 11. Instead, the elastically deformed portions 12*b* and 13*b* may be configured not to previously have an elastic force that pushes another region in the X directions 121 and 131 against the surfaces 111*c* and 111*b* of the leaf spring 11.

Similarly, the elastically deformed portion 22*b* may be configured not to previously have an elastic force that pushes another region in the X direction 221X against the surface 211*c* of the leaf spring 21. Similarly, the elastically deformed portion 23*b* may be configured not to previously have an elastic force that pushes another region in the X direction 231 against the surface 211*b* of the leaf spring 21.

(5) In the first through eighth embodiments described above, the thickness direction of the elastically deformed portion 21*a* corresponds to the X direction. Alternatively, the thickness direction of the elastically deformed portion 21*a* may intersect the D2 direction and the D5 direction.

(6) It is understood that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

What is claimed is:

1. An anti-vibration device configured to be secured to a vibration source and a vibration transmission portion to inhibit transmission of vibration from the vibration source to the vibration transmission portion, comprising:

a first elastically deformed portion shaped in a plate having a thickness in a first thickness direction, the first elastically deformed portion is elastically deformed by the vibration and vibrates in the first thickness direction to configure a path for the vibration to be transmitted from the vibration source to the vibration transmission portion;

a second elastically deformed portion shaped in a plate having a thickness in a second thickness direction intersecting the first thickness direction, the second elastically deformed portion is elastically deformed by the vibration and vibrates in the second thickness direction to configure the path, a third elastically deformed portion shaped in a plate having a thickness in a third thickness direction intersecting the first thickness direction and the second thickness direction, the third elastically deformed portion is elastically deformed by the vibration and vibrates in the third thickness direction to configure the path; and a fourth elastically deformed portion shaped in a plate having a thickness in a fourth thickness direction intersecting the second thickness direction and the third thickness direction wherein the first elastically deformed portion has a first surface flatly expanding in a direction orthogonal to the first thickness direction;

the second elastically deformed portion has a second surface flatly expanding in a direction perpendicular to the second thickness direction, the third elastically deformed portion has a third surface flatly expanding in a direction perpendicular to the third thickness direction, the first surface is non-parallel to the second surface;

the second surface is non-parallel to the third surface;

the first thickness direction and the second thickness direction are perpendicular to each other;

the first thickness direction and the third thickness direction are perpendicular to each other;

the second thickness direction and the third thickness direction are perpendicular to each other;

the fourth elastically deformed portion is elastically deformed by the vibration and vibrates in the fourth thickness direction to configure the path, the first elastically deformed portion and the second elastically deformed portion configure a first leaf spring; and the fourth elastically deformed portion and the third elastically deformed portion configure a second leaf spring.

2. The anti-vibration device according to claim 1, wherein a direction orthogonal to the first thickness direction is defined as a first orthogonal direction, and a direction orthogonal to the first thickness direction and the first orthogonal direction is defined as a second orthogonal direction;

the first elastically deformed portion is formed to extend to one side of the first orthogonal direction toward one side of the second orthogonal direction; and the fourth elastically deformed portion is formed to extend to another side of the first orthogonal direction toward one side of the second orthogonal direction.

3. The anti-vibration device according to claim 2, wherein the first elastically deformed portion is located on one side in the first orthogonal direction relative to the fourth elastically deformed portion; and a first securing member secures the first elastically deformed portion to the vibration source and a second securing member secures the fourth elastically deformed portion to the vibration source.

4. The anti-vibration device according to claim 1, wherein a direction orthogonal to the first thickness direction is defined as a first orthogonal direction, and a direction orthogonal to the first thickness direction and the first orthogonal direction is defined as a second orthogonal direction;

the first elastically deformed portion includes a first long plate portion formed to extend to one side of the second orthogonal direction; and the fourth elastically deformed portion includes a second long plate portion formed to extend to one side of the second orthogonal direction.

5. The anti-vibration device according to claim 4, wherein the first elastically deformed portion includes a third long plate portion that is formed to extend to one side in the first orthogonal direction from one end of the first long plate portion in the second orthogonal direction to one side in the second orthogonal direction; and the fourth elastically deformed portion includes a fourth long plate portion that is formed to extend to another side in the first orthogonal direction from one end of the second long plate portion in the second orthogonal direction to one side in the second orthogonal direction.

6. The anti-vibration device according to claim 1, wherein the first elastically deformed portion includes an overlap region formed to overlap the fourth elastically deformed portion in the first thickness direction; and a common securing portion secures the overlap region of the first elastically deformed portion along with the fourth elastically deformed portion to the vibration source.

7. The anti-vibration device according to claim 1, wherein the first leaf spring and the second leaf spring configure an integrated formation.

8. The anti-vibration device according to claim 1, further comprising: a first vibration attenuating member that is secured to one of the vibration source and the vibration transmission portion, generates sliding friction on the first leaf spring due to the vibration, and attenuates the vibration of the first leaf spring.

9. The anti-vibration device according to claim 8, further comprising: a second vibration attenuating member that is secured to one of the vibration source and the vibration transmission portion, generates sliding friction on the second leaf spring due to the vibration, and attenuates the vibration of the second leaf spring.

* * * * *